United States Patent
Bae et al.

(10) Patent No.: US 12,192,510 B2
(45) Date of Patent: Jan. 7, 2025

(54) VALIDITY DETERMINATION OF BLOCK VECTOR CANDIDATES

(71) Applicant: Ofinno, LLC, Reston, VA (US)

(72) Inventors: Tae Meon Bae, McLean, VA (US); Damian Ruiz Coll, Reston, VA (US)

(73) Assignee: Ofinno, LLC, Reston, VA (US)

( * ) Notice: Subject to any disclaimer, the term of this patent is extended or adjusted under 35 U.S.C. 154(b) by 239 days.

(21) Appl. No.: 17/954,721

(22) Filed: Sep. 28, 2022

(65) Prior Publication Data

US 2023/0100650 A1    Mar. 30, 2023

Related U.S. Application Data

(60) Provisional application No. 63/249,522, filed on Sep. 28, 2021.

(51) Int. Cl.
*H04N 19/513* (2014.01)
*H04N 19/43* (2014.01)

(52) U.S. Cl.
CPC .......... *H04N 19/521* (2014.11); *H04N 19/43* (2014.11)

(58) Field of Classification Search
CPC ................ H04N 19/521; H04N 1/43
See application file for complete search history.

(56) References Cited

U.S. PATENT DOCUMENTS

| | | | | |
|---|---|---|---|---|
| 2015/0373366 A1* | 12/2015 | He | ......... | H04N 19/463 |
| | | | | 375/240.16 |
| 2020/0112743 A1* | 4/2020 | Xu | ......... | H04N 19/521 |
| 2022/0094979 A1* | 3/2022 | Tian | ......... | H04N 19/176 |
| 2022/0109852 A1* | 4/2022 | Xu | ......... | H04N 19/139 |

OTHER PUBLICATIONS

Xiaozhong XU et al., "Intra block copy in Versatile Video Coding with Reference Sample Memory Reuse", 2019 Picture Coding Symposium (PCS), 2019, pp. 1-5.

Tung Nguyen et al., "Overview of the Screen Content Support in VVC: Applications, Coding Tools, and Performance", IEEE Transactions on Circuits and Systems for Video Technology PP(99):1-1, Apr. 2021, pp. 1-18.

(Continued)

*Primary Examiner* — Shawn S An
(74) *Attorney, Agent, or Firm* — Willis H. Chang; Kavon Nasabzadeh; Jacob L. Mangan

(57) ABSTRACT

An apparatus calculates a block vector difference (BVD) between a block vector (BV) and a block vector predictor (BVP). The apparatus determines each of a plurality of BV candidates based on a sum of the BVP and a different one of a plurality of BVD candidates. Each of the plurality of BVD candidates comprises: a first and a second component magnitude of the BVD; and a different combination of signs for the first and second component magnitudes. The apparatus determines validities of the plurality of BV candidates based on values of samples, stored in a reference memory, of reference blocks indicated by the plurality of BV candidates. The apparatus signales, in a bitstream, a sign for at least one of the first and second component magnitudes of the BVD based on the validities of the plurality of BV candidates.

20 Claims, 27 Drawing Sheets

(56) References Cited

OTHER PUBLICATIONS

International Telecommunication Union, ITU-T, Telecommunication Standardization Sector of ITU, H.266, (Aug. 2020), Series H: Audiovisual and Multimedia Systems, Infrastructure of audiovisual services—Coding of moving video, Versatile video coding.
JVET-J0047-v2; Joint Video Experts Team (JVET) of ITU-T SG 16 WP 3 and ISO/IEC JTC 1/SC 29/WG 11; 10th Meeting: San Diego, US, Apr. 10-20, 2018; Title: Further work on top of Tencent's CfP response; Status: Input document to JVET; Purpose: Proposal; Author(s): Xiang Li et al.; Source: Tencent.
IVET-L0404-v2; Joint Video Experts Team (JVET) of ITU-T SG 16 WP 3 and ISO/IEC JTC 1/SC 29/WG 11; 12th Meeting: Macao, CN, Oct. 3-12, 2018; Title: CE8-related: Restrictions for the search area of the IBC blocks in CPR; Status: Input document to JVET; Purpose: Proposal; Author(s): Luong Pham Van et al.; Source: Qualcomm Technologies Inc.
JVET-M0407-v3; Joint Video Experts Team (JVET) of ITU-T SG 16 WP 3 and ISO/IEC JTC 1/SC 29/WG 11; 13th Meeting: Marrakesh, MA, Jan. 9-18, 2019; Title: CE8: CPR reference memory reuse without increasing memory requirement (CE8.1.2a and CE8.1.2d); Status: Input document to JVET; Purpose: Proposal; Author(s): Xiaozhong Xu et al.; Source: Tencent, Ubilinx.
JVET-N0249_v2; Joint Video Experts Team (JVET) of ITU-T SG 16 WP 3 and ISO/IEC JTC 1/SC 29/WG 11; 14th Meeting: Geneva, CH, Mar. 19-27, 2019; Title: Non-CE8: an alternative search area for IBC; Status: Input document to JVET; Purpose: Proposal; Author(s): Jizheng Xu et al.; Source: Bytedance Inc.
JVET-N0250; Joint Video Experts Team (JVET) of ITU-T SG 16 WP 3 and ISO/IEC JTC 1/SC 29/WG 11; 14th Meeting: Geneva, CH, Mar. 19-27, 2019; Title: Non-CE8: Reference memory reduction for intra block copy; Status: Input document to JVET; Purpose: Proposal; Source: Bytedance Inc.
JVET-N0383-v1; Joint Video Experts Team (JVET) of ITU-T SG 16 WP 3 and ISO/IEC JTC 1/SC 29/WG 11; 14th Meeting: Geneva, CH, Mar. 19-27, 2019; Title: Non-CE8: IBC search range adjustment for implementation consideration; Status: Input document to JVET; Purpose: Proposal; Author(s): Xiaozhong Xu; Source: Tencent.
JVET-N0472_v2; Joint Video Experts Team (JVET) of ITU-T SG 16 WP 3 and ISO/IEC JTC 1/SC 29/WG 11; 14th Meeting: Geneva, CH, Mar. 19-27, 2019; Title: Non-CE8: On IBC reference buffer design; Status: Input document to JVET; Purpose: Proposal; Author(s): Jizheng Xu et al.; Source: Bytedance Inc.
JVET-O1170-v1; Joint Video Experts Team (JVET) of ITU-T SG 16 WP 3 and ISO/IEC JTC 1/SC 29/WG 11; 15th Meeting: Gothenburg, SE, Jul. 3-12, 2019; Title: Bitstream conformance with a virtual IBC buffer concept; Status: Input document to JVET; Purpose: Proposal; Author(s): Jizheng Xu et al.; Source: Bytedance Inc., Panasonic Corporation, Tencent.
JVET-P0454-v3; Joint Video Experts Team (JVET) of ITU-T SG 16 WP 3 and ISO/IEC JTC 1/SC 29/WG 11; 16th Meeting: Geneva, CH, Oct. 1-11, 2019; Title: Non-CE8: Constraints on IBC reference block locations; Status: Input document to JVET; Purpose: Proposal; Author(s): Xiaozhong Xu et al.; Source: Tencent.
JVET-P1018-v2; Joint Video Experts Team (JVET) of ITU-T SG 16 WP 3 and ISO/IEC JTC 1/SC 29/WG 11; 16th Meeting: Geneva, CH, Oct. 1-11, 2019; Title: Non-CE8: An alternative IBC virtual buffer setting to avoid reference sample wrapping around; Status: Input document to JVET; Purpose: Proposal; Author(s): Jizheng Xu et al.; Source: Bytedance Inc. & Tencent.
JVET-T2002-v2; Joint Video Experts Team (JVET) of ITU-T SG 16 WP 3 and ISO/IEC JTC 1/SC 29; 20th Meeting, by teleconference, Oct. 7-16, 2020; Title: Algorithm description for Versatile Video Coding and Test Model 11 (VTM 11); Status: Output document of JVET; Purpose: Algorithm description for Versatile Video Coding and Test Model 11; Author(s): Jianle Chen et al.; Source: Editors.
JVET-S2001-vG; Joint Video Experts Team (JVET) of ITU-T SG 16 WP 3 and ISO/IEC JTC 1/SC 29/WG 11; 19th Meeting: by teleconference, Jun. 22-Jul. 1, 2020; Title: Versatile Video Coding (Draft 10); Status: Output document approved by JVET; Purpose: Draft text of video coding specification; Author(s): Benjamin Bross et al.; Source: Editors.

\* cited by examiner

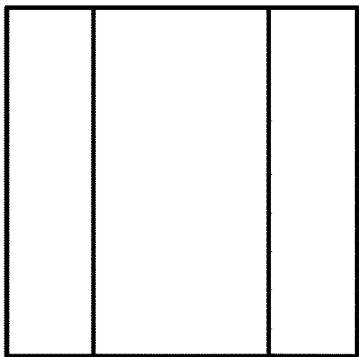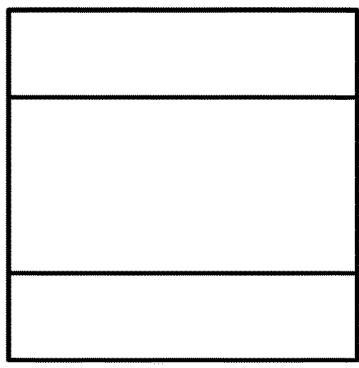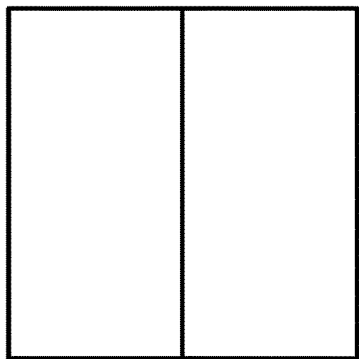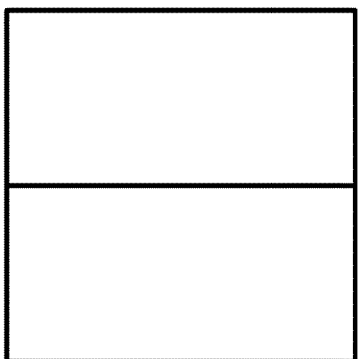
FIG. 6

The quick brown fox jumps over the lazy dog. The quick brown fox jumps over the lazy dog. The quick brown fox jumps over the lazy dog.

*FIG. 16*

| | BVD/BV Candidate Validities | | | | BVD Sign Signaling | |
|---|---|---|---|---|---|---|
| Idx | BV Candidate 1906/ BVD Candidate 1806 xSign(+),ySign(+) | BV Candidate 1904/ BVD Candidate 1804 xSign(+),ySign(−) | BV Candidate 1708/ BVD Candidate 1714 xSign(−),ySign(+) | BV Candidate 1902/ BVD Candidate 1802 xSign(−),ySign(−) | BVD 1714 xSign Signaling | BVD 1714 ySign Signaling |
| 0 | 0 | 0 | 0 | 0 | *** | **** |
| 1 | 0 | 0 | 0 | 1 | − | − |
| 2 | 0 | 0 | 1 | 0 | − | + |
| 3 | 0 | 0 | 1 | 1 | − | X |
| 4 | 0 | 1 | 0 | 0 | + | − |
| 5 | 0 | 1 | 0 | 1 | X | − |
| 6 | 0 | 1 | 1 | 0 | X | Inv(xSign) |
| 7 | 0 | 1 | 1 | 1 | X | If xSign==(+) Then ySign==(−) |
| 8 | 1 | 0 | 0 | 0 | + | + |
| 9 | 1 | 0 | 0 | 1 | X | xSign |
| 10 | 1 | 0 | 1 | 0 | + | + |
| 11 | 1 | 0 | 1 | 1 | X | If xSign==(+) Then ySign==(+) |
| 12 | 1 | 1 | 0 | 0 | + | X |
| 13 | 1 | 1 | 0 | 1 | X | If xSign==(−) Then ySign==(−) |
| 14 | 1 | 1 | 1 | 0 | X | If xSign==(−) Then ySign==(+) |
| 15 | 1 | 1 | 1 | 1 | X | X |

*FIG. 20*

| Idx | BVD/BV Candidate Validities ||||  Selected BV Candidate Signaling ||
|---|---|---|---|---|---|---|
| | BV Candidate 1906/ BVD Candidate 1806 $xSign(+), ySign(+)$ | BV Candidate 1904/ BVD Candidate 1804 $xSign(+), ySign(-)$ | BV Candidate 1708/ BVD Candidate 1714 $xSign(-), ySign(+)$ | BV Candidate 1902/ BVD Candidate 1802 $xSign(-), ySign(-)$ | BV Candidate Selection Bit 2104 | BV Candidate Selection Bit 2102 |
| 0 | 0 | 0 | 0 | 0 | **** | **** |
| 1 | 0 | 0 | 0 | 1 | **** | **** |
| 2 | 0 | 0 | 1 | 0 | **** | **** |
| 3 | 0 | 1 | 0 | 0 | **** | **** |
| 4 | 1 | 0 | 0 | 0 | **** | **** |
| 5 | 0 | 0 | 1 | 1 | **** | X |
| 6 | 0 | 1 | 0 | 1 | **** | X |
| 7 | 0 | 1 | 1 | 0 | **** | X |
| 8 | 1 | 0 | 0 | 1 | **** | X |
| 9 | 1 | 0 | 1 | 0 | **** | X |
| 10 | 1 | 1 | 0 | 0 | **** | X |
| 11 | 0 | 1 | 1 | 1 | **** or X | X |
| 12 | 1 | 0 | 1 | 1 | **** or X | X |
| 13 | 1 | 1 | 0 | 1 | **** or X | X |
| 14 | 1 | 1 | 1 | 0 | **** or X | X |
| 15 | 1 | 1 | 1 | 1 | X | X |

VALIDITY DETERMINATION OF BLOCK VECTOR CANDIDATES

CROSS-REFERENCE TO RELATED APPLICATIONS

This application claims the benefit of U.S. Provisional Application No. 63/249,522, filed Sep. 28, 2021, which is hereby incorporated by reference in its entirety.

BRIEF DESCRIPTION OF THE DRAWINGS

Examples of several of the various embodiments of the present disclosure are described herein with reference to the drawings.

FIG. 6 illustrates example binary and ternary tree partitions in accordance with embodiments of the present disclosure.

FIG. 16 illustrates an example of IBC applied for screen content in accordance with embodiments of the present disclosure.

FIG. 20 illustrates an example table showing all possible combinations of valid BV candidates, among the four BV candidates, and example signaling/decoding methods for each such combination in accordance with embodiments of the present disclosure.

FIG. 21 illustrates another example table showing all possible combinations of valid BV candidates, among four BV candidates, and example signaling/decoding methods for each such combination in accordance with embodiments of the present disclosure.

DETAILED DESCRIPTION

Figure 1:
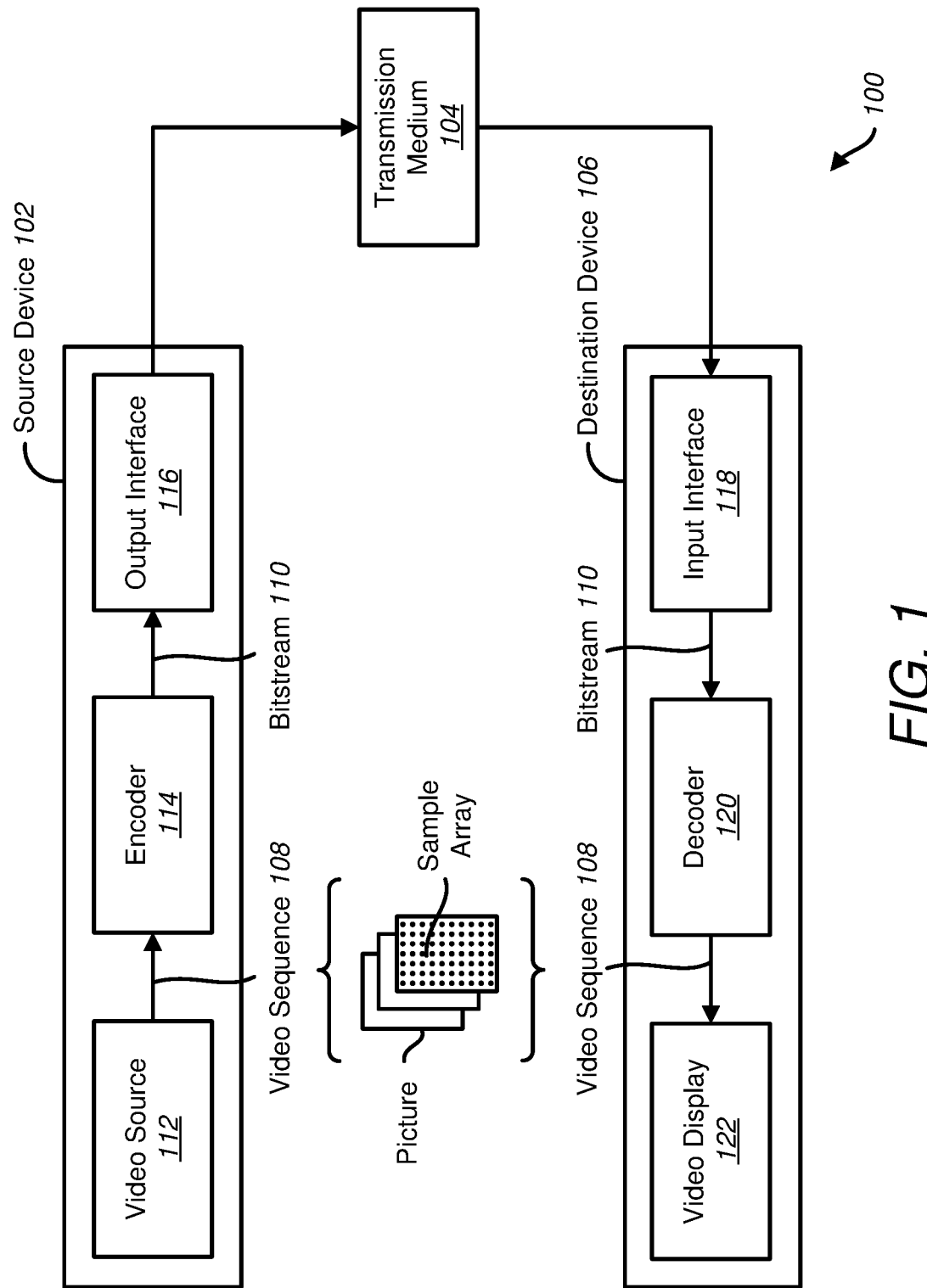
FIG. 1 illustrates an exemplary video coding/decoding system in which embodiments of the present disclosure may be implemented.

In the following description, numerous specific details are set forth in order to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Representing a video sequence in digital form may require a large number of bits. The data size of a video sequence in digital form may be too large for storage and/or transmission in many applications. Video encoding may be used to compress the size of a video sequence to provide for more efficient storage and/or transmission. Video decoding may be used to decompress a compressed video sequence for display and/or other forms of consumption.

FIG. 1 illustrates an exemplary video coding/decoding system 100 in which embodiments of the present disclosure may be implemented. Video coding/decoding system 100 comprises a source device 102, a transmission medium 104, and a destination device 106. Source device 102 encodes a video sequence 108 into a bitstream 110 for more efficient storage and/or transmission. Source device 102 may store and/or transmit bitstream 110 to destination device 106 via transmission medium 104. Destination device 106 decodes bitstream 110 to display video sequence 108. Destination device 106 may receive bitstream 110 from source device 102 via transmission medium 104. Source device 102 and destination device 106 may be any one of a number of different devices, including a desktop computer, laptop computer, tablet computer, smart phone, wearable device, television, camera, video gaming console, set-top box, or video streaming device.

To encode video sequence 108 into bitstream 110, source device 102 may comprise a video source 112, an encoder 114, and an output interface 116. Video source 112 may provide or generate video sequence 108 from a capture of a natural scene and/or a synthetically generated scene. A synthetically generated scene may be a scene comprising computer generated graphics or screen content. Video source 112 may comprise a video capture device (e.g., a video camera), a video archive comprising previously captured natural scenes and/or synthetically generated scenes, a video feed interface to receive captured natural scenes and/or synthetically generated scenes from a video content provider, and/or a processor to generate synthetic scenes.

A shown in FIG. 1, a video sequence, such as video sequence 108, may comprise a series of pictures (also referred to as frames). A video sequence may achieve the impression of motion when a constant or variable time is used to successively present pictures of the video sequence. A picture may comprise one or more sample arrays of intensity values. The intensity values may be taken at a series of regularly spaced locations within a picture. A color picture typically comprises a luminance sample array and two chrominance sample arrays. The luminance sample array may comprise intensity values representing the brightness (or luma component, Y) of a picture. The chrominance sample arrays may comprise intensity values that respectively represent the blue and red components of a picture (or chroma components, Cb and Cr) separate from the brightness. Other color picture sample arrays are possible based on different color schemes (e.g., an RGB color scheme). For color pictures, a pixel may refer to all three intensity values for a given location in the three sample arrays used to represent color pictures. A monochrome picture comprises a single, luminance sample array. For monochrome pictures, a pixel may refer to the intensity value at a given location in the single, luminance sample array used to represent monochrome pictures.

Encoder 114 may encode video sequence 108 into bitstream 110. To encode video sequence 108, encoder 114 may apply one or more prediction techniques to reduce redundant information in video sequence 108. Redundant information is information that may be predicted at a decoder and therefore may not be needed to be transmitted to the decoder for accurate decoding of the video sequence. For example, encoder 114 may apply spatial prediction (e.g., intra-frame or intra prediction), temporal prediction (e.g., inter-frame prediction or inter prediction), inter-layer prediction, and/or other prediction techniques to reduce redundant information in video sequence 108. Before applying the one or more prediction techniques, encoder 114 may partition pictures of video sequence 108 into rectangular regions referred to as blocks. Encoder 114 may then encode a block using one or more of the prediction techniques.

For temporal prediction, encoder 114 may search for a block similar to the block being encoded in another picture (also referred to as a reference picture) of video sequence 108. The block determined during the search (also referred to as a prediction block) may then be used to predict the block being encoded. For spatial prediction, encoder 114 may form a prediction block based on data from reconstructed neighboring samples of the block to be encoded within the same picture of video sequence 108. A reconstructed sample refers to a sample that was encoded and then decoded. Encoder 114 may determine a prediction error (also referred to as a residual) based on the difference between a block being encoded and a prediction block. The prediction error may represent non-redundant information that may be transmitted to a decoder for accurate decoding of a video sequence.

Encoder 114 may apply a transform to the prediction error (e.g. a discrete cosine transform (DCT)) to generate transform coefficients. Encoder 114 may form bitstream 110 based on the transform coefficients and other information used to determine prediction blocks (e.g., prediction types, motion vectors, and prediction modes). In some examples, encoder 114 may perform one or more of quantization and entropy coding of the transform coefficients and/or the other information used to determine prediction blocks before forming bitstream 110 to further reduce the number of bits needed to store and/or transmit video sequence 108.

Output interface 116 may be configured to write and/or store bitstream 110 onto transmission medium 104 for transmission to destination device 106. In addition or alternatively, output interface 116 may be configured to transmit, upload, and/or stream bitstream 110 to destination device 106 via transmission medium 104. Output interface 116 may comprise a wired and/or wireless transmitter configured to transmit, upload, and/or stream bitstream 110 according to one or more proprietary and/or standardized communication protocols, such as Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, 3rd Generation Partnership Project (3GPP) standards, Institute of Electrical and Electronics Engineers (IEEE) standards, Internet Protocol (IP) standards, and Wireless Application Protocol (WAP) standards.

Transmission medium 104 may comprise a wireless, wired, and/or computer readable medium. For example, transmission medium 104 may comprise one or more wires, cables, air interfaces, optical discs, flash memory, and/or magnetic memory. In addition or alternatively, transmission medium 104 may comprise one more networks (e.g., the Internet) or file servers configured to store and/or transmit encoded video data.

To decode bitstream 110 into video sequence 108 for display, destination device 106 may comprise an input interface 118, a decoder 120, and a video display 122. Input interface 118 may be configured to read bitstream 110 stored on transmission medium 104 by source device 102. In addition or alternatively, input interface 118 may be configured to receive, download, and/or stream bitstream 110 from source device 102 via transmission medium 104. Input interface 118 may comprise a wired and/or wireless receiver configured to receive, download, and/or stream bitstream 110 according to one or more proprietary and/or standardized communication protocols, such as those mentioned above.

Decoder 120 may decode video sequence 108 from encoded bitstream 110. To decode video sequence 108, decoder 120 may generate prediction blocks for pictures of video sequence 108 in a similar manner as encoder 114 and determine prediction errors for the blocks. Decoder 120 may generate the prediction blocks using prediction types, prediction modes, and/or motion vectors received in bitstream 110 and determine the prediction errors using transform coefficients also received in bitstream 110. Decoder 120 may determine the prediction errors by weighting transform basis functions using the transform coefficients. Decoder 120 may combine the prediction blocks and prediction errors to decode video sequence 108. In some examples, decoder 120 may decode a video sequence that approximates video sequence 108 due to, for example, lossy compression of video sequence 108 by encoder 114 and/or errors introduced into encoded bitstream 110 during transmission to destination device 106.

Video display 122 may display video sequence 108 to a user. Video display 122 may comprise a cathode rate tube (CRT) display, liquid crystal display (LCD), a plasma display, light emitting diode (LED) display, or any other display device suitable for displaying video sequence 108.

It should be noted that video encoding/decoding system 100 is presented by way of example and not limitation. In the example of FIG. 1, video encoding/decoding system 100 may have other components and/or arrangements. For example, video source 112 may be external to source device 102. Similarly, video display device 122 may be external to destination device 106 or omitted altogether where video sequence is intended for consumption by a machine and/or storage device. In another example, source device 102 may further comprise a video decoder and destination device 104 may comprise a video encoder. In such an example, source device 102 may be configured to further receive an encoded bit stream from destination device 106 to support two-way video transmission between the devices.

In the example of FIG. 1, encoder 114 and decoder 120 may operate according to any one of a number of proprietary or industry video coding standards. For example, encoder 114 and decoder 120 may operate according to one or more of International Telecommunications Union Telecommunication Standardization Sector (ITU-T) H.263, ITU-T H.264 and Moving Picture Expert Group (MPEG)-4 Visual (also known as Advanced Video Coding (AVC)), ITU-T H.265 and MPEG-H Part 2 (also known as High Efficiency Video Coding (HEVC), ITU-T H.265 and MPEG-I Part 3 (also known as Versatile Video Coding (VVC)), the WebM VP8 and VP9 codecs, and AOMedia Video 1 (AV1).

Figure 2:
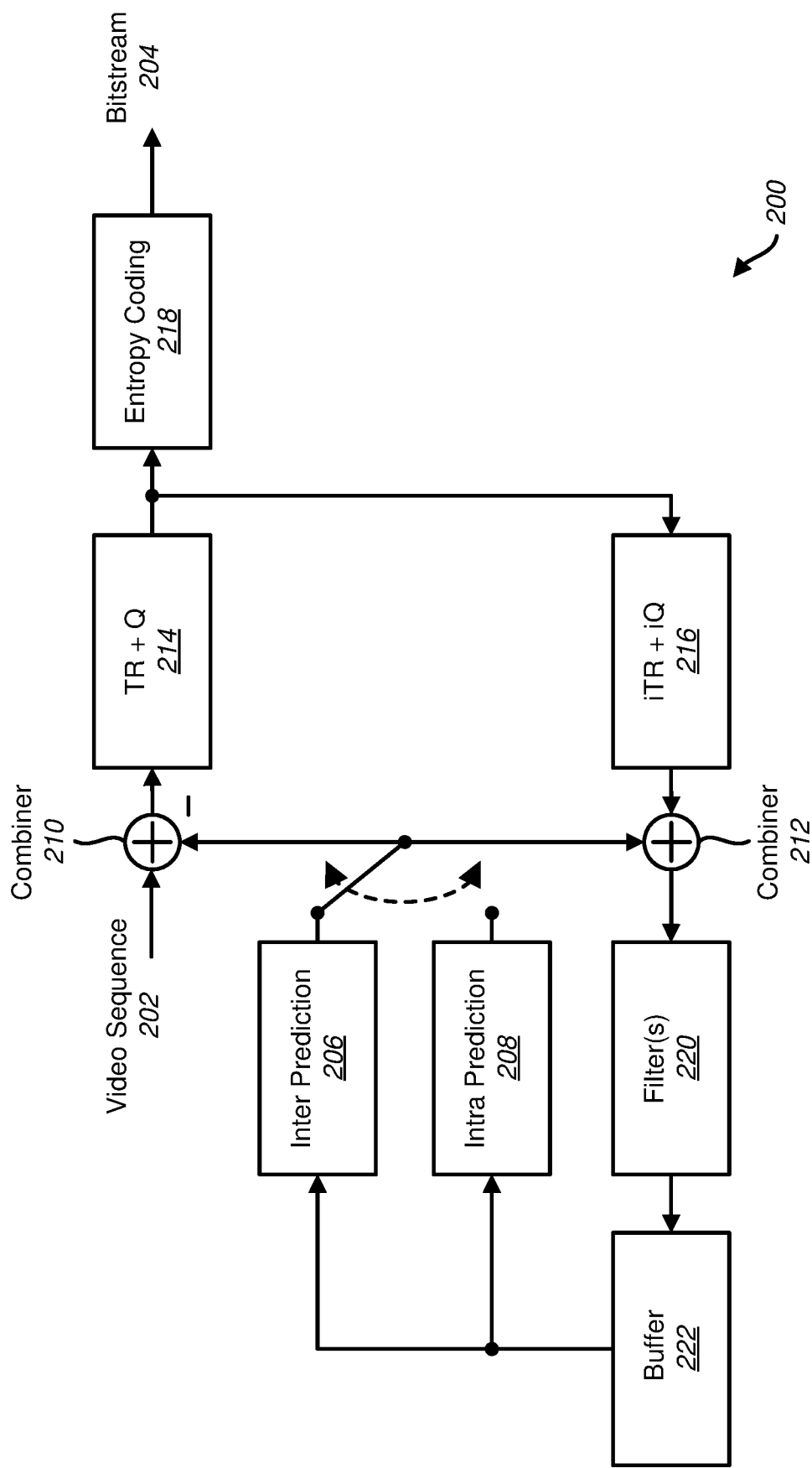
FIG. 2 illustrates an exemplary encoder in which embodiments of the present disclosure may be implemented.

FIG. 2 illustrates an exemplary encoder 200 in which embodiments of the present disclosure may be implemented. Encoder 200 encodes a video sequence 202 into a bitstream 204 for more efficient storage and/or transmission. Encoder 200 may be implemented in video coding/decoding system 100 in FIG. 1 or in any one of a number of different devices, including a desktop computer, laptop computer, tablet computer, smart phone, wearable device, television, camera, video gaming console, set-top box, or video streaming device. Encoder 200 comprises an inter prediction unit 206, an intra prediction unit 208, combiners 210 and 212, a transform and quantization unit (TR+Q) unit 214, an inverse transform and quantization unit (iTR+iQ) 216, entropy coding unit 218, one or more filters 220, and a buffer 222.

Encoder 200 may partition the pictures of video sequence 202 into blocks and encode video sequence 202 on a block-by-block basis. Encoder 200 may perform a prediction technique on a block being encoded using either inter prediction unit 206 or intra prediction unit 208. Inter prediction unit 206 may perform inter prediction by searching for a block similar to the block being encoded in another, reconstructed picture (also referred to as a reference picture) of video sequence 202. A reconstructed picture refers to a picture that was encoded and then decoded. The block determined during the search (also referred to as a prediction block) may then be used to predict the block being encoded to remove redundant information. Inter prediction unit 206 may exploit temporal redundancy or similarities in scene content from picture to picture in video sequence 202 to determine the prediction block. For example, scene content between pictures of video sequence 202 may be similar except for differences due to motion or affine transformation of the screen content over time.

Intra prediction unit 208 may perform intra prediction by forming a prediction block based on data from reconstructed neighboring samples of the block to be encoded within the same picture of video sequence 202. A reconstructed sample refers to a sample that was encoded and then decoded. Intra prediction unit 208 may exploit spatial redundancy or similarities in scene content within a picture of video sequence 202 to determine the prediction block. For example, the texture of a region of scene content in a picture may be similar to the texture in the immediate surrounding area of the region of the scene content in the same picture.

After prediction, combiner 210 may determine a prediction error (also referred to as a residual) based on the difference between the block being encoded and the prediction block. The prediction error may represent non-redundant information that may be transmitted to a decoder for accurate decoding of a video sequence.

Transform and quantization unit 214 may transform and quantize the prediction error. Transform and quantization unit 214 may transform the prediction error into transform coefficients by applying, for example, a DCT to reduce correlated information in the prediction error. Transform and quantization unit 214 may quantize the coefficients by mapping data of the transform coefficients to a predefined set of representative values. Transform and quantization unit 214 may quantize the coefficients to reduce irrelevant information in bitstream 204. Irrelevant information is information that may be removed from the coefficients without producing visible and/or perceptible distortion in video sequence 202 after decoding.

Entropy coding unit 218 may apply one or more entropy coding methods to the quantized transform coefficients to further reduce the bit rate. For example, entropy coding unit 218 may apply context adaptive variable length coding (CAVLC), context adaptive binary arithmetic coding (CABAC), and syntax-based context-based binary arithmetic coding (SBAC). The entropy coded coefficients are packed to form bitstream 204.

Inverse transform and quantization unit 216 may inverse quantize and inverse transform the quantized transform coefficients to determine a reconstructed prediction error. Combiner 212 may combine the reconstructed prediction error with the prediction block to form a reconstructed block. Filter(s) 220 may filter the reconstructed block using, for example, a deblocking filter and/or a sample-adaptive offset (SAO) filter. Buffer 222 may store the reconstructed block for prediction of one or more other blocks in the same and/or different picture of video sequence 202.

Although not shown in FIG. 2, encoder 200 further comprises an encoder control unit configured to control one or more of the units of encoder 200 shown in FIG. 2. The encoder control unit may control the one or more units of encoder 200 such that bitstream 204 is generated in conformance with the requirements of any one of a number of proprietary or industry video coding standards. For example, The encoder control unit may control the one or more units of encoder 200 such that bitstream 204 is generated in conformance with one or more of ITU-T H.263, AVC, HEVC, VVC, VP8, VP9, and AV1 video coding standards.

Within the constraints of a proprietary or industry video coding standard, the encoder control unit may attempt to minimize or reduce the bitrate of bitstream 204 and maximize or increase the reconstructed video quality. For example, the encoder control unit may attempt to minimize or reduce the bitrate of bitstream 204 given a level that the reconstructed video quality may not fall below, or attempt to maximize or increase the reconstructed video quality given a level that the bit rate of bitstream 204 may not exceed. The encoder control unit may determine/control one or more of: partitioning of the pictures of video sequence 202 into blocks, whether a block is inter predicted by inter prediction unit 206 or intra predicted by intra prediction unit 208, a motion vector for inter prediction of a block, an intra prediction mode among a plurality of intra prediction modes for intra prediction of a block, filtering performed by filter(s) 220, and one or more transform types and/or quantization parameters applied by transform and quantization unit 214. The encoder control unit may determine/control the above based on how the determination/control effects a rate-distortion measure for a block or picture being encoded. The encoder control unit may determine/control the above to reduce the rate-distortion measure for a block or picture being encoded.

After being determined, the prediction type used to encode a block (intra or inter prediction), prediction information of the block (intra prediction mode if intra predicted, motion vector, etc.), and transform and quantization parameters, may be sent to entropy coding unit 218 to be further compressed to reduce the bit rate. The prediction type, prediction information, and transform and quantization parameters may be packed with the prediction error to form bitstream 204.

It should be noted that encoder 200 is presented by way of example and not limitation. In other examples, encoder 200 may have other components and/or arrangements. For example, one or more of the components shown in FIG. 2 may be optionally included in encoder 200, such as entropy coding unit 218 and filters(s) 220.

Figure 3:
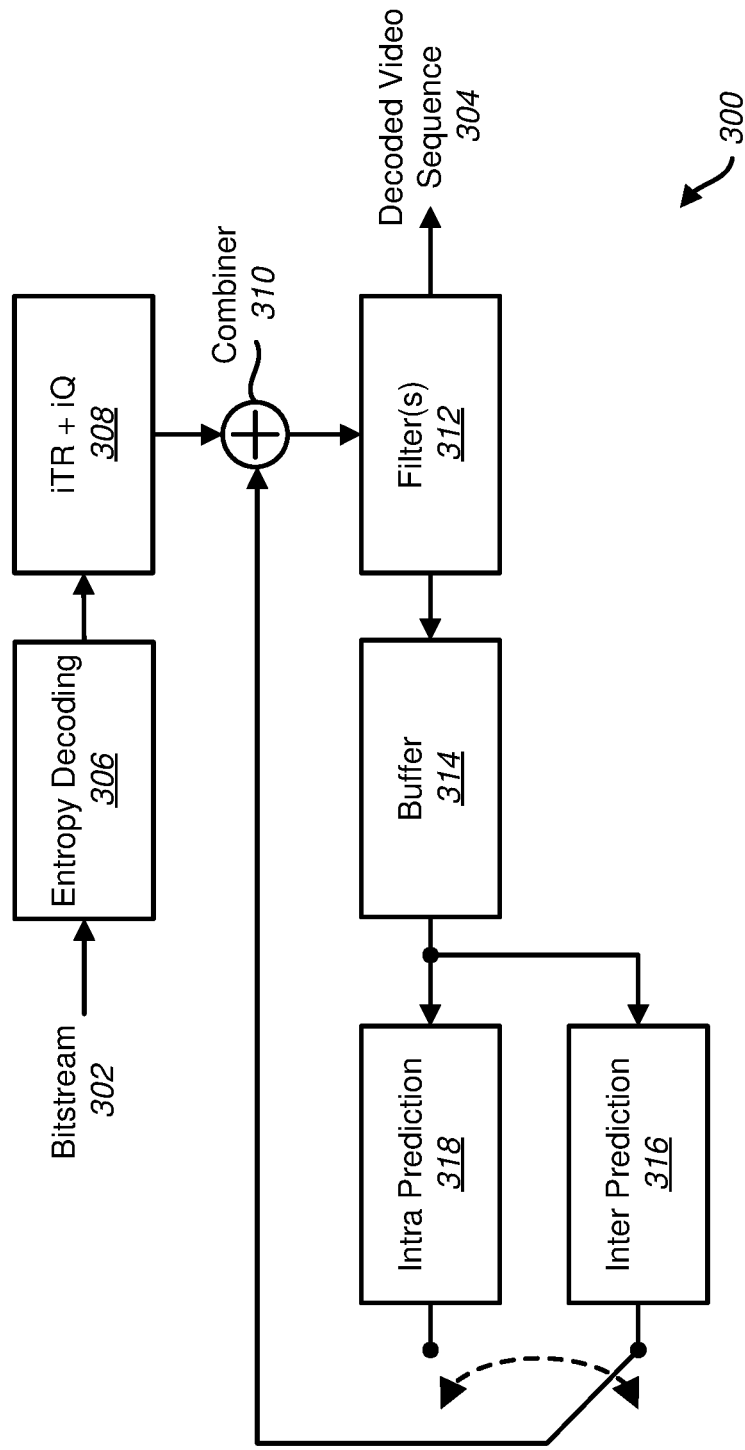
FIG. 3 illustrates an exemplary decoder in which embodiments of the present disclosure may be implemented.

FIG. 3 illustrates an exemplary decoder 300 in which embodiments of the present disclosure may be implemented. Decoder 300 decodes an bitstream 302 into a decoded video sequence for display and/or some other form of consumption. Decoder 300 may be implemented in video coding/decoding system 100 in FIG. 1 or in any one of a number of different devices, including a desktop computer, laptop computer, tablet computer, smart phone, wearable device, television, camera, video gaming console, set-top box, or video streaming device. Decoder 300 comprises an entropy decoding unit 306, an inverse transform and quantization (iTR+iQ) unit 308, a combiner 310, one or more filters 312, a buffer 314, an inter prediction unit 316, and an intra prediction unit 318.

Although not shown in FIG. 3, decoder 300 further comprises a decoder control unit configured to control one or more of the units of decoder 300 shown in FIG. 3. The decoder control unit may control the one or more units of decoder 300 such that bitstream 302 is decoded in conformance with the requirements of any one of a number of proprietary or industry video coding standards. For example, The decoder control unit may control the one or more units of decoder 300 such that bitstream 302 is decoded in conformance with one or more of ITU-T H.263, AVC, HEVC, VVC, VP8, VP9, and AV1 video coding standards.

The decoder control unit may determine/control one or more of: whether a block is inter predicted by inter prediction unit 316 or intra predicted by intra prediction unit 318, a motion vector for inter prediction of a block, an intra prediction mode among a plurality of intra prediction modes for intra prediction of a block, filtering performed by filter(s) 312, and one or more inverse transform types and/or inverse quantization parameters to be applied by inverse transform and quantization unit 308. One or more of the control parameters used by the decoder control unit may be packed in bitstream 302.

Entropy decoding unit 306 may entropy decode the bitstream 302. Inverse transform and quantization unit 308 may inverse quantize and inverse transform the quantized transform coefficients to determine a decoded prediction error. Combiner 310 may combine the decoded prediction error with a prediction block to form a decoded block. The prediction block may be generated by inter prediction unit 318 or inter prediction unit 316 as described above with respect to encoder 200 in FIG. 2. Filter(s) 312 may filter the decoded block using, for example, a deblocking filter and/or a sample-adaptive offset (SAO) filter. Buffer 314 may store the decoded block for prediction of one or more other blocks in the same and/or different picture of the video sequence in bitstream 302. Decoded video sequence 304 may be output from filter(s) 312 as shown in FIG. 3.

It should be noted that decoder 300 is presented by way of example and not limitation. In other examples, decoder 300 may have other components and/or arrangements. For example, one or more of the components shown in FIG. 3 may be optionally included in decoder 300, such as entropy decoding unit 306 and filters(s) 312.

It should be further noted that, although not shown in FIGS. 2 and 3, each of encoder 200 and decoder 300 may further comprise an intra block copy unit in addition to inter prediction and intra prediction units. The intra block copy unit may perform similar to an inter prediction unit but predict blocks within the same picture. For example, the intra block copy unit may exploit repeated patterns that appear in screen content. Screen content may include, for example, computer generated text, graphics, and animation.

As mentioned above, video encoding and decoding may be performed on a block-by-block basis. The process of partitioning a picture into blocks may be adaptive based on the content of the picture. For example, larger block partitions may be used in areas of a picture with higher levels of homogeneity to improve coding efficiency.

In HEVC, a picture may be partitioned into non-overlapping square blocks, referred to as coding tree blocks (CTBs), comprising samples of a sample array. A CTB may have a size of $2^n \times 2^n$ samples, where n may be specified by a parameter of the encoding system. For example, n may be 4, 5, or 6. A CTB may be further partitioned by a recursive quadtree partitioning into coding blocks (CBs) of half vertical and half horizontal size. The CTB forms the root of the quadtree. A CB that is not split further as part of the recursive quadtree partitioning may be referred to as a leaf-CB of the quadtree and otherwise as a non-leaf CB of the quadtree. A CB may have a minimum size specified by a parameter of the encoding system. For example, a CB may have a minimum size of 4×4, 8×8, 16×16, 32×32, or 64×64 samples. For inter and intra prediction, a CB may be further partitioned into one or more prediction blocks (PB s) for performing inter and intra prediction. A PB may be a rectangular block of samples on which the same prediction type/mode may be applied. For transformations, a CB may be partitioned into one or more transform blocks (TBs). A TB may be a rectangular block of samples that may determine an applied transform size.

Figure 4:
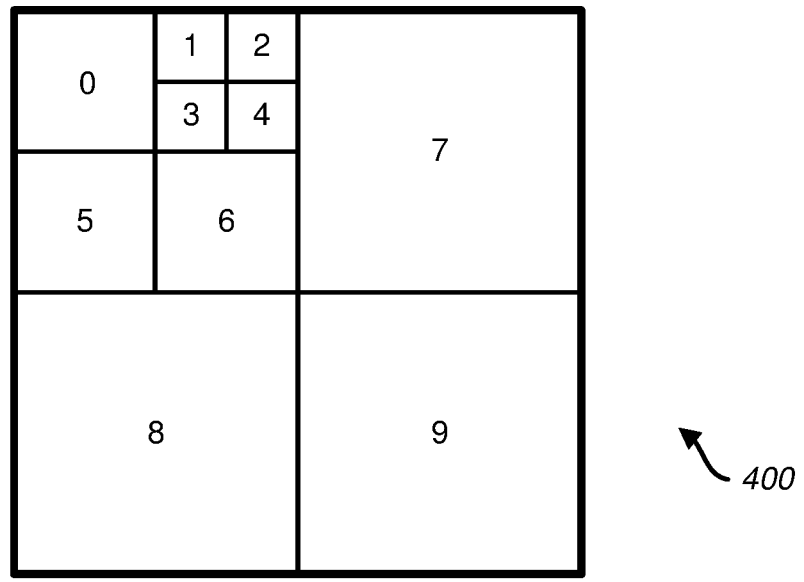
FIG. 4 illustrates an example quadtree partitioning of a coding tree block (CTB) in accordance with embodiments of the present disclosure.
Figure 5:
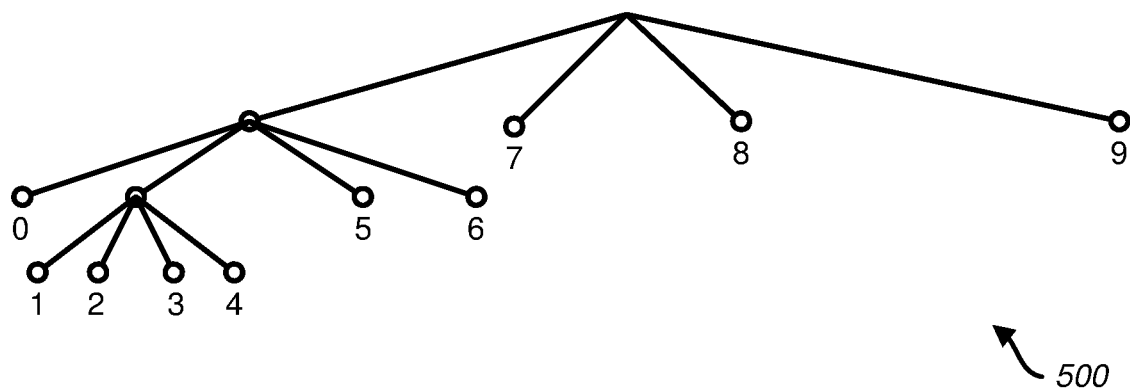
FIG. 5 illustrates a corresponding quadtree of the example quadtree partitioning of the CTB in FIG. 4 in accordance with embodiments of the present disclosure.

FIG. 4 illustrates an example quadtree partitioning of a CTB 400. FIG. 5 illustrates a corresponding quadtree 500 of the example quadtree partitioning of CTB 400 in FIG. 4. As shown in FIGS. 4 and 5, CTB 400 is first partitioned into four CBs of half vertical and half horizontal size. Three of the resulting CBs of the first level partitioning of CTB 400 are leaf-CBs. The three leaf CBs of the first level partitioning of CTB 400 are respectively labeled 7, 8, and 9 in FIGS. 4 and 5. The non-leaf CB of the first level partitioning of CTB 400 is partitioned into four sub-CBs of half vertical and half horizontal size. Three of the resulting sub-CBs of the second level partitioning of CTB 400 are leaf CBs. The three leaf CBs of the second level partitioning of CTB 400 are respectively labeled 0, 5, and 6 in FIGS. 4 and 5. Finally, the non-leaf CB of the second level partitioning of CTB 400 is partitioned into four leaf CBs of half vertical and half horizontal size. The four leaf CBs are respectively labeled 1, 2, 3, and 4 in FIGS. 4 and 5.

Altogether, CTB 400 is partitioned into 10 leaf CBs respectively labeled 0-9. The resulting quadtree partitioning of CTB 400 may be scanned using a z-scan (left-to-right, top-to-bottom) to form the sequence order for encoding/decoding the CB leaf nodes. The numeric label of each CB leaf node in FIGS. 4 and 5 may correspond to the sequence order for encoding/decoding, with CB leaf node 0 encoded/decoded first and CB leaf node 9 encoded/decoded last. Although not shown in FIGS. 4 and 5, it should be noted that each CB leaf node may comprise one or more PBs and TBs.

In VVC, a picture may be partitioned in a similar manner as in HEVC. A picture may be first partitioned into non-overlapping square CTB s. The CTBs may then be partitioned by a recursive quadtree partitioning into CBs of half vertical and half horizontal size. In VVC, a quadtree leaf node may be further partitioned by a binary tree or ternary tree partitioning into CBs of unequal sizes. FIG. 6 illustrates example binary and ternary tree partitions. A binary tree partition may divide a parent block in half in either the vertical direction 602 or horizontal direction 604. The resulting partitions may be half in size as compared to the parent block. A ternary tree partition may divide a parent block into three parts in either the vertical direction 606 or horizontal direction 608. The middle partition may be twice as large as the other two end partitions in a ternary tree partition.

Figure 7:
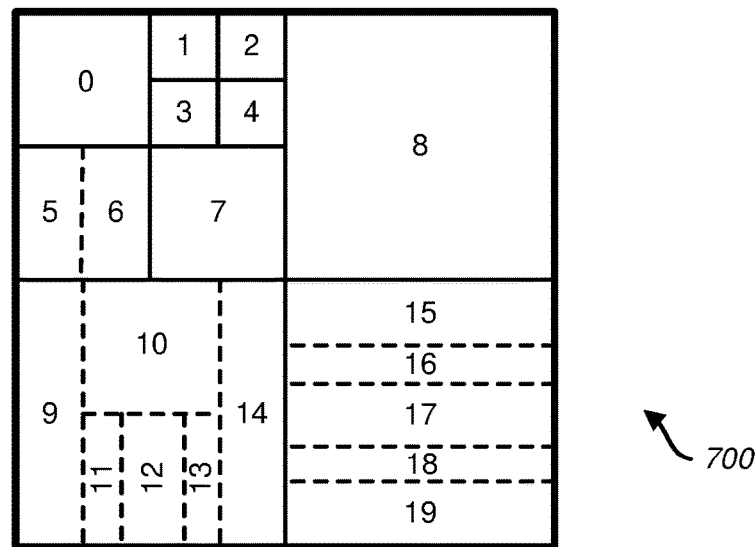
FIG. 7 illustrates an example quadtree+multi-type tree partitioning of a CTB in accordance with embodiments of the present disclosure.
Figure 8:
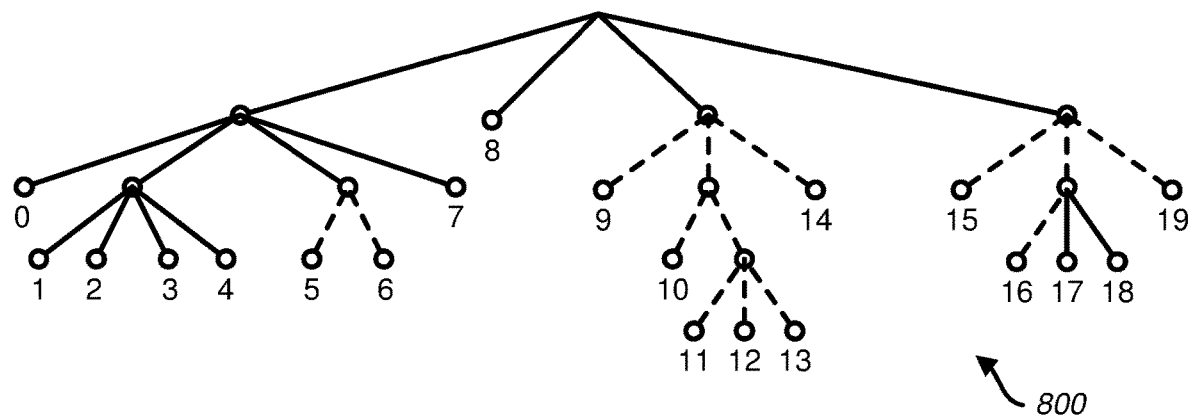
FIG. 8 illustrates a corresponding quadtree+multi-type tree of the example quadtree+multi-type tree partitioning of the CTB in FIG. 7 in accordance with embodiments of the present disclosure.

Because of the addition of binary and ternary tree partitioning, in VVC the block partitioning strategy may be referred to as quadtree+multi-type tree partitioning. FIG. 7 illustrates an example quadtree+multi-type tree partitioning of a CTB 700. FIG. 8 illustrates a corresponding quadtree+multi-type tree 800 of the example quadtree+multi-type tree partitioning of CTB 700 in FIG. 7. In both FIGS. 7 and 8, quadtree splits are shown in solid lines and multi-type tree splits are shown in dashed lines. For ease of explanation, CTB 700 is shown with the same quadtree partitioning as CTB 400 described in FIG. 4. Therefore, description of the quadtree partitioning of CTB 700 is omitted. The description of the additional multi-type tree partitions of CTB 700 is made relative to three leaf-CBs shown in FIG. 4 that have been further partitioned using one or more binary and ternary tree partitions. The three leaf-CBs in FIG. 4 that are shown in FIG. 7 as being further partitioned are leaf-CBs 5, 8, and 9.

Starting with leaf-CB 5 in FIG. 4, FIG. 7 shows this leaf-CB partitioned into two CBs based on a vertical binary tree partitioning. The two resulting CBs are leaf-CBs respectively labeled 5 and 6 in FIGS. 7 and 8. With respect to leaf-CB 8 in FIG. 4, FIG. 7 shows this leaf-CB partitioned into three CBs based on a vertical ternary tree partition. Two of the three resulting CBs are leaf-CBs respectively labeled 9 and 14 in FIGS. 7 and 8. The remaining, non-leaf CB is partitioned first into two CBs based on a horizontal binary tree partition, one of which is a leaf-CB labeled 10 and the other of which is further partitioned into three CBs based on a vertical ternary tree partition. The resulting three CBs are leaf-CBs respectively labeled 11, 12, and 13 in FIGS. 7 and 8. Finally, with respect to leaf-CB 9 in FIG. 4, FIG. 7 shows this leaf-CB partitioned into three CBs based on a horizontal ternary tree partition. Two of the three CBs are leaf-CBs respectively labeled 15 and 19 in FIGS. 7 and 8. The remaining, non-leaf CB is partitioned into three CBs based on another horizontal ternary tree partition. The resulting three CBs are all leaf-CBs respectively labeled 16, 17, and 18 in FIGS. 7 and 8.

Altogether, CTB 700 is partitioned into 20 leaf CBs respectively labeled 0-19. The resulting quadtree+multi-type tree partitioning of CTB 700 may be scanned using a z-scan (left-to-right, top-to-bottom) to form the sequence order for encoding/decoding the CB leaf nodes. The numeric label of each CB leaf node in FIGS. 7 and 8 may correspond to the sequence order for encoding/decoding, with CB leaf node 0 encoded/decoded first and CB leaf node 19 encoded/decoded last. Although not shown in FIGS. 7 and 8, it should be noted that each CB leaf node may comprise one or more PBs and TBs.

In addition to specifying various blocks (e.g., CTB, CB, PB, TB), HEVC and VVC further define various units. While blocks may comprise a rectangular area of samples in a sample array, units may comprise the collocated blocks of samples from the different sample arrays (e.g., luma and chroma sample arrays) that form a picture as well as syntax elements and prediction data of the blocks. A coding tree unit (CTU) may comprise the collocated CTBs of the different sample arrays and may form a complete entity in an encoded bit stream. A coding unit (CU) may comprise the collocated CBs of the different sample arrays and syntax structures used to code the samples of the CBs. A prediction unit (PU) may comprise the collocated PBs of the different sample arrays and syntax elements used to predict the PBs. A transform unit (TU) may comprise TBs of the different samples arrays and syntax elements used to transform the TBs.

It should be noted that the term block may be used to refer to any of a CTB, CB, PB, TB, CTU, CU, PU, or TU in the context of HEVC and VVC. It should be further noted that the term block may be used to refer to similar data structures in the context of other video coding standards. For example, the term block may refer to a macroblock in AVC, a macroblock or sub-block in VP8, a superblock or sub-block in VP9, or a superblock or sub-block in AV1.

In intra prediction, samples of a block to be encoded (also referred to as the current block) may be predicted from samples of the column immediately adjacent to the left-most column of the current block and samples of the row immediately adjacent to the top-most row of the current block. The samples from the immediately adjacent column and row may be jointly referred to as reference samples. Each sample of the current block may be predicted by projecting the position of the sample in the current block in a given direction (also referred to as an intra prediction mode) to a point along the reference samples. The sample may be predicted by interpolating between the two closest reference samples of the projection point if the projection does not fall directly on a reference sample. A prediction error (also referred to as a residual) may be determined for the current block based on differences between the predicted sample values and the original sample values of the current block.

At an encoder, this process of predicting samples and determining a prediction error based on a difference between the predicted samples and original samples may be performed for a plurality of different intra prediction modes, including non-directional intra prediction modes. The encoder may select one of the plurality of intra prediction modes and its corresponding prediction error to encode the current block. The encoder may send an indication of the selected prediction mode and its corresponding prediction error to a decoder for decoding of the current block. The decoder may decode the current block by predicting the samples of the current block using the intra prediction mode indicated by the encoder and combining the predicted samples with the prediction error.

Figure 9:
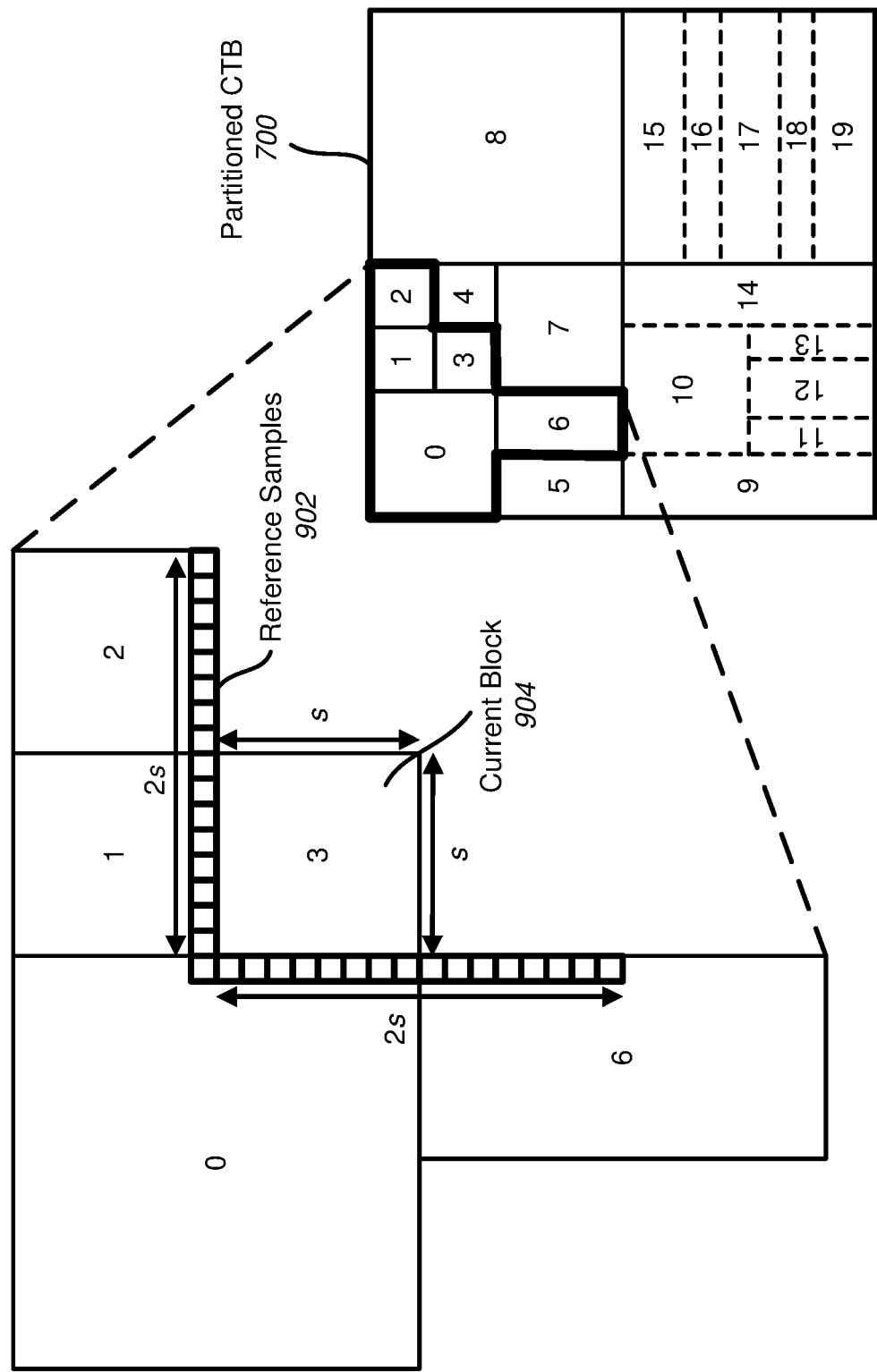
FIG. 9 illustrates an example set of reference samples determined for intra prediction of a current block being encoded or decoded in accordance with embodiments of the present disclosure.

FIG. 9 illustrates an example set of reference samples 902 determined for intra prediction of a current block 904 being encoded or decoded. In FIG. 9, current block 904 corresponds to block 3 of partitioned CTB 700 in FIG. 7. As explained above, the numeric labels 0-19 of the blocks of partitioned CTB 700 may correspond to the sequence order for encoding/decoding the blocks and are used as such in the example of FIG. 9.

Given current block 904 is of w×h samples in size, reference samples 902 may extend over 2w samples of the row immediately adjacent to the top-most row of current block 904, 2h samples of the column immediately adjacent to the left-most column of current block 904, and the top left neighboring corner sample to current block 904. In the example of FIG. 9, current block 904 is square, so w=h=s. For constructing the set of reference samples 902, available samples from neighboring blocks of current block 904 may be used. Samples may not be available for constructing the set of reference samples 902 if, for example, the samples would lie outside the picture of the current block, the samples are part of a different slice of the current block (where the concept of slices are used), and/or the samples belong to blocks that have been inter coded and constrained intra prediction is indicated. When constrained intra prediction is indicated, intra prediction may not be dependent on inter predicted blocks.

In addition to the above, samples that may not be available for constructing the set of reference samples 902 include samples in blocks that have not already been encoded and reconstructed at an encoder or decoded at a decoder based on the sequence order for encoding/decoding. This restriction may allow identical prediction results to be determined at both the encoder and decoder. In FIG. 9, samples from neighboring blocks 0, 1, and 2 may be available to construct reference samples 902 given that these blocks are encoded and reconstructed at an encoder and decoded at a decoder prior to coding of current block 904. This assumes there are no other issues, such as those mentioned above, preventing the availability of samples from neighboring blocks 0, 1, and 2. However, the portion of reference samples 902 from neighboring block 6 may not be available due to the sequence order for encoding/decoding.

Unavailable ones of reference samples 902 may be filled with available ones of reference samples 902. For example, an unavailable reference sample may be filled with a nearest available reference sample determined by moving in a clock-wise direction through reference samples 902 from the position of the unavailable reference. If no reference samples are available, reference samples 902 may be filled with the mid-value of the dynamic range of the picture being coded.

It should be noted that reference samples 902 may be filtered based on the size of current block 904 being coded and an applied intra prediction mode. It should be further noted that FIG. 9 illustrates only one exemplary determination of reference samples for intra prediction of a block. In some proprietary and industry video coding standards, reference samples may be determined in a different manner than discussed above. For example, multiple reference lines may be used in other instances, such as used in VVC.

After reference samples 902 are determined and optionally filtered, samples of current block 904 may be intra predicted based on reference samples 902. Most encoders/decoders support a plurality of intra prediction modes in accordance with one or more video coding standards. For example, HEVC supports 35 intra prediction modes, including a planar mode, a DC mode, and 33 angular modes. VVC supports 67 intra prediction modes, including a planar mode, a DC mode, and 65 angular modes. Planar and DC modes may be used to predict smooth and gradually changing regions of a picture. Angular modes may be used to predict directional structures in regions of a picture.

Figure 10A:
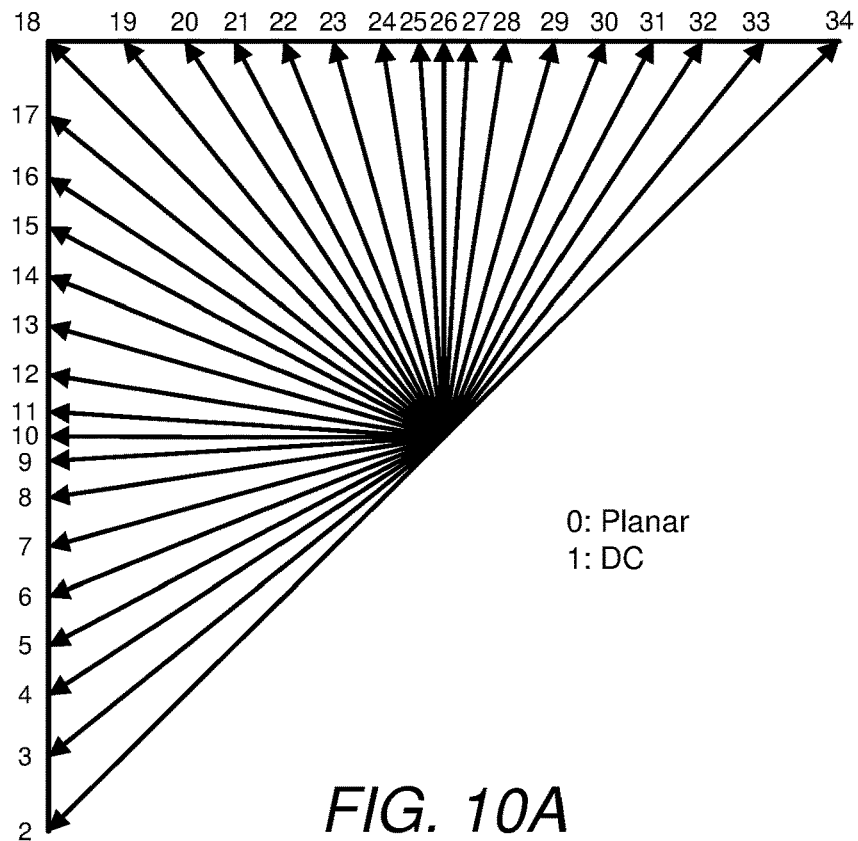
FIG. 10A illustrates the 35 intra prediction modes supported by HEVC in accordance with embodiments of the present disclosure.

FIG. 10A illustrates the 35 intra prediction modes supported by HEVC. The 35 intra prediction modes are identified by indices 0 to 34. Prediction mode 0 corresponds to planar mode. Prediction mode 1 corresponds to DC mode. Prediction modes 2-34 correspond to angular modes. Prediction modes 2-18 may be referred to as horizontal prediction modes because the principal source of prediction is in the horizontal direction. Prediction modes 19-34 may be referred to as vertical prediction modes because the principal source of prediction is in the vertical direction.

Figure 10B:
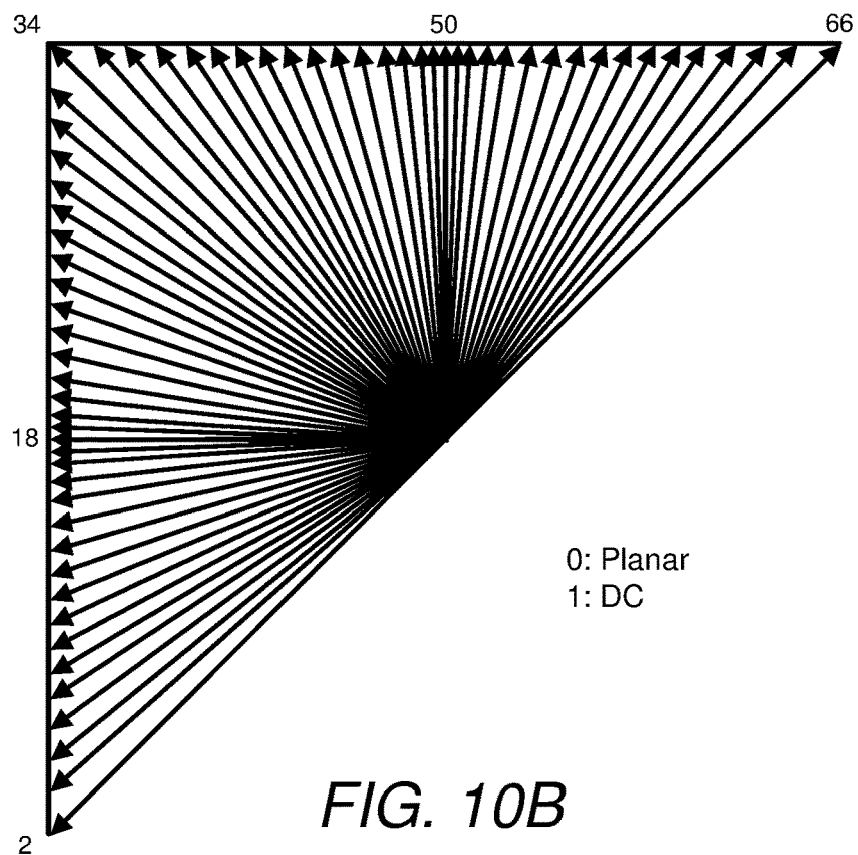
FIG. 10B illustrates the 67 intra prediction modes supported by HEVC in accordance with embodiments of the present disclosure.

FIG. 10B illustrates the 67 intra prediction modes supported by VVC. The 67 intra prediction modes are identified by indices 0 to 66. Prediction mode 0 corresponds to planar mode. Prediction mode 1 corresponds to DC mode. Prediction modes 2-66 correspond to angular modes. Prediction modes 2-34 may be referred to as horizontal prediction modes because the principal source of prediction is in the horizontal direction. Prediction modes 35-66 may be referred to as vertical prediction modes because the principal source of prediction is in the vertical direction. Because blocks in VVC may be non-square, some of the intra prediction modes illustrated in FIG. 10B may be adaptively replaced by wide-angle directions.

Figure 11:
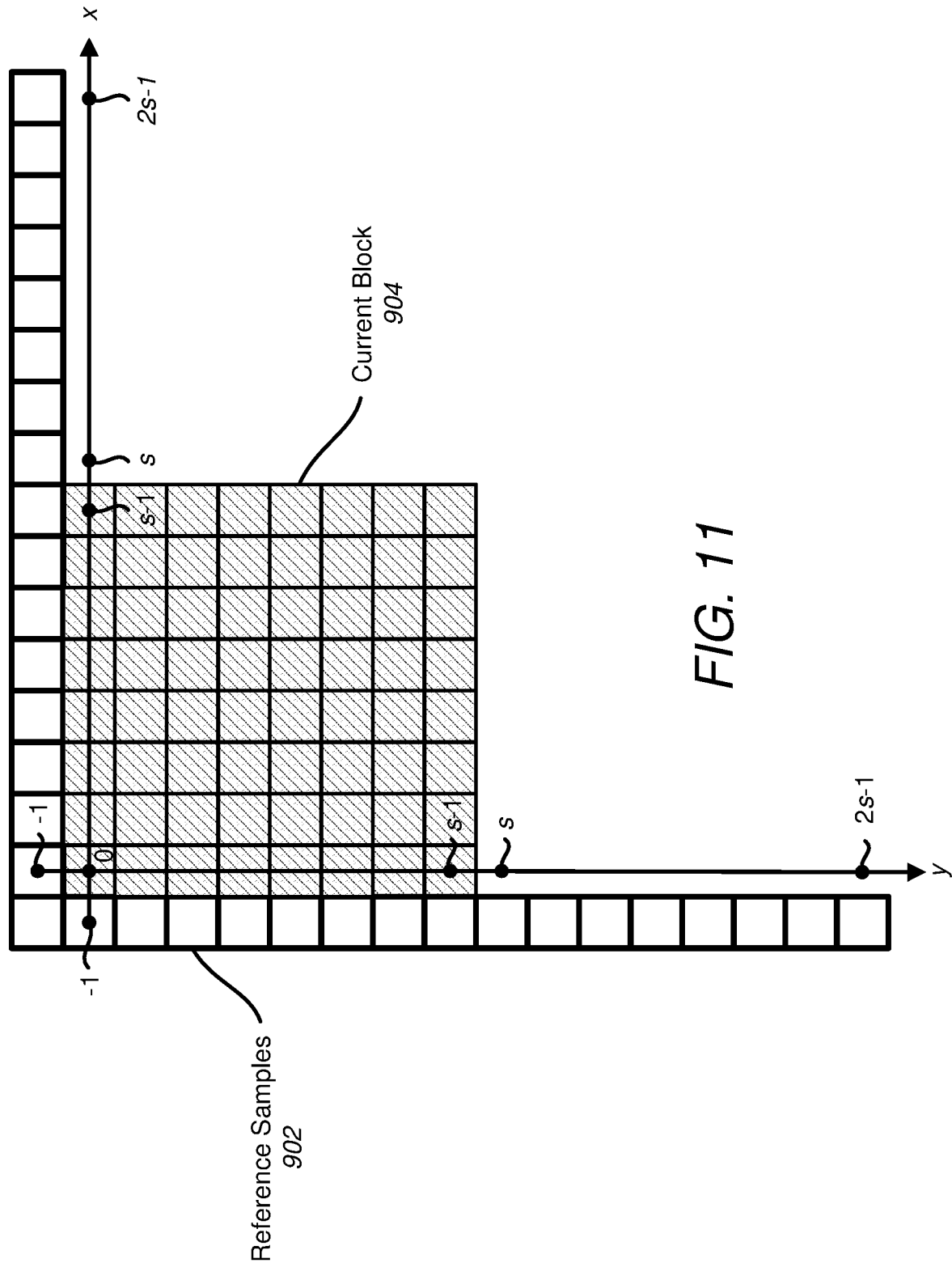
FIG. 11 illustrates the current block and reference samples from FIG. 9 in a two-dimensional x, y plane in accordance with embodiments of the present disclosure.
Figure 12:
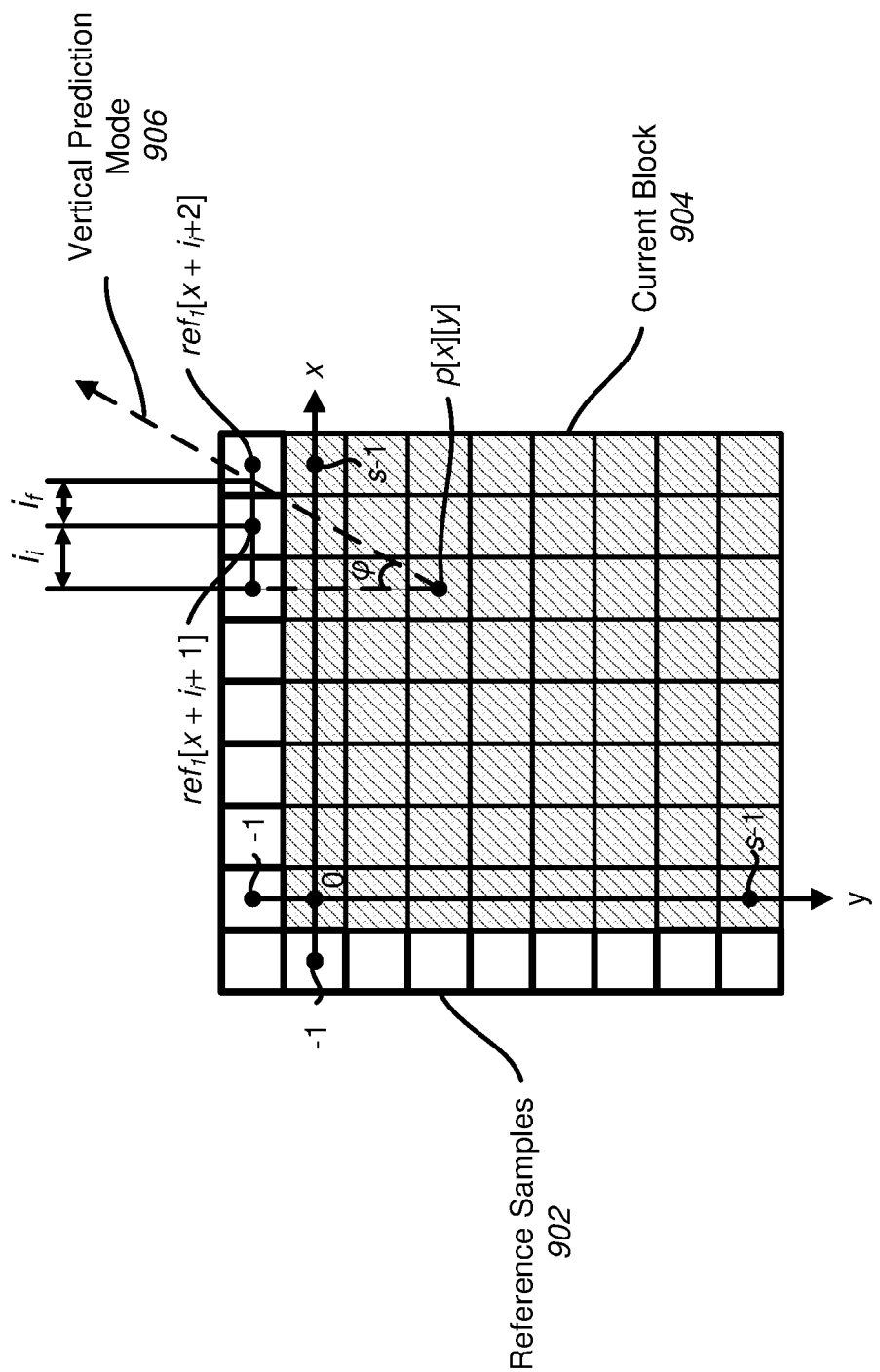
FIG. 12 illustrates an example angular mode prediction of the current block from FIG. 9 in accordance with embodiments of the present disclosure.

To further describe the application of intra prediction modes to determine a prediction of a current block, reference is made to FIGS. 11 and 12. In FIG. 11, current block 904 and reference samples 902 from FIG. 9 are shown in a two-dimensional x, y plane, where a sample may be referenced as p[x][y]. In order to simplify the prediction process, reference samples 902 may be placed in two, one-dimensional arrays. Reference samples 902 above current block 904 may be placed in the one-dimensional array $ref_1[x]$:

$$ref_1[x]=p[-1+x][-1],(x \geq 0) \quad (1)$$

Reference samples 902 to the left of current block 904 may be placed in the one-dimensional array $ref_2[x]$:

$$ref_2[y]=p[-1][-1+y],(y \geq 0) \quad (2)$$

For planar mode, a sample at location [x][y] in current block 904 may be predicted by calculating the mean of two interpolated values. The first of the two interpolated values may be based on a horizontal linear interpolation at location [x][y] in current block 904. The second of the two interpolated values may be based on a vertical linear interpolation at location [x][y] in current block 904. The predicted sample p[x][y] in current block 904 may be calculated as $$p[x][y] = \frac{1}{2 \cdot s}(h[x][y] + v[x][y] + s) \quad (3)$$

where $$h[x][y]=(s-x-1) \cdot ref_2[y]+(x+1) \cdot ref_1[s] \quad (4)$$

may be the horizonal linear interpolation at location [x][y] in current block 904 and $$v[x][y]=(s-y-1) \cdot ref_1[x]+(y+1) \cdot ref_2[s] \quad (5)$$

may be the vertical linear interpolation at location [x][y] in current block 904.

For DC mode, a sample at location [x][y] in current block 904 may be predicted by the mean of the reference samples 902. The predicted value sample p[x][y] in current block 904 may be calculated as $$p[x][y] = \frac{1}{2 \cdot s}\left(\sum_{x=0}^{s-1} ref_1[x] + \sum_{y=0}^{s-1} ref_2[y]\right) \quad (6)$$

For angular modes, a sample at location [x][y] in current block 904 may be predicted by projecting the location [x][y] in a direction specified by a given angular mode to a point on the horizontal or vertical line of samples comprising reference samples 902. The sample at location [x][y] may be predicted by interpolating between the two closest reference samples of the projection point if the projection does not fall directly on a reference sample. The direction specified by the angular mode may be given by an angle φ defined relative to the y-axis for vertical prediction modes (e.g., modes 19-34 in HEVC and modes 35-66 in VVC) and relative to the x-axis for horizontal prediction modes (e.g., modes 2-18 in HEVC and modes 2-34 in VVC).

FIG. 12 illustrates a prediction of a sample at location [x][y] in current block 904 for a vertical prediction mode 906 given by an angle φ. For vertical prediction modes, the location [x][y] in current block 904 is projected to a point (referred to herein as the "projection point") on the horizontal line of reference samples $ref_1[x]$. Reference samples 902 are only partially shown in FIG. 12 for ease of illustration. Because the projection point falls at a fractional sample position between two reference samples in the example of FIG. 12, the predicted sample p[x][y] in current block 904 may be calculated by linearly interpolating between the two reference samples as follows $$p[x][y]=(1-i_f) \cdot ref_1[x+i_i+1]+i_f \cdot ref_1[x+i_i+2] \quad (7)$$

where $i_i$ is the integer part of the horizontal displacement of the projection point relative to the location [x][y] and may calculated as a function of the tangent of the angle φ of the vertical prediction mode 906 as follows $$i_i=\lfloor(y+1)\cdot \tan \varphi\rfloor, \quad (8)$$

and $i_f$ is the fractional part of the horizontal displacement of the projection point relative to the location [x][y] and may be calculated as $$i_f=((y+1)\cdot \tan \varphi)-\lfloor(y+1)\cdot \tan \varphi\rfloor. \quad (9)$$

where $\lfloor \cdot \rfloor$ is the integer floor.

For horizontal prediction modes, the position [x][y] of a sample in current block 904 may be projected onto the vertical line of reference samples ref$_2$[y]. Sample prediction for horizontal prediction modes is given by:

$$p[x][y]=(1-i_f)\cdot \text{ref}_2[y+i_i+1]+i_f\cdot \text{ref}_2[y+i_i+2] \quad (10)$$

where $i_i$ is the integer part of the vertical displacement of the projection point relative to the location [x][y] and may be calculated as a function of the tangent of the angle φ of the horizontal prediction mode as follows $$i_i=\lfloor (x+1)\cdot \tan \varphi \rfloor \quad (11)$$

and $i_f$ is the fractional part of the vertical displacement of the projection point relative to the location [x][y] and may be calculated as $$i_f=((x+1)\cdot \tan \varphi)-\lfloor (x+1)\cdot \tan \varphi \rfloor. \quad (12)$$

where $\lfloor \cdot \rfloor$ is the integer floor.

The interpolation functions of (7) and (10) may be implemented by an encoder or decoder, such as encoder 200 in FIG. 2 or decoder 300 in FIG. 3, as a set of two-tap finite impulse response (FIR) filters. The coefficients of the two-tap FIR filters may be respectively given by (1−$i_f$) and $i_f$. In the above angular intra prediction examples, the predicted sample p[x][y] may be calculated with some predefined level of sample accuracy, such as 1/32 sample accuracy. For 1/32 sample accuracy, the set of two-tap FIR interpolation filters may comprise up to 32 different two-tap FIR interpolation filters—one for each of the 32 possible values of the fractional part of the projected displacement $i_f$. In other examples, different levels of sample accuracy may be used.

In an embodiment, the two-tap interpolation FIR filter may be used for predicting chroma samples. For luma samples, a different interpolation technique may be used. For example, for luma samples a four-tap FIR filter may be used to determine a predicted value of a luma sample. For example, the four tap FIR filter may have coefficients determined based on $i_f$, similar to the two-tap FIR filter. For 1/32 sample accuracy, a set of 32 different four-tap FIR filters may comprise up to 32 different four-tap FIR filters—one for each of the 32 possible values of the fractional part of the projected displacement $i_f$. In other examples, different levels of sample accuracy may be used. The set of four-tap FIR filters may be stored in a look-up table (LUT) and referenced based on $i_f$. The value of the predicted sample p[x][y], for vertical prediction modes, may be determined based on the four-tap FIR filter as follows:

$$p[x][y]=\Sigma_{i=0}^{3}fT[i]*\text{ref}[x+\text{iIdx}+i] \quad (13)$$

where ft[i], i=0 . . . 0.3, are the filter coefficients. The value of the predicted sample p[x][y], for horizontal prediction modes, may be determined based on the four-tap FIR filter as follows:

$$p[x][y]=\Sigma_{i=0}^{3}fT[i]*\text{ref}[y+\text{iIdx}+i]. \quad (14)$$

It should be noted that supplementary reference samples may be constructed for the case where the position [x][y] of a sample in current block 904 to be predicted is projected to a negative x coordinate, which happens with negative vertical prediction angles φ. The supplementary reference samples may be constructed by projecting the reference samples in ref$_2$ [y] in the vertical line of reference samples 902 to the horizontal line of reference samples 902 using the negative vertical prediction angle φ. Supplemental reference samples may be similarly for the case where the position [x][y] of a sample in current block 904 to be predicted is projected to a negative y coordinate, which happens with negative horizontal prediction angles φ. The supplementary reference samples may be constructed by projecting the reference samples in ref$_1$ [x] on the horizontal line of reference samples 902 to the vertical line of reference samples 902 using the negative horizontal prediction angle φ.

An encoder may predict the samples of a current block being encoded, such as current block 904, for a plurality of intra prediction modes as explained above. For example, the encoder may predict the samples of the current block for each of the 35 intra prediction modes in HEVC or 67 intra prediction modes in VVC. For each intra prediction mode applied, the encoder may determine a prediction error for the current block based on a difference (e.g., sum of squared differences (SSD), sum of absolute differences (SAD), or sum of absolute transformed differences (SATD)) between the prediction samples determined for the intra prediction mode and the original samples of the current block. The encoder may select one of the intra prediction modes to encode the current block based on the determined prediction errors. For example, the encoder may select an intra prediction mode that results in the smallest prediction error for the current block. In another example, the encoder may select the intra prediction mode to encode the current block based on a rate-distortion measure (e.g., Lagrangian rate-distortion cost) determined using the prediction errors. The encoder may send an indication of the selected intra prediction mode and its corresponding prediction error to a decoder for decoding of the current block.

Similar to an encoder, a decoder may predict the samples of a current block being decoded, such as current block 904, for an intra prediction modes as explained above. For example, the decoder may receive an indication of an angular intra prediction mode from an encoder for a block. The decoder may construct a set of reference samples and perform intra prediction based on the angular intra prediction mode indicated by the encoder for the block in a similar manner as discussed above for the encoder. The decoder would add the predicted values of the samples of the block to a residual of the block to reconstruct the block. In another embodiment, the decoder may not receive an indication of an angular intra prediction mode from an encoder for a block. Instead, the decoder may determine an intra prediction mode through other, decoder-side means.

Although the description above was primarily made with respect to intra prediction modes in HEVC and VVC, it will be understood that the techniques of the present disclosure described above and further below may be applied to other intra prediction modes, including those of other video coding standards like VP8, VP9, AV1, and the like.

As explained above, intra prediction may exploit correlations between spatially neighboring samples in the same picture of a video sequence to perform video compression. Inter prediction is another coding tool that may be used to exploit correlations in the time domain between blocks of samples in different pictures of the video sequence to perform video compression. In general, an object may be seen across multiple pictures of a video sequence. The object may move (e.g., by some translation and/or affine motion) or remain stationary across the multiple pictures. A current block of samples in a current picture being encoded may therefore have a corresponding block of samples in a previously decoded picture that accurately predicts the current block of samples. The corresponding block of samples may be displaced from the current block of samples due to movement of an object, represented in both blocks, across the respective pictures of the blocks. The previously decoded picture may be referred to as a reference picture and the corresponding block of samples in the reference picture may be referred to as a reference block or motion compensated prediction. An encoder may use a block matching technique to estimate the displacement (or motion) and determine the reference block in the reference picture.

Similar to intra prediction, once a prediction for a current block is determined and/or generated using inter prediction, an encoder may determine a difference between the current block and the prediction. The difference may be referred to as a prediction error or residual. The encoder may then store and/or signal in a bitstream the prediction error and other related prediction information for decoding or other forms of consumption. A decoder may decode the current block by predicting the samples of the current block using the prediction information and combining the predicted samples with the prediction error.

Figure 13A:
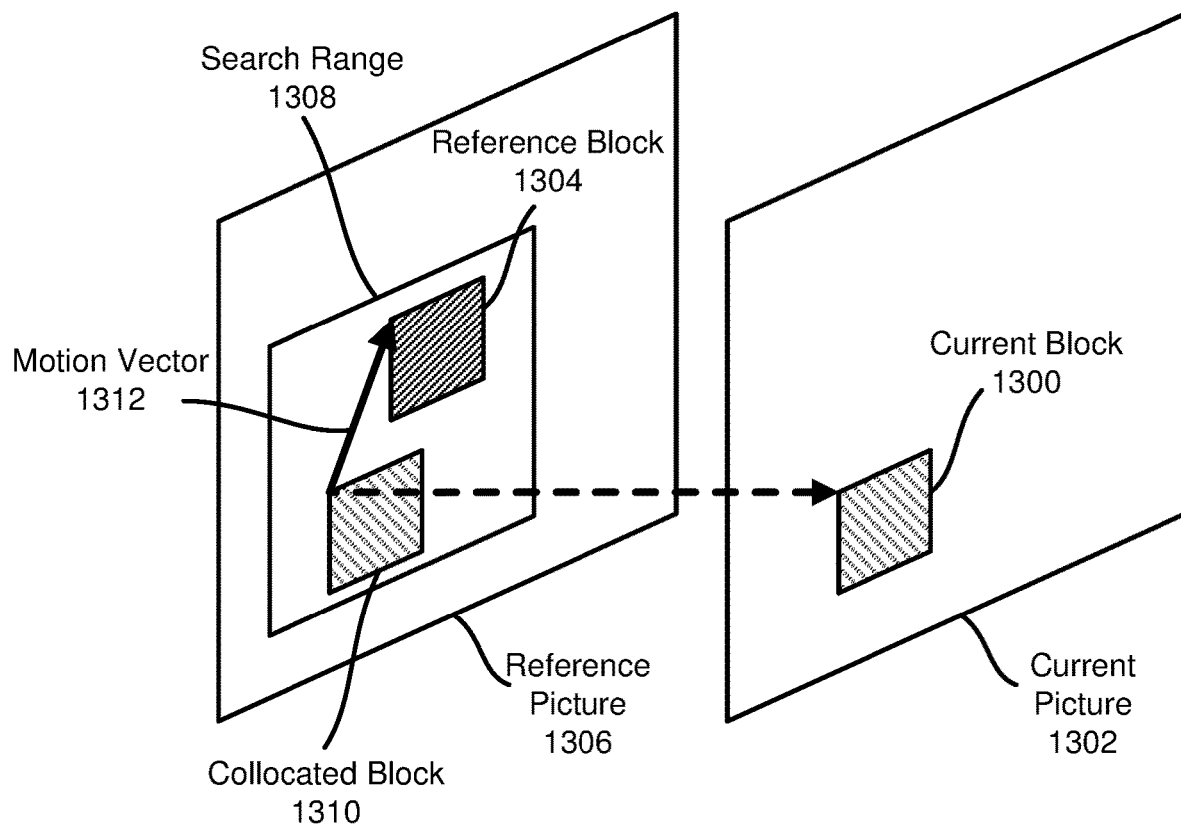
FIG. 13A illustrates an example of inter prediction performed for a current block in a current picture being encoded in accordance with embodiments of the present disclosure.

FIG. 13A illustrates an example of inter prediction performed for a current block 1300 in a current picture 1302 being encoded. An encoder, such as encoder 200 in FIG. 2, may perform inter prediction to determine and/or generate a reference block 1304 in a reference picture 1306 to predict current block 1300. Reference pictures, like reference picture 1306, are prior decoded pictures available at the encoder and decoder. Availability of a prior decoded picture may depend on whether the prior decoded picture is available in a decoded picture buffer at the time current block 1300 is being encoded or decoded. The encoder may, for example, search one or more reference pictures for a reference block that is similar to current block 1300. The encoder may determine a "best matching" reference block from the blocks tested during the searching process as reference block 1304. The encoder may determine that reference block 1304 is the best matching reference block based on one or more cost criterion, such as a rate-distortion criterion (e.g., Lagrangian rate-distortion cost). The one or more cost criterion may be based on, for example, a difference (e.g., sum of squared differences (SSD), sum of absolute differences (SAD), or sum of absolute transformed differences (SATD)) between the prediction samples of reference block 1304 and the original samples of current block 1300.

The encoder may search for reference block 1304 within a reference region 1308. Reference region 1308 may be positioned around the collocated position (or block) 1310 of current block 1300 in reference picture 1306. In some instances, reference region 1308 may at least partially extend outside of reference picture 1306. When extending outside of reference picture 1306, constant boundary extension may be used such that the values of the samples in the row or column of reference picture 1306, immediately adjacent to the portion of reference region 1308 extending outside of reference picture 1306, are used for the "sample" locations outside of reference picture 1306. All or a subset of potential positions within reference region 1308 may be searched for reference block 1304. The encoder may utilize any one of a number of different search implementations to determine and/or generate reference block 1304. For example, the encoder may determine a set of a candidate search positions based on motion information of neighboring blocks to current block 1300.

One or more reference pictures may be searched by the encoder during inter prediction to determine and/or generate the best matching reference block. The reference pictures searched by the encoder may be included in one or more reference picture lists. For example, in HEVC and VVC, two reference picture lists may be used, a reference picture list 0 and a reference picture list 1. A reference picture list may include one or more pictures. Reference picture 1306 of reference block 1304 may be indicated by a reference index pointing into a reference picture list comprising reference picture 1306.

Figure 13B:
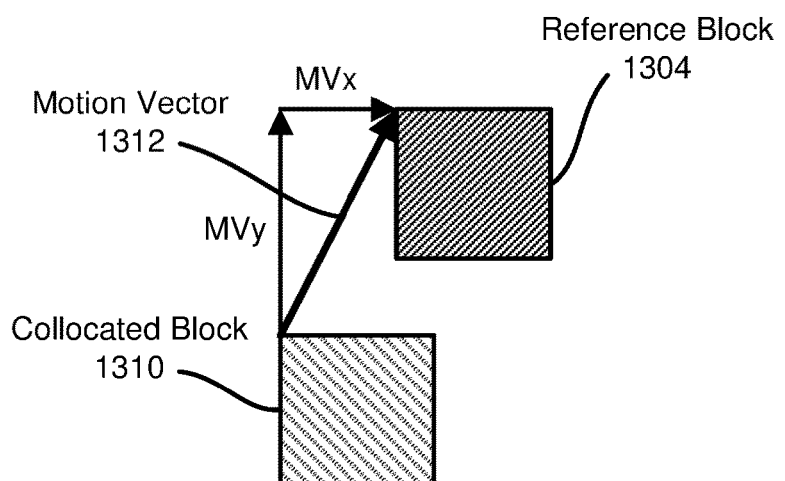
FIG. 13B illustrates an example horizontal component and vertical component of a motion vector in accordance with embodiments of the present disclosure.

The displacement between reference block 1304 and current block 1300 may be interpreted as an estimate of the motion between reference block 1304 and current block 1300 across their respective pictures. The displacement may be represented by a motion vector 1312. For example, motion vector 1312 may be indicated by a horizontal component ($MV_x$) and a vertical component ($MV_y$) relative to the position of current block 1300. FIG. 13B illustrates the horizontal component and vertical component of motion vector 1312. A motion vector, such as motion vector 1312, may have fractional or integer resolution. A motion vector with fractional resolution may point between two samples in a reference picture to provide a better estimation of the motion of current block 1300. For example, a motion vector may have ½, ¼, ⅛, 1/16, or 1/32 fractional sample resolution. When a motion vector points to a non-integer sample value in the reference picture, interpolation between samples at integer positions may be used to generate the reference block and its corresponding samples at fractional positions. The interpolation may be performed by a filter with two or more taps.

Once reference block 1304 is determined and/or generated for current block 1300 using inter prediction, the encoder may determine a difference (e.g., a corresponding sample-by-sample difference) between reference block 1304 and current block 1300. The difference may be referred to as a prediction error or residual. The encoder may then store and/or signal in a bitstream the prediction error and the related motion information for decoding or other forms of consumption. The motion information may include motion vector 1312 and a reference index pointing into a reference picture list comprising reference picture 1306. In other instances, the motion information may include an indication of motion vector 1312 and an indication of the reference index pointing into the reference picture list comprising reference picture 1306. A decoder may decode current block 1300 by determining and/or generating reference block 1304, which forms the prediction of current block 1300, using the motion information and combining the prediction with the prediction error.

Figure 14:
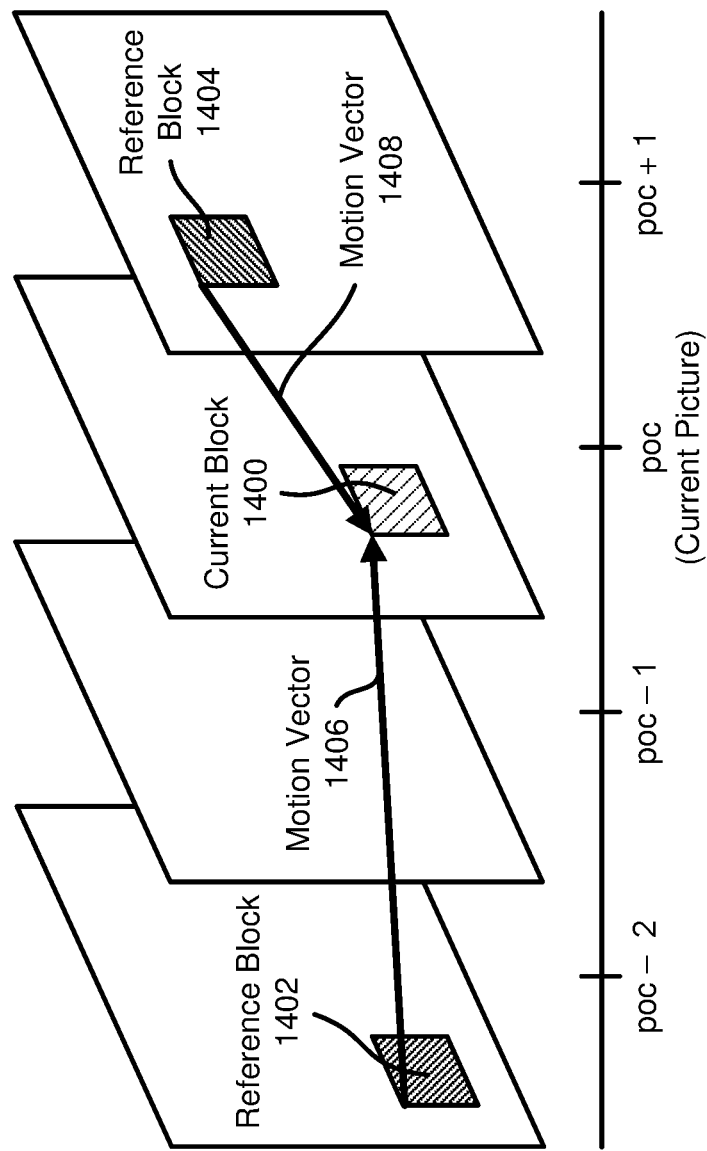
FIG. 14 illustrates an example of bi-prediction, performed for a current block in accordance with embodiments of the present disclosure.

In FIG. 13A, inter prediction is performed using one reference picture 1306 as the source of the prediction for current block 1300. Because the prediction for current block 1300 comes from a single picture, this type of inter prediction is referred to as uni-prediction. FIG. 14 illustrates another type of inter prediction, referred to as bi-prediction, performed for a current block 1400. In bi-prediction, the source of the prediction for a current block 1400 comes from two pictures. Bi-prediction may be useful, for example, where the video sequence comprises fast motion, camera panning or zooming, or scene changes. Bi-prediction may also be useful to capture fade outs of one scene or fade outs from one scene to another, where two pictures are effectively displayed simultaneously with different levels of intensity.

Whether uni-prediction or both uni-prediction and bi-prediction are available for performing inter prediction may depend on a slice type of current block 1400. For P slices, only uni-prediction may be available for performing inter prediction. For B slices, either uni-prediction or bi-prediction may be used. When uni-prediction is performed, an encoder may determine and/or generate a reference block for predicting current block 1400 from reference picture list 0. When bi-prediction is performed, an encoder may determine and/or generate a first reference block for predicting current block 1400 from reference picture list 0 and determine and/or generate a second reference block for predicting current block 1400 from reference picture list 1.

In FIG. 14, inter-prediction is performed using bi-prediction, where two reference blocks 1402 and 1404 are used to predict current block 1400. Reference block 1402 may be in a reference picture of one of reference picture list 0 or 1, and reference block 1404 may be in a reference picture of the other one of reference picture list 0 or 1. As shown in FIG. 14, reference block 1402 is in a picture that precedes the current picture of current block 1400 in terms of picture order count (POC), and reference block 1402 is in a picture that proceeds the current picture of current block 1400 in terms of POC. In other examples, the reference pictures may both precede or proceed the current picture in terms of POC. POC is the order in which pictures are output from, for example, a decoded picture buffer and is the order in which pictures are generally intended to be displayed. However, it should be noted that pictures that are output are not necessarily displayed but may undergo different processing or consumption, such as transcoding. In other examples, the two reference blocks determined and/or generated using bi-prediction may come from the same reference picture. In such an instance, the reference picture may be included in both reference picture list 0 and reference picture list 1.

A configurable weight and offset value may be applied to the one or more inter prediction reference blocks. An encoder may enable the use of weighted prediction using a flag in a picture parameter set (PPS) and signal the weighting and offset parameters in the slice segment header for the current block. Different weight and offset parameters may be signaled for luma and chroma components.

Once reference blocks 1402 and 1404 are determined and/or generated for current block 1400 using inter prediction, the encoder may determine a difference between current block 1400 and each of reference blocks 1402 and 1404. The differences may be referred to as prediction errors or residuals. The encoder may then store and/or signal in a bitstream the prediction errors and their respective related motion information for decoding or other forms of consumption. The motion information for reference block 1402 may include motion vector 1406 and the reference index pointing into the reference picture list comprising the reference picture of reference block 1402. In other instances, the motion information for reference block 1402 may include an indication of motion vector 1406 and an indication of the reference index pointing into the reference picture list comprising reference picture 1402. The motion information for reference block 1404 may include motion vector 1408 and the reference index pointing into the reference picture list comprising the reference picture of reference block 1404. In other instances, the motion information for reference block 1404 may include an indication of motion vector 1408 and an indication of the reference index pointing into the reference picture list comprising reference picture 1404. A decoder may decode current block 1400 by determining and/or generating reference blocks 1402 and 1404, which together form the prediction of current block 1400, using their respective motion information and combining the predictions with the prediction errors.

In HEVC, VVC, and other video compression schemes, motion information may be predictively coded before being stored or signaled in a bit stream. The motion information for a current block may be predictively coded based on the motion information of neighboring blocks of the current block. In general, the motion information of the neighboring blocks is often correlated with the motion information of the current block because the motion of an object represented in the current block is often the same or similar to the motion of objects in the neighboring blocks. Two of the motion information prediction techniques in HEVC and VVC include advanced motion vector prediction (AMVP) and inter prediction block merging.

An encoder, such as encoder 200 in FIG. 2, may code a motion vector using the AMVP tool as a difference between the motion vector of a current block being coded and a motion vector predictor (MVP). An encoder may select the MVP from a list of candidate MVPs. The candidate MVPs may come from previously decoded motion vectors of neighboring blocks in the current picture of the current block or blocks at or near the collocated position of the current block in other reference pictures. Both the encoder and decoder may generate or determine the list of candidate MVPs.

After the encoder selects an MVP from the list of candidate MVPs, the encoder may signal, in a bitstream, an indication of the selected MVP and a motion vector difference (MVD). The encoder may indicate the selected MVP in the bitstream by an index pointing into the list of candidate MVPs. The MVD may be calculated based on the difference between the motion vector of the current block and the selected MVP. For example, for a motion vector represented by a horizontal component ($MV_x$) and a vertical displacement ($MV_y$) relative to the position of the current block being coded, the MVD may be represented by two components calculated as follows:

$$MVD_x = MV_x - MVP_x \qquad (15)$$

$$MVD_y = MV_y - MVP_y \qquad (16)$$

where $MVD_x$ and $MVD_y$ respectively represent the horizontal and vertical components of the MVD, and $MVP_x$ and $MVP_y$ respectively represent the horizontal and vertical components of the MVP. A decoder, such as decoder 300 in FIG. 3, may decode the motion vector by adding the MVD to the MVP indicated in the bitstream. The decoder may then decode the current block by determining and/or generating the reference block, which forms the prediction of the current block, using the decoded motion vector and combining the prediction with the prediction error.

Figure 15A:
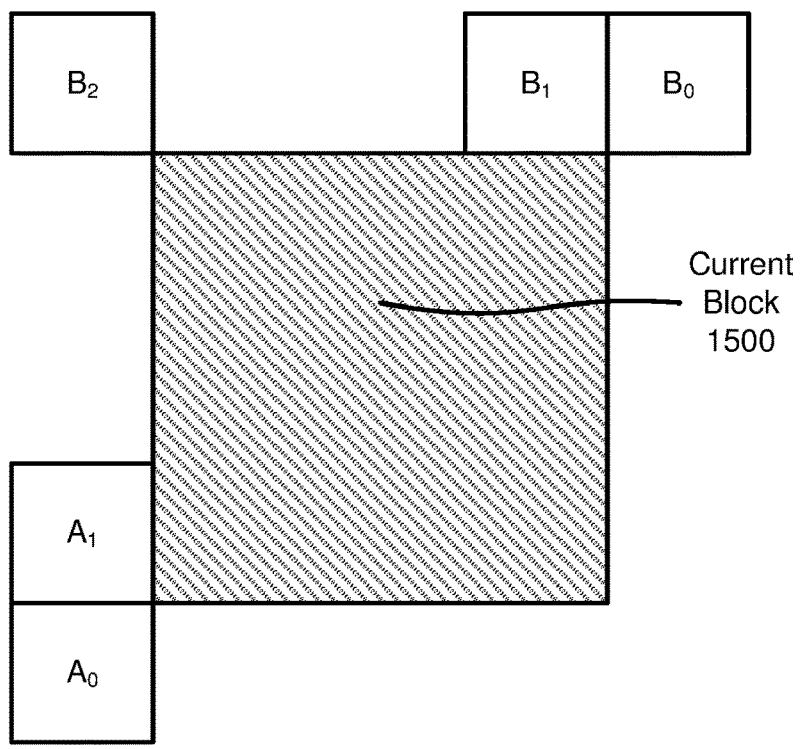
FIG. 15A illustrates an example location of five spatial candidate neighboring blocks relative to a current block being coded in accordance with embodiments of the present disclosure.
Figure 15B:
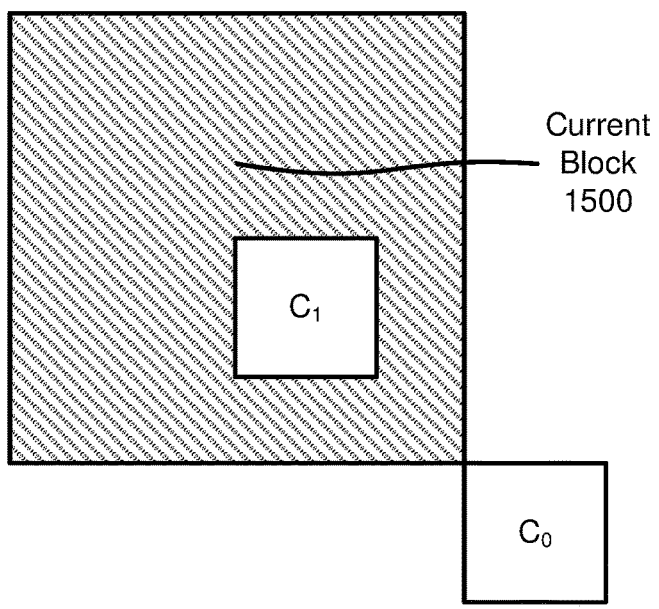
FIG. 15B illustrates an example location of two temporal, co-located blocks relative to a current block being coded in accordance with embodiments of the present disclosure.

In HEVC and VVC, the list of candidate MVPs for AMVP may comprise two candidates referred to as candidates A and B. Candidates A and B may include up to two spatial candidate MVPs derived from five spatial neighboring blocks of the current block being coded, one temporal candidate MVP derived from two temporal, co-located blocks when both spatial candidate MVPs are not available or are identical, or zero motion vectors when the spatial, temporal, or both candidates are not available. FIG. 15A illustrates the location of the five spatial candidate neighboring blocks relative to a current block 1500 being encoded. The five spatial candidate neighboring blocks are respectively denoted $A_0$, $A_1$, $B_0$, $B_1$, and $B_2$. FIG. 15B illustrates the location of the two temporal, co-located blocks relative to current block 1500 being coded. The two temporal, co-located blocks are denoted $C_0$ and $C_1$ and are included in a reference picture that is different from the current picture of current block 1500.

An encoder, such as encoder 200 in FIG. 2, may code a motion vector using the inter prediction block merging tool also referred to as merge mode. Using merge mode, the encoder may reuse the same motion information of a neighboring block for inter prediction of a current block. Because the same motion information of a neighboring block is used, no MVD needs to be signaled and the signaling overhead for signaling the motion information of the current block may be small in size. Similar to AMVP, both the encoder and decoder may generate a candidate list of motion information from neighboring blocks of the current block. The encoder may then determine to use (or inherit) the motion information of one neighboring block's motion information in the candidate list for predicting the motion information of the current block being coded. The encoder may signal, in the bit stream, an indication of the determined motion information from the candidate list. For example, the encoder may signal an index pointing into the list of candidate motion information to indicate the determined motion information.

In HEVC and VVC, the list of candidate motion information for merge mode may comprise up to four spatial merge candidates that are derived from the five spatial neighboring blocks used in AMVP as shown in FIG. 15A, one temporal merge candidate derived from two temporal, co-located blocks used in AMVP as shown in FIG. 15B, and additional merge candidates including bi-predictive candidates and zero motion vector candidates.

It should be noted that inter prediction may be performed in other ways and variants than those described above. For example, motion information prediction techniques other than AMVP and merge mode are possible. In addition, although the description above was primarily made with respect to inter prediction modes in HEVC and VVC, it will be understood that the techniques of the present disclosure described above and further below may be applied to other inter prediction modes, including those of other video coding standards like VP8, VP9, AV1, and the like. In addition, history based motion vector prediction (HMVP), combined intra/inter prediction mode (CIIP), and merge mode with motion vector difference (MMVD) as described in VVC may also be performed and are within the scope of the present disclosure.

In inter prediction, a block matching technique may be applied to determine a reference block in a different picture than the current block being encoded. Block matching techniques have also been applied to determine a reference block in the same picture as a current block being encoded. However, it has been determined that for camera-captured videos, a reference block in the same picture as the current block determined using block matching may often not accurately predict the current block. For screen content video this is generally not the case. Screen content video may include, for example, computer generated text, graphics, and animation. Within screen content, there is often repeated patterns (e.g., repeated patterns of text and graphics) within the same picture. Therefore, a block matching technique applied to determine a reference block in the same picture as a current block being encoded may provide efficient compression for screen content video.

HEVC and VVC both include a prediction technique to exploit the correlation between blocks of samples within the same picture of screen content video. This technique is referred to as intra block (IBC) or current picture referencing (CPR). Similar to inter prediction, an encoder may apply a block matching technique to determine a displacement vector (referred to as a block vector (BV)) that indicates the relative displacement from the current block to a reference block (or intra block compensated prediction) that "best matches" the current block. The encoder may determine the best matching reference block from blocks tested during a searching process similar to inter prediction. The encoder may determine that a reference block is the best matching reference block based on one or more cost criterion, such as a rate-distortion criterion (e.g., Lagrangian rate-distortion cost). The one or more cost criterion may be based on, for example, a difference (e.g., sum of squared differences (SSD), sum of absolute differences (SAD), sum of absolute transformed differences (SATD), or difference determined based on a hash function) between the prediction samples of the reference block and the original samples of the current block. A reference block may correspond to prior decoded blocks of samples of the current picture. The reference block may comprise decoded blocks of samples of the current picture prior to being processed by in-loop filtering operations, like deblocking or SAO filtering. FIG. 16 illustrates an example of IBC applied for screen content. The rectangular portions with arrows beginning at their boundaries are current blocks being encoded and the rectangular portions that the arrows point to are the reference blocks for predicting the current blocks.

Once a reference block is determined and/or generated for a current block using IBC, the encoder may determine a difference (e.g., a corresponding sample-by-sample difference) between the reference block and the current block. The difference may be referred to as a prediction error or residual. The encoder may then store and/or signal in a bitstream the prediction error and the related prediction information for decoding or other forms of consumption. The prediction information may include a BV. In other instances, the prediction information may include an indication of the BV. A decoder, such as decoder 300 in FIG. 3, may decode the current block by determining and/or generating the reference block, which forms the prediction of the current block, using the prediction information and combining the prediction with the prediction error.

In HEVC, VVC, and other video compression schemes, a BV may be predictively coded before being stored or signaled in a bit stream. The BV for a current block may be predictively coded based on the BV of neighboring blocks of the current block. For example, an encoder may predictively code a BV using the merge mode as explained above for inter prediction or a similar technique as AMVP also explained above for inter prediction. The technique similar to AMVP may be referred to as BV prediction and difference coding.

For BV prediction and difference coding, an encoder, such as encoder 200 in FIG. 2, may code a BV as a difference between the BV of a current block being coded and a BV predictor (BVP). An encoder may select the BVP from a list of candidate BVPs. The candidate BVPs may come from previously decoded BVs of neighboring blocks of the current block in the current picture. Both the encoder and decoder may generate or determine the list of candidate BVPs.

After the encoder selects a BVP from the list of candidate BVPs, the encoder may signal, in a bitstream, an indication of the selected BVP and a BV difference (BVD). The encoder may indicate the selected BVP in the bitstream by an index pointing into the list of candidate BVPs. The BVD may be calculated based on the difference between the BV of the current block and the selected BVP. For example, for a BV represented by a horizontal component ($BV_x$) and a vertical component ($BV_y$) relative to the position of the current block being coded, the BVD may represented by two components calculated as follows:

$$BVD_x = BV_x - BVP_x \qquad (17)$$

$$BVD_y = BV_y - BVP_y \qquad (18)$$

where $BVD_x$ and $BVD_y$ respectively represent the horizontal and vertical components of the BVD, and $BVP_x$ and $BVP_y$ respectively represent the horizontal and vertical components of the BVP. A decoder, such as decoder 300 in FIG. 3, may decode the BV by adding the BVD to the BVP indicated in the bitstream. The decoder may then decode the current block by determining and/or generating the reference block, which forms the prediction of the current block, using the decoded BV and combining the prediction with the prediction error.

In HEVC and VVC, the list of candidate BVPs may comprise two candidates referred to as candidates A and B. Candidates A and B may include up to two spatial candidate BVPs derived from five spatial neighboring blocks of the current block being encoded, or one or more of the last two coded BVs when spatial neighboring candidates are not available (e.g., because they are coded in intra or inter mode). The location of the five spatial candidate neighboring blocks relative to a current block being encoded using IBC are the same as those shown in FIG. 15A for inter prediction. The five spatial candidate neighboring blocks are respectively denoted $A_0$, $A_1$, $B_0$, $B_1$, and $B_2$.

In HEVC, VVC, and other video coding implementations, an encoder signals information of a coded video sequence in a bitstream based on syntax structures, and a decoder extracts the information of a coded video sequence from a bitstream based on syntax structures. A syntax structure represents a logical entity of the information coded in the bitstream. These logical entities may include, for example, parameter sets, slices, and coding tree units. Within HEVC and VCC, the syntax structures are specified by syntax tables that indicate variations of the syntax structures. Syntax structures may comprise syntax elements. Syntax elements may occur as flags, values, one-dimensional arrays, or multi-dimensional arrays. For arrays, one or more indices may be used to reference a specific element within the array. The occurrence of a syntax element within a syntax structure may be conditional. For example, the occurrence of a syntax element may be conditional on the value of one or more other syntax elements or values determined during the decoding process.

In existing technologies, IBC prediction information (e.g., BVP and BVD) may be signaled in and extracted from a bitstream in the same or similar manner as prediction information for inter prediction. For example, IBC prediction information may be included in and extracted from a bitstream based on the same or similar syntax structures as used for the prediction information of inter prediction. Using the same or similar syntax structures for IBC mode and inter prediction may simplify the encoding and decoding process. However, such an approach may overlook differences between IBC mode and inter prediction. For example, the reference region of IBC mode for determining a best matching reference block may be more limited than inter prediction within a picture. This difference and others may allow IBC prediction information to be more efficiently signaled in a bitstream than what is possible with prediction information for inter prediction. However, because IBC mode may use the same or similar syntax structures as inter prediction, these signaling efficiencies may not be realized.

Embodiments of the present disclosure are related to an approach for decreasing the signaling overhead of IBC prediction information. Embodiments of the present disclosure may decrease the signaling overhead by exploiting a reference region constraint of IBC mode, for determining a best matching reference block, to conditionally signal IBC prediction information. For example, embodiments may exploit a reference region constraint of IBC mode to conditionally signal one or both signs of directional components (e.g., horizontal and vertical components) of a BVD. Embodiments of the present disclosure may conditionally signal the sign of one or both directional components of the BVD in a bitstream based on whether a decoder may determine the signs of the directional components of the BVD without an explicit indication of the signs in the bitstream. Because signaling of one or both signs of the directional components of the BVD may be eliminated in some instances, the signaling overhead of IBC prediction information may be decreased. These and other features of the present disclosure are described further below.

Figure 17:
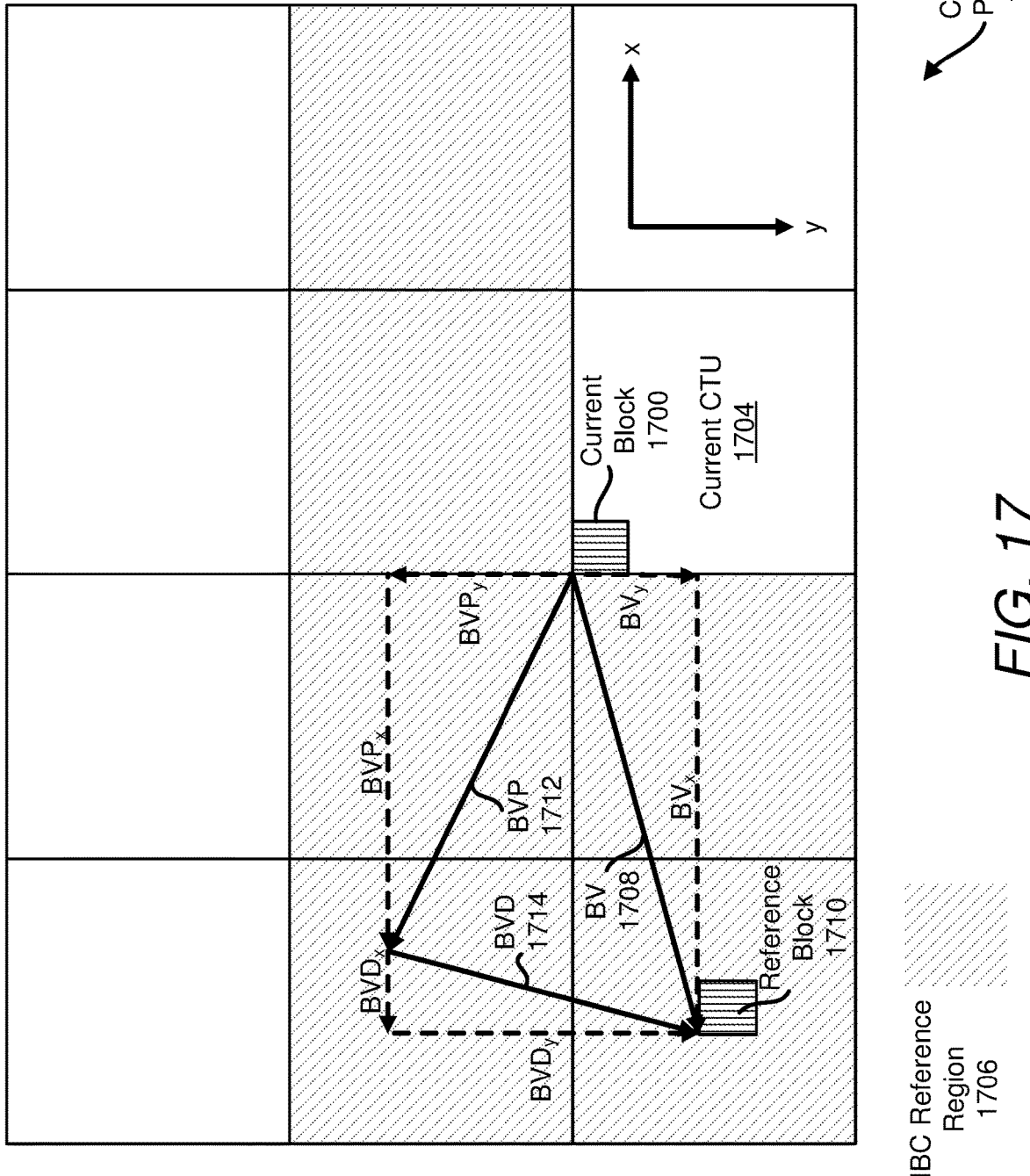
FIG. 17 illustrates an example IBC coding in accordance with embodiments of the present disclosure.

FIG. 17 illustrates an example IBC coding in accordance with embodiments of the present disclosure. In FIG. 17, an encoder, such as encoder 200 in FIG. 2, uses IBC mode to code a current block 1700 in a current picture (or portion of a current picture) 1702. Current block 1700 may be a prediction block (PB) or coding block (CB) within a coding tree unit (CTU) 1704. Unlike inter prediction that searches for a reference block in a prior decoded picture that is different than the picture of the current block being encoded, IBC searches for a reference block in the same, current picture as the current block. As a result, only part of the current picture may be available for searching for a reference block in IBC. For example, only the part of the current picture that has been decoded prior to the encoding of the current block. This may ensure the encoding and decoding systems can produce identical results but also limits the IBC reference region.

In HEVC, VVC, and other video compression standards, blocks may be scanned from left-to-right, top-to-bottom using a z-scan to form the sequence order for encoding/decoding. Based on the z-scan, the CTUs (represented by the large, square tiles in FIG. 17) to the left and in the row immediately above current CTU 1704 may be encoded/decoded prior to current CTU 1704 and current block 1700. Therefore, the samples of these CTUs (shown with hatching in FIG. 17) may form an exemplary IBC reference region 1706 for determining a reference block to predict current block 1700. In other video encoders and decoders, a different sequence order for encoding/decoding may be used, which may influence IBC reference region 1706 accordingly.

In addition to the encoding/decoding sequence order, one or more additional reference region constraints may be placed on IBC reference region 1706. For example, IBC reference region 1706 may be constrained to CTUs based on a parallel processing approach, like tiles or wavefront parallel processing (WPP). Tiles may be used as part of a picture partitioning process for flexibly subdividing a picture into rectangular regions of CTUs such that coding dependencies between CTUs of different tiles are not allowed. WPP may be similarly used as part of a picture partitioning process for partitioning a picture into CTU rows such that dependencies between CTUs of different partitions are not allowed. Each of these tools may enable parallel processing of the picture partitions. The top row of CTUs shown in FIG. 17 may not be part of IBC reference region 1706 due to one of these parallel processing approaches.

The encoder may apply a block matching technique to determine a block vector (BV) 1708 that indicates the relative displacement from current block 1700 to a reference block 1710 (or intra block compensated prediction) within IBC reference region 1706 that "best matches" current block 1700. IBC reference region 1706 is a constraint placed on BV 1708. BV 1708 is constrained by IBC reference region 1706 to indicate a displacement from current block 1700 to a reference block that is within IBC reference region 1706. The encoder may determine the best matching reference block from blocks tested, within IBC reference region 1706, during a searching process. The encoder may determine that a reference block is the best matching reference block based on one or more cost criterion, such as a rate-distortion criterion (e.g., Lagrangian rate-distortion cost). The one or more cost criterion may be based on, for example, a difference (e.g., sum of squared differences (SSD), sum of absolute differences (SAD), sum of absolute transformed differences (SATD), or difference determined based on a hash function) between the prediction samples of the reference block and the original samples of the current block. Reference block 1710 may comprise decoded (or reconstructed) samples of current picture 1702 prior to being processed by in-loop filtering operations, like deblocking or SAO filtering.

Once reference block 1710 is determined and/or generated for current block 1700 using IBC, the encoder may determine or use a difference (e.g., a corresponding sample-by-sample difference) between current block 1700 and reference block 1710. The difference may be referred to as a prediction error or residual. The encoder may then store and/or signal in a bitstream the prediction error and the related prediction information for decoding.

The prediction information may include BV 1708. In other instances, the prediction information may include an indication of BV 1708. For example, in HEVC, VVC, and other video compression schemes, BV 1708 may be predictively coded before being stored or signaled in a bit stream as explained previously above. BV 1708 for current block 1700 may be predictively coded using a similar technique as AMVP for inter prediction. This technique may be referred to as BV prediction and difference coding. For the BV prediction and difference coding technique, the encoder may code BV 1708 as a difference between BV 1708 and a BV predictor (BVP) 1712. The encoder may select BVP 1712 from a list of candidate BVPs. The candidate BVPs may come from previously decoded BVs of neighboring blocks of current block 1700 or from other sources. Both the encoder and decoder may generate or determine the list of candidate BVPs.

After the encoder selects BVP 1712 from the list of candidate BVPs, the encoder may determine a BV difference (BVD) 1714. BVD 1714 may be calculated based on the difference between BV 1708 and BVP 1712. For example, BVD 1714 may be represented by two directional components calculated according to equations (17) and (18) above, which are reproduced below:

$$BVD_x = BVx - BVP_x \quad (17)$$

$$BVD_y = BVy - BVP_y \quad (18)$$

where BVD$_x$ and BVD$_y$ respectively represent the horizontal and vertical components of BVD 1714, BV$_x$ and BV$_y$ respectively represent the horizontal and vertical components of BV 1708, and BVP$_x$ and BVP$_y$ respectively represent the horizontal and vertical components of BVP 1712. The horizontal x-axis and vertical y-axis are indicated in the lower right hand corner of current picture 1702 for reference purposes.

The encoder may signal, in a bit stream, the prediction error, an indication of the selected BVP 1712 (e.g., via an index pointing into the list of candidate BVPs), and the separate components of BVD 1714 given by equations (17) and (18). A decoder, such as decoder 300 in FIG. 3, may decode BV 1708 by adding corresponding components of BVD 1714 to corresponding components of BVP 1712. The decoder may then decode current block 1700 by determining and/or generating reference block 1710, which forms the prediction of current block 1700, using the decoded BV and combining the prediction with the prediction error received in the bitstream.

As explained above, IBC reference region 1706 is a constraint on BV 1708. BV 1708 is constrained by IBC reference region 1706 to point to a reference block within IBC reference region 1706. It can be shown that, because of the exemplary IBC reference region constraint on BV 1708, the sign (or direction) of one or both components of BVD 1714 may be determined based on BVP 1712 and BV 1708. For example, because of the exemplary IBC reference region constraint on BV 1708, the sign (or direction) of BVD$_x$ may be determined based on BVP$_x$ and BV$_y$ when BVP$_x$ and BV$_y$ satisfy certain conditions. Thus, when BVP$_x$ and BV$_y$ satisfy the conditions, an encoder may not signal the sign of BVD$_x$ in the bitstream because a decoder may determine the sign of BVD$_x$, without an explicit indication, based on receiving or determining BVP$_x$ and BV$_y$.

Before discussing the conditions that, when satisfied by BV$_y$ and BVP$_x$, determine the sign of BVD$_x$, it is important to understand how the location of samples and blocks in a picture may be referenced. Typically, the location of a sample in a picture is indicated by a sample number in the horizontal direction (given by the variable x) and a sample number in the vertical direction (given by the variable y) relative to the origin ((x, y)=(0,0)) of the picture coordinate system in the top left corner of the picture. In the horizontal x direction, the positive direction is to the right. Thus, as x increases, the sample location moves farther right in the positive, horizontal direction. In the vertical y direction, the positive direction is down. Thus, as y increases, the sample location moves farther down in the positive, vertical direction. The location of a block in a picture may be given by the location of its top left sample relative to the origin of the picture coordinate system in the top left corner of the picture or relative to the top left sample of another block in which the block is located within.

With the above, exemplary understanding of how the location of samples and blocks in a picture may be referenced, the conditions that, when satisfied by BV$_y$ and BVP$_x$, determine the sign of BVD$_x$ may be further described. More specifically, it can be shown that BVD$_x$ is less than or equal to zero and therefore has a negative sign when the following two conditions are respectively satisfied by BV$_y$ and BVP$_x$:

$$BV_y > 0 \quad (19)$$

$$BVP_x > 0 \quad (20)$$

FIG. 17 is illustrative of the consequence of condition (19) being true. FIG. 17 shows that BV 1708 has a vertical component BV$_y$ greater than 0 as specified in condition (19) and therefore points down relative to the top left sample of current block 1700 in the positive, vertical direction. Because BV$_y$ points down relative to the top left sample of current block 1700, reference block 1710 pointed to by BV 1708 is to the left of current block 1700 given that the region below and to the right of current block 1700 is not within IBC reference region 1706. Based on reference block 1710 being to the left of current block 1700, the horizontal component BV$_x$ of BV 1712 points to the left of the top left sample of current block 1700 and therefore is less than zero. In other words, given the condition BV$_y$>0 of (19) is true, reference block 1710 is to the left of current block 1700 and:

$$BV_x < 0 \quad (21)$$

Given that $BV_x=BVP_x+BVD_x$, equation (21) can rewritten as:

$$BVD_x < -BVP_x \quad (22)$$

If the condition $BVP_x > 0$ of (20) is further satisfied, then, based on condition (22), $BVD_x < 0$ is further true. Thus, given conditions (19) and (20) are satisfied, an encoder may not signal the sign of $BVD_x$ in the bitstream because a decoder may determine $BVD_x$ is less than zero and therefore has a negative sign based on $BVP_x$ and $BV_y$.

In general, conditions (19) and (20) define a constraint on BVD 1714; if conditions (19) and (20) are true, $BVD_x$ is less than zero. This constraint on BVD 1714 is derived based on the IBC reference region constraint on BV 1708. In other words, the IBC reference region constraint on BV 1708 is translated into a constraint on BVD 1714. Although such a translation approach is possible, it may be difficult to determine all such constraints on BVD 1714. This may be especially true for complex IBC reference region constraints on BV 1708. In addition, for changes in the IBC reference region constraint, the process of translating the IBC reference region constraint on BV 1708 to constraints on BVD 1714 may need to be carried out again. Accordingly, rather than determine explicit constraints on BVD 1714 to conditionally signal the sign of one or both directional components of a BVD in a bitstream, embodiments of the present disclosure are directed to apparatuses and methods for directly exploiting the IBC reference region constraint on a BV to conditionally signal the sign of one or both directional components of a BVD in a bitstream.

Continuing with the IBC example of FIG. 17, FIGS. 18 and 19A-C illustrate an exemplary method for directly exploiting the IBC reference region constraint on BV 1708 to conditionally signal the sign of one or both directional components of BVD 1714 in a bitstream in accordance with embodiments of the present disclosure.

Figure 18:
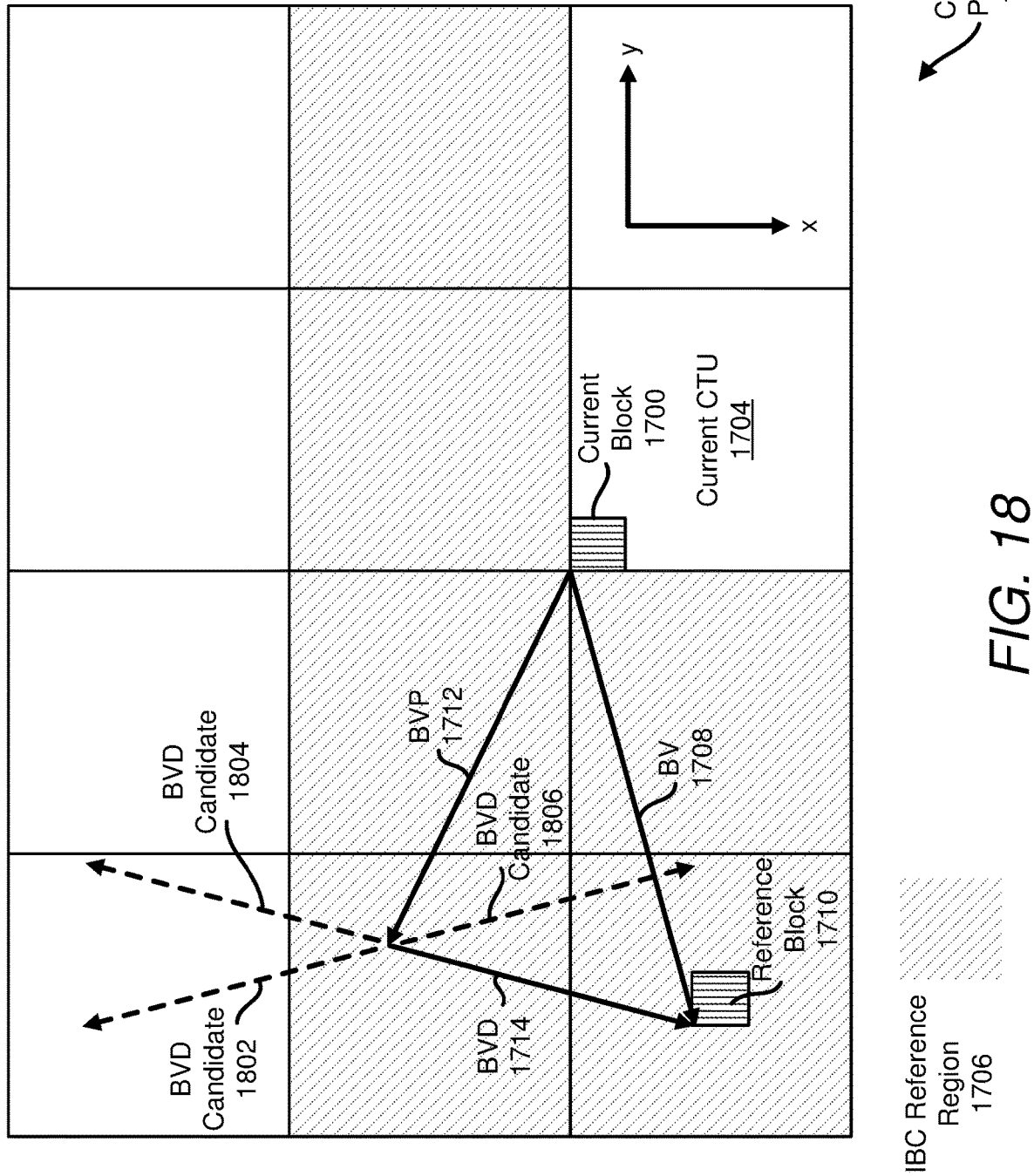
FIGS. 18 and 19A-C illustrate an exemplary method for directly exploiting the IBC reference region constraint on a BV to conditionally signal the sign of one or both directional components of a BVD in a bitstream in accordance with embodiments of the present disclosure.

As illustrated in FIG. 18, the encoder described above with respect to FIG. 17 may further determine a plurality of BVD candidates 1802, 1804, and 1806. Each of the plurality of BVD candidates 1802, 1804, and 1806 comprises a horizontal and a vertical component (not shown in FIG. 18A for ease of illustration) with the same respective magnitudes as the horizontal and vertical components of BVD 1714 but with a different combination of signs (or directions). In other words, the magnitude of the horizontal component of each BVD candidate 1802, 1804, and 1806 is the same as the magnitude of the horizontal component of BVD 1714 (shown in FIG. 17 as $BVD_x$), and the magnitude of the vertical component of each BVD candidate 1802, 1804, and 1806 is the same as the magnitude of the vertical component of BVD 1714 (shown in FIG. 17 as $BVD_y$). However, the respective signs (or directions) of the horizontal and vertical components of BVD candidate 1802 are negative (−), negative (−); the respective signs of the horizontal and vertical components of BVD candidate 1804 are positive (+), negative (−); and the respective signs of the horizontal and vertical components of BVD candidate 1806 are positive (+), positive (+). Together with BVD 1714, which has respective horizontal and vertical component signs of negative (−), positive (+), BVD candidates 1802, 1804, and 1806 form the four possible BVDs with the same horizontal and vertical component magnitudes but a different combination of signs (or directions). In addition to BVD candidates 1802, 1804, and 1806, BVD 1714 may be considered, or referred to as, a BVD candidate.

Figure 19A:
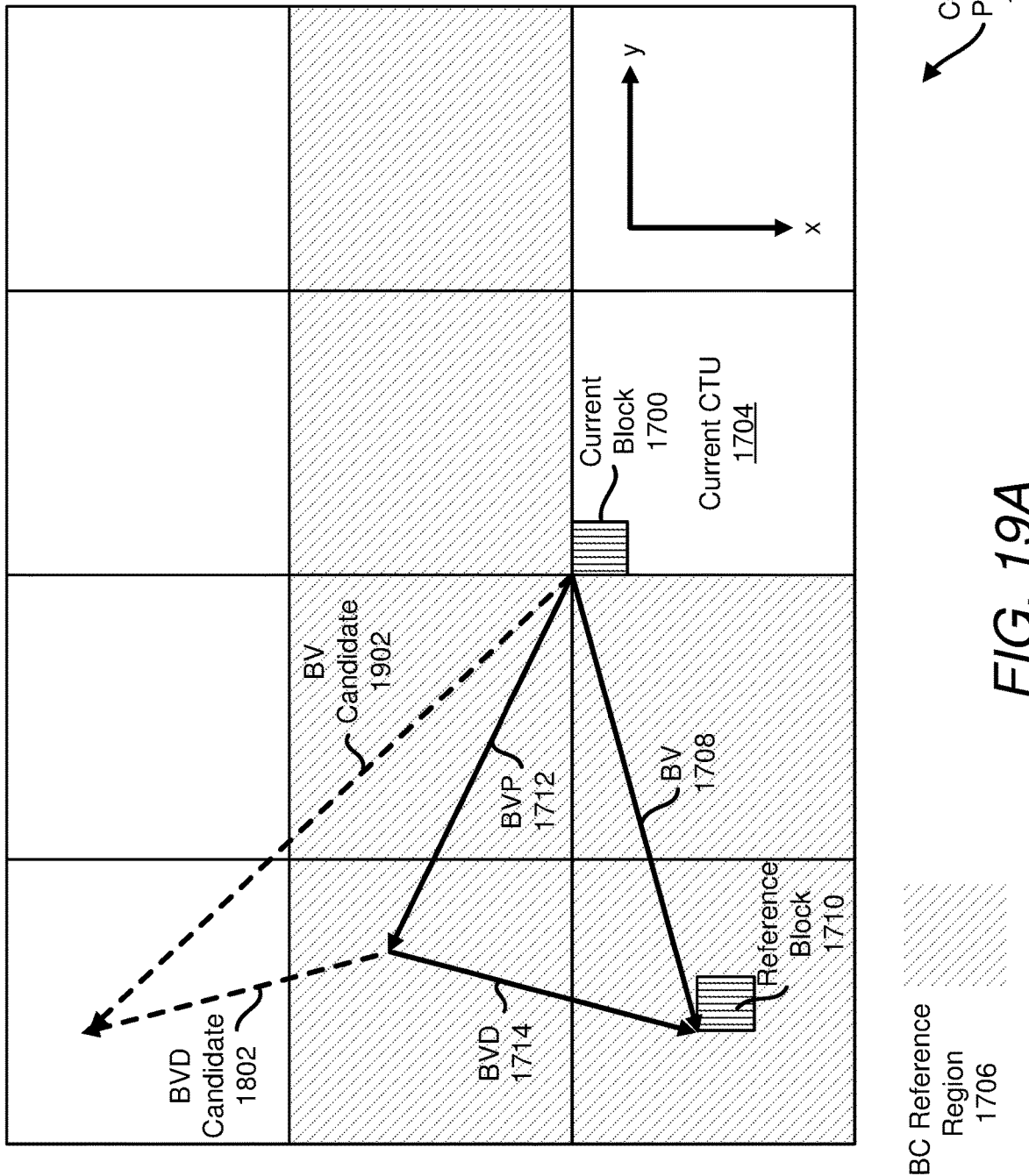
Figure 19B:
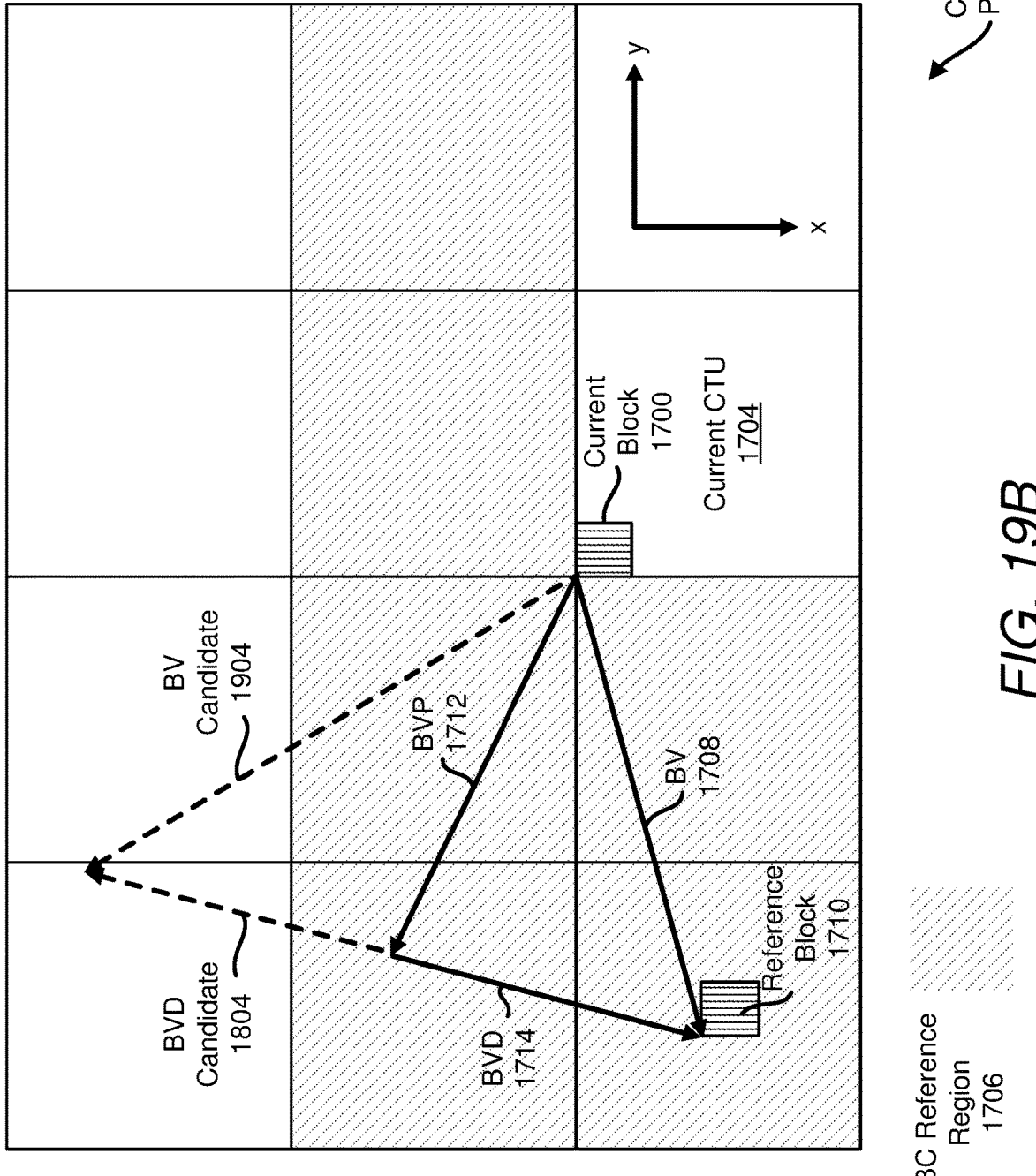
Figure 19C:
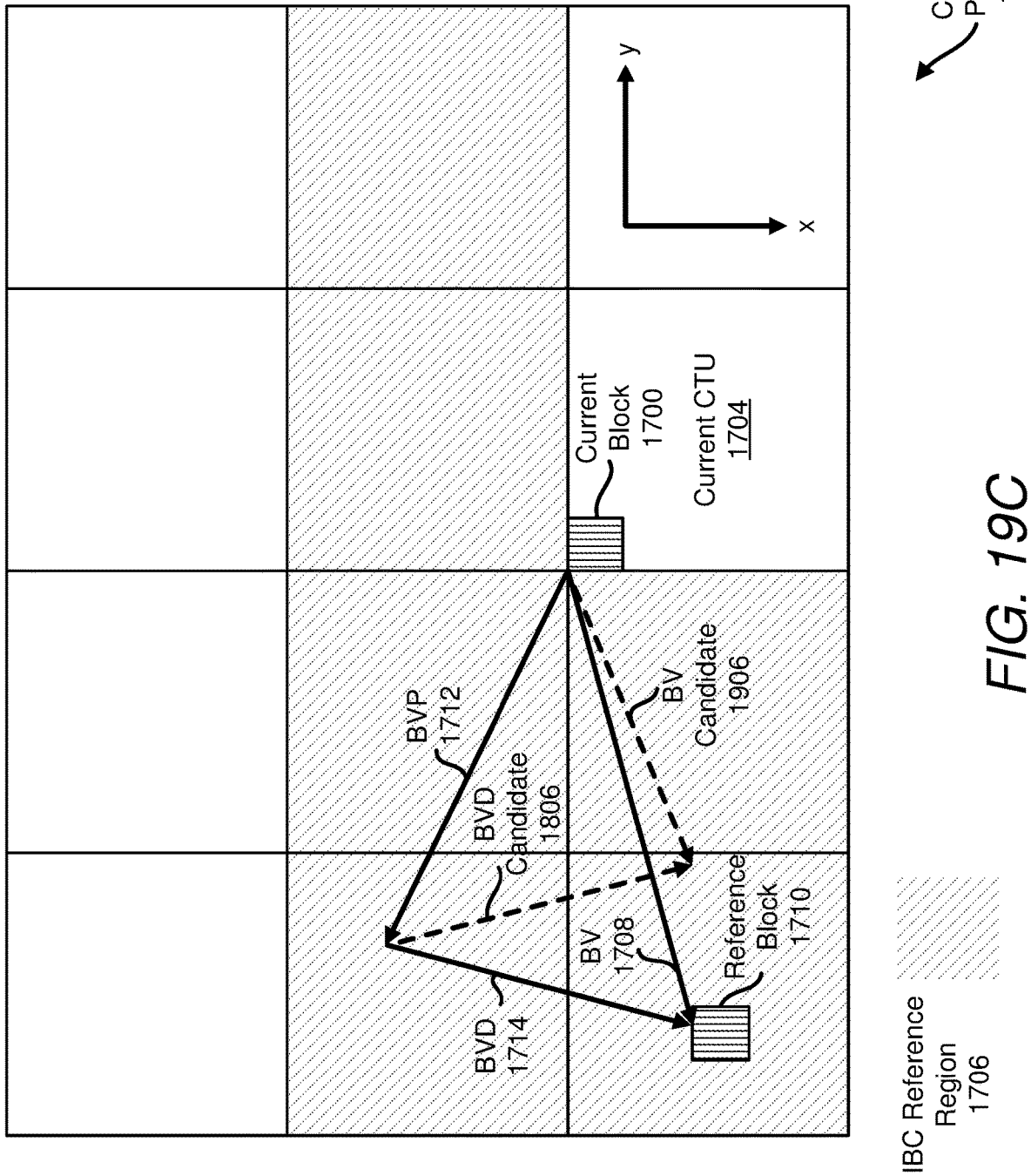

Using the plurality of BVD candidates, the encoder may determine a plurality of BV candidates. The encoder may determine each of the plurality of BV candidates based on a sum of BVP 1712 and a different one of the plurality of BVD candidates 1802, 1804, and 1806. For example, the encoder may determine: a BV candidate 1902 based on the sum of BVP 1712 and BVD candidate 1802 as shown in FIG. 19A; a BV candidate 1904 based on the sum of BVP 1712 and BVD candidate 1804 as shown in FIG. 19B; and a BV candidate 1906 based on the sum of BVP 1712 and BVD candidate 1806 as shown in FIG. 19C. In addition to BV candidates 1902, 1904, and 1906, BV 1708 may be considered, or referred to as, a BV candidate.

The encoder may determine whether to signal, in a bitstream, a sign of the horizontal component of BVD 1714 and/or a sign of the vertical component of BVD 1714 based on validities of BV candidates 1708, 1902, 1904, and 1906 illustrated in FIGS. 19A-C. The validity of each of BV candidates 1708, 1902, 1904, and 1906 may be determined based on IBC reference region 1706, which constrains BVs to indicate a displacement from current block 1700 to a reference block within IBC reference region 1706. For example, if a BV does not indicate a displacement from current block 1700 to a reference block within IBC reference region 1706, the BV is not a valid BV.

In an embodiment, if only one BV candidate among the four BV candidates 1708, 1902, 1904, and 1906 is valid, the encoder may determine to not signal the sign for both the horizontal and vertical component magnitudes of BVD 1714 (also referred to herein as the "actual BVD"). This is because, with only one valid BV candidate among the four BV candidates 1708, 1902, 1904, and 1906, there is also only one valid BVD candidate among the four BVD candidates 1714, 1802, 1804, and 1806. The one valid BVD candidate, among the four BVD candidates 1714, 1802, 1804, and 1806, is the BVD candidate used to construct the valid BV candidate. Accordingly, the encoder may determine to not signal the sign for both the horizontal and vertical component magnitudes of the actual BVD because a decoder may determine these signs based on the respective signs of the horizontal and vertical component magnitudes of the only valid BVD candidate. In the instance where there is only one valid BVD candidate, the valid BVD candidate should correspond to the "actual" BVD, which is BVD 1714 in the example of FIGS. 18 and 19A-C.

For example, the decoder may receive, from the encoder, an indication of BVP 1712 (e.g., via an index pointing into a list of candidate BVPs) and the horizontal and vertical component magnitudes of the actually BVD (i.e., BVD 1714) without their respective signs. The decoder may determine the same plurality of BVD candidates 1714, 1802, 1804, and 1806 in the same manner as the encoder based on the horizontal and vertical component magnitudes of the actually BVD received in the bitstream. Using the plurality of BVD candidates 1714, 1802, 1804, and 1806, the decoder may determine the same plurality of BV candidates 1708, 1902, 1904, and 1906 in the same manner as the encoder. For example, the decoder may determine each of the plurality of BV candidates based on a sum of BVP 1712 and a different one of the plurality of BVD candidates 1712, 1802, 1804, and 1806. The decoder may determine: BV candidate 1902 based on the sum of BVP 1712 and BVD candidate 1802 as shown in FIG. 19A; BV candidate 1904 based on the sum of BVP 1712 and BVD candidate 1804 as shown in FIG. 19B; and a BV candidate 1906 based on the sum of BVP 1712 and BVD candidate 1806 as shown in FIG. 19C. The decoder may then determine the validity of each of the plurality of BV candidates in the same manner as the encoder based on IBC reference region 1706. Based on only one BV candidate among the four possible BV candidates 1708, 1902, 1904, and 1906 being valid, the decoder may determine the sign for both the horizontal and vertical component magnitudes of the actual BVD based on the respective signs of the horizontal and vertical component magnitudes of the BVD candidate used to determine the only valid BV candidate.

In the example described above, only one of the four BV candidates was valid. In other examples, the encoder and decoder may perform the same process of determining BVD candidates, BV candidates based on the BVD candidates, and the respective validities of each BV candidate but determine a different number or different ones of the BV candidates as valid. For example, in the example of FIGS. 18 and 19A-C, two BV candidates are valid: BV candidate 1708 and BV candidate 1906. Exemplary signaling and decoding methods for these additional instances are explained further below with respect to FIGS. 20 and 21.

FIG. 20 illustrates an example table 2000 showing all possible combinations of valid BV candidates, among the four BV candidates 1708, 1902, 1904, and 1906, and example signaling/decoding methods for each such combination in accordance with embodiments of the present disclosure.

The first column of table 2000 provides index values (Idx) for referencing each of the 16 possible combinations of valid BV candidates. The second through fifth columns of table 2000 respectively correspond to a different one of the four BV candidates. A "0" in one of the second through fifth columns indicates that the BV candidate corresponding to the column is not valid. A "1" in one of the second through fifth columns indicates that the BV candidate corresponding to the column is valid. The second column of the table corresponds to BV candidate 1906 constructed with BVD candidate 1806 having a positive (+) horizontal component and a positive (+) vertical component. The third column of the table corresponds to BV candidate 1904 constructed with BVD candidate 1804 having a positive (+) horizontal component and a negative (−) vertical component. The fourth column of the table corresponds to BV candidate 1708 constructed with BVD candidate 1714 having a negative (−) horizontal component and a positive (+) vertical component. The fifth column corresponds to BV candidate 1902 constructed with BVD candidate 1802 having a negative (−) horizontal component and a negative (−) vertical component. The sixth and seventh columns respectively indicate whether the encoder is to signal the sign of the horizontal and vertical component magnitudes of the actual BVD (i.e., BVD 1714). An "X" in either the sixth or seventh column indicates that the encoder is to signal the sign of the corresponding component magnitude of the actual BVD in the bitstream to the decoder for the combination of valid BV candidates in the same row. Anything other than an "X", such as a "+" or "−", in either the sixth or seventh column generally indicates that the encoder does not need to signal the sign of the corresponding component magnitude of the actual BVD in the bitstream to the decoder for the combination of valid BV candidates in the same row except in certain circumstances explained further below. A "+" or "−" indicates the sign of the corresponding component magnitude of the actual BVD.

For example, assuming that the combination of valid BV candidates corresponds to one of indexes 1, 2, 4, or 8, which each correspond to a combination of valid BV candidates with only one valid BV candidate, the encoder may not signal the sign for either component magnitude of the actual BVD as indicated by the "+" or "−" in each of the sixth and seventh columns for these indexes. The reasoning behind not signaling the sign for either component magnitude of the actual BVD in the case of only one BV candidate being valid was discussed above from both the encoder and decoder perspective.

In another example, assuming that the combination of valid BV candidates is one of indexes 3 or 12, which each correspond to a combination of valid BV candidates with only two of the four BV candidates being valid, the encoder may signal the sign for the vertical component of the actual BVD and may not signal the sign for the horizontal component of the actual BVD. For both of indexes 3 and 12, the only two valid BV candidates are determined based on BVD candidates with horizontal component magnitudes that have the same sign. For example, index 3 has two valid BV candidates—BV candidate 1708 and BV candidate 1902. Each of these BV candidates is determined based on a BVD candidate with a horizontal component magnitude that has a negative sign. Accordingly, the encoder may determine to not signal the sign for the horizontal component magnitude of the actual BVD because a decoder may determine the sign for the horizontal component magnitude of the actual BVD based on the respective signs of the horizontal component magnitudes of the only two valid BVD candidates both being negative. For example, based on a decoder determining the only two valid BV candidates are BV candidates 1708 and 1902, the decoder may determine the sign for the horizontal component magnitude of the actual BVD is negative without an explicit indication in the bitstream from the encoder.

In another example, assuming that the combination of valid BV candidates is one of indexes 5 or 10, which each correspond to a combination of valid BV candidates with only two of the four BV candidates being valid, the encoder may signal the horizontal component of the actual BVD and may not signal the sign for the vertical component of the actual BVD. For both of indexes 5 and 10, the only two valid BV candidates are determined based on BVD candidates with vertical component magnitudes that have the same sign. For example, index 5 has two valid BV candidates—BV candidate 1904 and BV candidate 1902. Each of these BV candidates is determined based on a BVD candidate with a vertical component magnitude that has a negative sign. Accordingly, the encoder may determine to not signal the sign for the vertical component magnitude of the actual BVD because a decoder may determine the sign for the vertical component magnitude of the actual BVD based on the respective signs of the vertical component magnitudes of the only two valid BVD candidates both being negative. For example, based on a decoder determining the only two valid BV candidates are BV candidates 1904 and 1902, the decoder may determine the sign for the vertical component magnitude of the actual BVD is negative without an explicit indication in the bitstream from the encoder.

In another example, assuming that the combination of valid BV candidates is one of indexes 6 or 9, which each correspond to a combination of valid BV candidates with only two of the four BV candidates being valid, the encoder may signal the horizontal component of the actual BVD and may not signal the sign for the vertical component of the actual BVD.

For index 6, the two valid BV candidates are each determined based on BVD candidates with horizontal and vertical components that have opposite signs. More particularly, the two valid BV candidates for index 6 include: BV candidate 1904, which is determined based on BVD candidate 1804 with a positive horizontal component and a negative vertical component; and BV candidate 1708, which is determined based on BVD candidate 1714 with a negative horizontal component and a positive vertical component. Accordingly, the encoder may signal the sign of only one of the horizontal and vertical components of the actual BVD because the decoder may determine the sign of the component not signaled in the bitstream to be the opposite of the sign of the component that is signaled by the encoder in the bitstream. For example, based on a decoder determining the only two valid BV candidates are BV candidates 1904 and 1714, the decoder may determine the sign of the component of the actual BVD not signaled in the bitstream to be the opposite of the sign of the component of the actual BVD that is signaled by the encoder in the bitstream. In example table 2000, the sign of the horizontal component of the actual BVD is signaled in the bitstream and the sign of the vertical component of the actual BVD is not signaled in the bitstream. However, in other embodiments, the sign of the vertical component of the actual BVD may be signaled in the bitstream for index 6 and the sign of the horizontal component of the actual BVD may not be signaled in the bitstream.

For index 9, the two valid BV candidates are each determined based on BVD candidates with horizontal and vertical components that have the same signs. More particularly, the two valid BV candidates for index 9 include: BV candidate 1906, which is determined based on BVD candidate 1806 with a positive horizontal component and a positive vertical component; and BV candidate 1902, which is determined based on BVD candidate 1802 with a negative horizontal component and a negative vertical component. Accordingly, the encoder may signal the sign of only one of the horizontal and vertical components of the actual BVD because the decoder may determine the sign of the component not signaled in the bitstream to be the same as the sign of the component that is signaled by the encoder in the bitstream. For example, based on a decoder determining the only two valid BV candidates are BV candidates 1906 and 1902, the decoder may determine the sign of the component of the actual BVD not signaled in the bitstream to be the same as the sign of the component of the actual BVD that is signaled by the encoder in the bitstream. In example table 2000, the sign of the horizontal component of the actual BVD is signaled in the bitstream (as indicated by the "X" in column 6 of table 2000 for index 9) and the sign of the vertical component of the actual BVD is not signaled in the bitstream. However, in other embodiments, the sign of the vertical component of the actual BVD may be signaled in the bitstream for index 9 and the sign of the horizontal component of the actual BVD may not be signaled in the bitstream.

In another example, assuming that the combination of valid BV candidates is one of indexes 7, 11, 13, or 14, which each correspond to a combination of valid BV candidates with only three of the four BV candidates being valid, the encoder may signal the horizontal component of the actual BVD and may not signal the sign for the vertical component of the actual BVD.

For index 7, if the sign of the horizontal component of the actual BVD is positive, the sign of the vertical component of the actual BVD is negative. Accordingly, the encoder may not signal the sign of the vertical component of the actual BVD if the sign of the horizontal component of the actual BVD is positive because the decoder may determine the sign of the vertical component of the actual BVD is negative in this instance. For example, based on a decoder determining the only three valid BV candidates are BV candidates 1904, 1708, and 1902 and that the horizontal component of the actual BVD is positive, the decoder may determine the sign of the vertical component of the actual BVD not signaled in the bitstream to be negative. In other instances of index 7, where the sign of the horizontal component of the actual BVD is not positive, the encoder may signal the signs of both the horizontal and vertical components of the actual BVD in the bitstream to the decoder.

For index 11, if the sign of the horizontal component of the actual BVD is positive, the sign of the vertical component of the actual BVD is positive. Accordingly, the encoder may not signal the sign of the vertical component of the actual BVD if the sign of the horizontal component of the actual BVD is positive because the decoder may determine the sign of the vertical component of the actual BVD is positive in this instance. For example, based on a decoder determining the only three valid BV candidates are BV candidates 1906, 1708, and 1902 and that the horizontal component of the actual BVD is positive, the decoder may determine the sign of the vertical component of the actual BVD not signaled in the bitstream to be positive. In other instances of index 11, where the sign of the horizontal component of the actual BVD is not positive, the encoder may signal the signs of both the horizontal and vertical components of the actual BVD in the bitstream to the decoder.

For index 13, if the sign of the horizontal component of the actual BVD is negative, the sign of the vertical component of the actual BVD is negative. Accordingly, the encoder may not signal the sign of the vertical component of the actual BVD if the sign of the horizontal component of the actual BVD is negative because the decoder may determine the sign of the vertical component of the actual BVD is negative in this instance. For example, based on a decoder determining the only three valid BV candidates are BV candidates 1906, 1904, and 1708 and that the horizontal component of the actual BVD is negative, the decoder may determine the sign of the vertical component of the actual BVD not signaled in the bitstream to be negative. In other instances of index 13, where the sign of the horizontal component of the actual BVD is not negative, the encoder may signal the signs of both the horizontal and vertical components of the actual BVD in the bitstream to the decoder.

For index 14, if the sign of the horizontal component of the actual BVD is negative, the sign of the vertical component of the actual BVD is positive. Accordingly, the encoder may not signal the sign of the vertical component of the actual BVD if the sign of the horizontal component of the actual BVD is negative because the decoder may determine the sign of the vertical component of the actual BVD is positive in this instance. For example, based on a decoder determining the only three valid BV candidates are BV candidates 1906, 1904, and 1708 and that the horizontal component of the actual BVD is negative, the decoder may determine the sign of the vertical component of the actual BVD not signaled in the bitstream to be positive. In other instances of index 14, where the sign of the horizontal component of the actual BVD is not negative, the encoder may signal the signs of both the horizontal and vertical components of the actual BVD in the bitstream to the decoder.

It should be noted that an encoder or decoder may use some or all of the signaling and decoding methods discussed above with respect to FIG. 20. For example, an encoder and decoder may use the signaling and decoding methods discussed above with respect to indexes 1, 2, 4, and 8 in table 20. For the remaining indexes, the encoder may signal the sign of each component of the actual BVD in the bitstream, and the decoder may receive the signs of each component of the actual BVD in the bitstream. It should be further noted that index 0 corresponds to an error case where no BV candidates are valid. The case of index 0 should not occur during normal operation of the encoder and decoder. In general, at least one BV candidate should be valid. It should be further noted that index 15 corresponds to the case where all four candidate BVs are valid. In this case, the encoder may signal the sign of each component of the actual BVD in a bitstream, and the decoder may expect to receive the sign of each component of the actual BVD in the bitstream. Finally, it should be noted that for several indexes where the encoder signals the sign of one component of the actual BVD in a bitstream and does not signal the sign of the other component of the actual BVD in the bitstream, the component for which the sign is signaled may be swapped. For example, for index 13, instead of the encoder signaling the sign of the horizontal component of the actual BVD in the bitstream, the encoder may signal the sign of the vertical component of the actual BVD in the bitstream. Accordingly, table 2000 may be presented more generically by referring to the two components of the BV candidates, BVD candidates, and actual BVD as a first and second component, where the first component may refer to either the horizontal or vertical component and the second component may refer to the remaining component.

FIG. 21 illustrates another example table 2100 showing all possible combinations of valid BV candidates, among the four BV candidates 1708, 1902, 1904, and 1906, and example signaling/decoding methods for each such combination in accordance with embodiments of the present disclosure. Table 2100 is similar to table 2000 in FIG. 20 except that the possible combinations of valid BV candidates in table 2100 are ordered based on the number of valid BV candidates in a combination. For example, index 0 corresponds to the only combination of valid BV candidates with zero valid BV candidates; indexes 1-4 correspond to the combinations of valid BV candidates with a single valid BV candidate; indexes 5-10 correspond to the combinations of valid BV candidates with only two valid BV candidates; indexes 11-14 correspond to the combinations of valid BV candidates with only three valid BV candidates; and finally index 15 corresponds to the only combination of valid BV candidates with four valid BV candidates.

In addition to the above difference from table 2000 in FIG. 20, the sixth and seventh columns of table 2100 are also different. The signaling methods illustrated by table 2100 are not based on directly signaling signs for the component magnitudes of the actual BVD like table 2000. Instead, the signaling methods illustrated by table 2100 are based on indirectly signaling signs for the component magnitudes of the actual BVD. More particularly, the signaling methods of table 2100 are based on the encoder signaling a selected one of the valid BV candidates for a combination of valid BV candidates using either one or two BV candidate selection bits. The decoder may then determine the signs for the component magnitudes of the actual BVD based on the signs for the component magnitudes of the BVD used to construct the selected one of the valid BV candidates. For example, for index 9 there are two valid BV candidates—BV candidate 1906 and BV candidate 1708. Columns 6 and 7 respectively indicate which, if any, of two BV candidate selection bits 2102 and 2104 are used for signaling a selected BV candidate among the valid BV candidates of index 9. Column 6 corresponds to the first BV candidate selection bit 2102. Column 7 corresponds to the second BV candidate selection bit 2104. An "X" in column 6 or 7 indicates that the corresponding bit of the BV candidate selection signal is used by the encoder to signal a selected BV candidate among the valid BV candidates of an index. A series of asterisks "****" indicates that the corresponding bit of the BV candidate selection signal is not used by the encoder to signal a selected BV candidate among the valid BV candidates of an index. In the example of index 9, only bit 2102 of the BV candidate selection signal is used to indicate a selected BV candidate for index 9. This is because, with only two valid BV candidates for index 9, a single bit is sufficient to indicate which BV candidate, among the two valid BV candidates, is the selected BV candidate to the decoder. For example, the encoder may signal a "0" for BV candidate selection bit 2102 to indicate BV candidate 1906 as the selected BV candidate to the decoder and a "1" for BV candidate selection bit 2012 to indicate BV candidate 1708 as the selected BV candidate to the decoder.

Assuming that the combination of valid BV candidates corresponds to one of indexes 1-4, which each correspond to a combination of valid BV candidates with only one valid BV candidate, the encoder may not use or signal either BV candidate selection bit 2102 and 2104 in the bitstream and the decoder may not expect to receive either BV candidate selection bit 2102 and 2104 in the bitstream. This is because, with only one valid BV candidate among the four BV candidates 1708, 1902, 1904, and 1906, the encoder does not need to signal anything to the decoder to indicate the only valid BV candidate as the selected BV candidate. The decoder may implicitly understand the only valid BV candidate as the selected BV candidate in this instance.

Assuming that the combination of valid BV candidates corresponds to one of indexes 5-10, which each correspond a combination of valid BV candidates with only two valid BV candidates, the encoder may use only the single bit 2102 of the BV candidate selection signal to indicate a selected BV candidate among the two valid BV candidates and the decoder may expect to receive only the single bit 2102 of the BV candidate selection signal for indicating the selected BV candidate among the two valid BV candidates. This is because, with only two valid BV candidates for indexes 5-10, a single bit is sufficient to indicate a selected one of the two valid BV candidates to the decoder.

Assuming that the combination of valid BV candidates corresponds to one of indexes 11-14, which each correspond a combination of valid BV candidates with only three valid BV candidates, the encoder may use only the single bit 2102 of the BV candidate selection signal to indicate a selected BV candidate among the three valid BV candidates or both bits 2102 and 2104 of the BV candidate selection signal to indicate the selected BV candidate. For example, the encoder may use a variable-length code to indicate a selected BV candidate among the three valid BV candidates, such as the variable-length code of 0, 10, and 11. The encoder may signal the shortest variable length code of 0 to indicate a first one of the three valid BV candidates as the selected BV candidate and the remaining variable length codes of 10 and 11 may be used to respectively indicate the second and third BV candidates of the three valid BV candidates. For signaling the variable length code of 0, the encoder may use only BV candidate selection bit 2102. For signaling the variable length codes of 10 and 11, the encoder may use both of BV candidate selection bits 2102 and 2104. In one example, the valid BV candidate of the three valid BV candidates assigned to the variable-length code of 0 may be determined based on which of the three valid BV candidates has the highest probability to be the selected BV candidate. The other two valid BV candidates of the three valid BV candidates may be assigned to the other variable-length codes of 10 and 11. In other examples, a different variable length code, such as 1, 01, and 00 may be used. In both example sets of variable-length codes, no whole code word is a prefix of any other code word. For example, the shortest variable length code of 0 in the first example set of variable-length codes is not a prefix of either of the other two longer variable length codes of 10 and 11. Using a prefix free variable-length code allows the decoder to unambiguously decode the code words. In other examples, the encoder may use a fixed-length code comprising both bits 2102 and 2104 instead of a variable-length code.

Assuming that the combination of valid BV candidates corresponds to index 15, which corresponds to a combination of valid BV candidates with four BV candidates, the encoder may use both bits 2102 and 2104 of the BV candidate selection signal to indicate a selected BV candidate. For example, the encoder may signal, via bits 2102 and 2104, the code: 00 to indicate BV candidate 1906 as the selected BV candidate to the decoder; 01 to indicate BV candidate 1904 as the selected BV candidate to the decoder; 10 to indicate BV candidate 1708 as the selected BV candidate to the decoder; and 11 to indicate a BV candidate 1902 as the selected BV candidate to the decoder. In another example, for index 15, the encoder may fall back to directly signaling the sign bits for the component magnitudes of the actual BVD via bits 2102 and 2104.

In the examples of FIGS. 17, 18, and 19A-C, IBC reference region 1706 was provided by way of example and not limitation. In other embodiments, the methods discussed above with respect to FIGS. 17-21 may be applied based on IBC reference regions different than IBC reference region 1706 as would be appreciated by persons of ordinary skill in the art based on the teachings herein. For example, IBC reference region 1706 in the examples of FIGS. 17, 18, and 19A-C may be replaced by an IBC reference region determined based on a different set of IBC reference region constraints. For example, in addition to being constrained to a reconstructed part of current picture 1702 and potentially to a particular wavefront parallel processing (WPP) partition or tile partition as mentioned above with respect to FIG. 17, IBC reference region 1706 may be further constrained to include a number of decoded or reconstructed samples that may be stored in a limited size IBC reference sample memory. The size of the IBC reference sample memory may be limited based on being implemented on-chip with the encoder or decoder. The IBC reference region may be increased in size by using a larger size IBC reference sample memory off-chip from the encoder or decoder; however, such an approach may have its own drawbacks, such as increased off-chip memory bandwidth requirements and increased delay in writing and reading samples in the IBC reference region to and from the IBC reference sample memory.

In an embodiment, with a limited size IBC reference sample memory, the IBC reference region may be constrained to: a reconstructed part of the current CTU; and one or more reconstructed CTUs to the left of the current CTU not including a portion, of a left most one of the one or more reconstructed CTUs, collocated with either the reconstructed part of the current CTU or a virtual pipeline data unit (VPDU) in which the current block being coded is located. Blocks of samples in different CTUs may be collocated based on having a same size and CTU offset. A CTU offset of a block may be the offset of the block's top-left corner relative to the top-left corner of the CTU in which the block is located.

The IBC reference region may not include the portion, of the left most one of the more reconstructed CTUs, that is collocated with the reconstructed part of the current CTU because the IBC reference sample memory may be implemented similar to a circular buffer. For example, the IBC reference sample memory may store reconstructed reference samples corresponding to one or more CTUs. Once the IBC reference sample memory is filled, reconstructed reference samples of the current CTU may replace the reconstructed reference samples of a CTU stored in the IBC reference sample memory that are located, within a picture or frame, farthest to the left of the current CTU. The samples of the CTU stored in the IBC reference sample memory that are located, within a picture or frame, farthest to the left of the current CTU may correspond to the oldest data in the IBC reference sample memory. This update mechanism allows some of the reconstructed reference samples from the left most CTU to remain stored in the IBC reference sample memory when processing the current CTU. The remaining reference samples of the left most CTU stored in the IBC reference sample memory may then be used for predicting the current block in the current CTU.

In addition, in typical hardware implementations of an encoder or decoder, a CTU may not be processed all at once. Instead, the CTU may be divided into VPDUs for processing by a pipeline stage. A VPDU may comprise a 4×4 region of samples, a 16×16 region of samples, a 32×32 region of samples, a 64×64 region of samples, a 128×128 region of samples, or some other sample region size. In an embodiment, a size of a VPDU may be determined based on a minimum of a maximum VPDU size (e.g., a 64×64 region of samples) and a size (e.g., a width or height) of a current CTU. The portion, of the left most one of the one or more reconstructed CTUs, that is collocated with the VPDU in which the block being coded is located may be further excluded from the IBC reference region as mentioned above. By excluding this region of the left most one of the one or more reconstructed CTUs from the IBC reference region, the corresponding portion of the IBC reference sample memory used to store reconstructed reference samples from this region may be used to store only samples within the region of the current CTU corresponding to the VPDU, which may avoid certain complexities in design.

The number of reconstructed CTUs to the left of the current CTU included in the IBC reference region may be determined based on the number of reconstructed reference samples the IBC reference sample memory may store and the size of the CTUs in the current picture. For example, the number of reconstructed CTUs to the left of the current CTU included in the IBC reference region may be determined based on the number of reconstructed reference samples the IBC reference sample memory may store divided by the size of a CTU in the current picture. Thus, for an IBC reference sample memory that may store 128×128 reconstructed reference samples for the IBC reference region and a CTU size of 128×128 samples, the number of reconstructed CTUs to the left of the current CTU included in the IBC reference region may be equal to (128×128)/(128×128) or 1 CTU. In another example, for a memory that may store 128×128 reconstructed reference samples for the IBC reference region and a CTU size of 64×64 samples, the number of reconstructed CTUs to the left of the current CTU included in the IBC reference region may be equal to (128×128)/(64×64) or 4 CTUs.

Figure 22A:
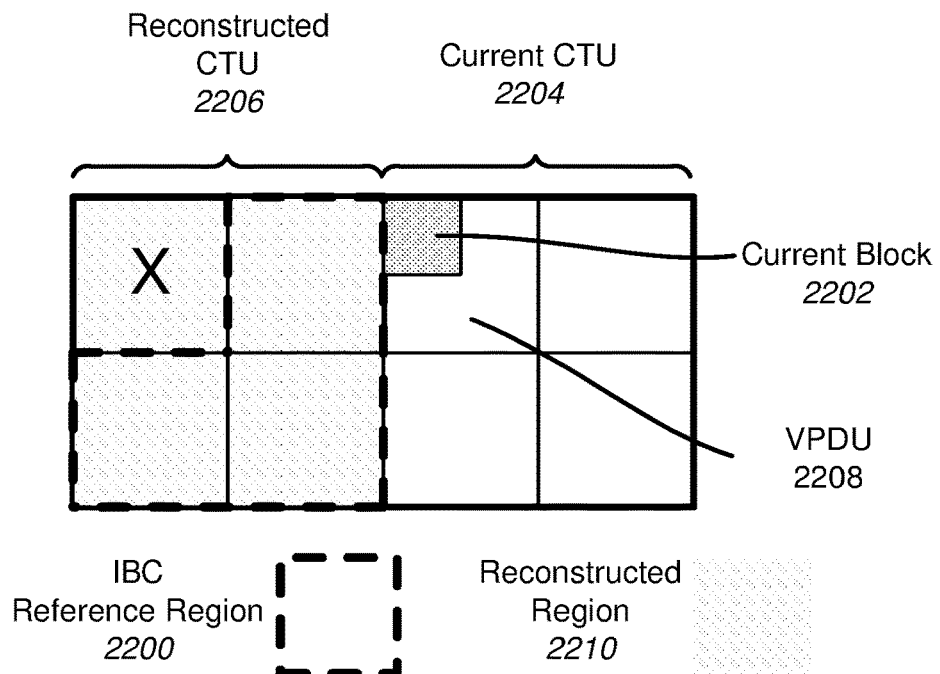
FIG. 22A illustrates an example IBC reference region determined based on an IBC reference sample memory size of 128×128 samples and a CTU size of 128×128 samples in accordance with embodiments of the present disclosure.

FIG. 22A illustrates an example IBC reference region 2200 determined based on an IBC reference sample memory size of 128×128 samples and a CTU size of 128×128 samples in accordance with embodiments of the present disclosure. Based on the IBC reference sample memory size of 128×128 samples and a CTU size of 128×128 samples, the number of reconstructed CTUs to the left of the current CTU included in the IBC reference region may be equal to (128×128)/(128×128) or 1 CTU.

FIG. 22A illustrates a current block 2202 within a current CTU 2204. Current block 2202 is the first block coded in current CTU 2204 and is coded using IBC mode. As described above with respect to FIG. 17, a block is coded using IBC mode by determining a "best matching" reference block within an IBC reference region. In FIG. 22A, IBC reference region 2200 is be constrained to: a reconstructed part of current CTU 2204; and the single, reconstructed CTU 2206 to the left of current CTU 2204 not including a portion, of reconstructed CTU 2206, collocated with either the reconstructed part of current CTU 2204 or a virtual pipeline data unit (VPDU) 2208 in which current block 2202 is located. In the example of FIG. 22A, CTUs are divided into 4 VPDUs of size 64×64 samples. Accordingly, IBC reference region 2200 for current block 2202 includes reconstructed region 2210 (shown with hatching) except the 64×64 region of reconstructed CTU 2206 collocated with VPDU 2208. This collocated region is marked with an "X" in FIG. 22A. It should be noted that, for different size CTUs, the IBC reference region in FIG. 22A may include a different number of CTUs to the left of current CTU 2202 than the single, reconstructed CTU 2206. For example, for CTU sizes of 64×64, the IBC reference region may include 4 CTUs to the left of current CTU 2202 based on the number of reconstructed reference samples the IBC reference sample memory may store divided by the size of the CTUs in the current picture.

Figure 22B:
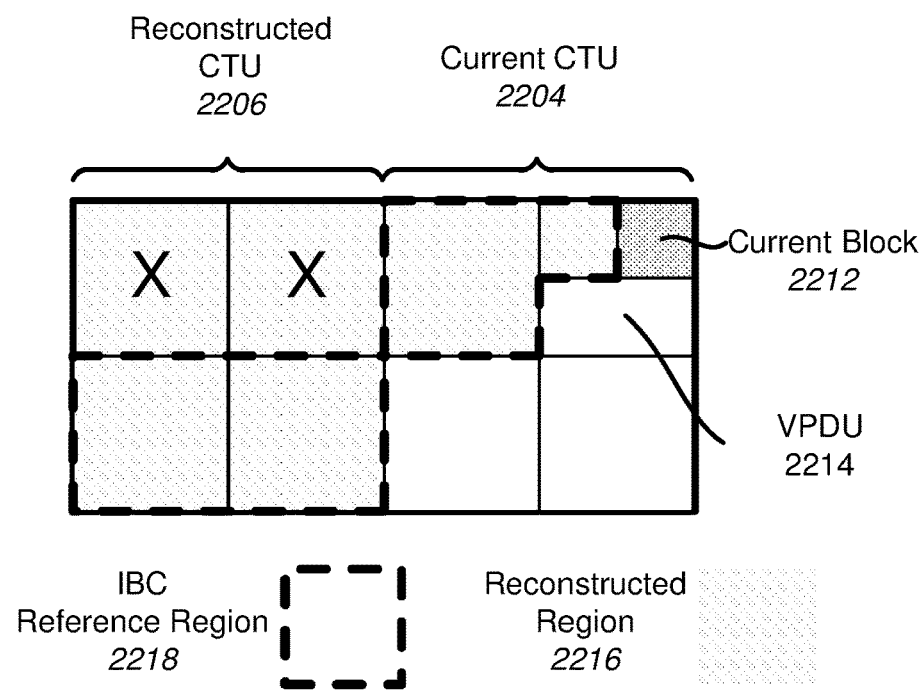
FIG. 22B continues with the example of FIG. 22A for a later coded block in current CTU 2204 in accordance with embodiments of the present disclosure.

FIG. 22B continues with the example of FIG. 22A for a later coded block in current CTU 2204 in accordance with embodiments of the present disclosure. The later coded block is labeled as current block 2212 in FIG. 22B and is coded using IBC mode, as described above with respect to FIG. 17, by determining a "best matching" reference block within an IBC reference region. IBC reference region 2218 for current block 2212 may be constrained to: a reconstructed part of current CTU 2204; and the reconstructed CTU 2206 not including a portion, of reconstructed CTU 2206, collocated with either the reconstructed part of current CTU 2204 or a virtual pipeline data unit (VPDU) 2214 in which current block 2212 is located. As mentioned above with respect to FIG. 22A, current CTU 2204 is divided into 4 VPDUs of size 64×64 samples. Accordingly, IBC reference region 2218 in FIG. 22B for current block 2212 includes reconstructed region 2216 (shown with hatching) except the part of CTU 2206 collocated with either the reconstructed part of current CTU 2204 or VPDU 2214. These collocated regions are each marked with an "X" in FIG. 22B.

From the above description of FIGS. 22A and 22B, the shape and size of an IBC reference region may be highly-complex and varied depending on numerous factors, including a size of an IBC reference sample memory, a size of CTUs within a picture, a location of a current block within a current CTU, a size of a VPDU, etc. Determining a validity of a BV candidate, such as BV candidates 1708, 1902, 1904, and 1906 in FIGS. 19A-C, for a given IBC reference region may be difficult and complex to perform. For example, such a determination may require many independent conditions to be checked.

Embodiments of the present disclosure may obviate the need for an encoder or a decoder to check one or more conditions to determine the validity of a BV candidate, such as BV candidates 1708, 1902, 1904, and 1906. For example, the validity of a BV candidate may be determined based on values of samples, stored in an IBC reference sample memory, for a reference block indicated by the BV candidate. In an embodiment, the BV candidate may be determined to be valid based on the values of the samples, stored in the IBC reference sample memory, for the reference block indicated by the BV candidate not being equal to a default value, such as −1.

Figure 23A:
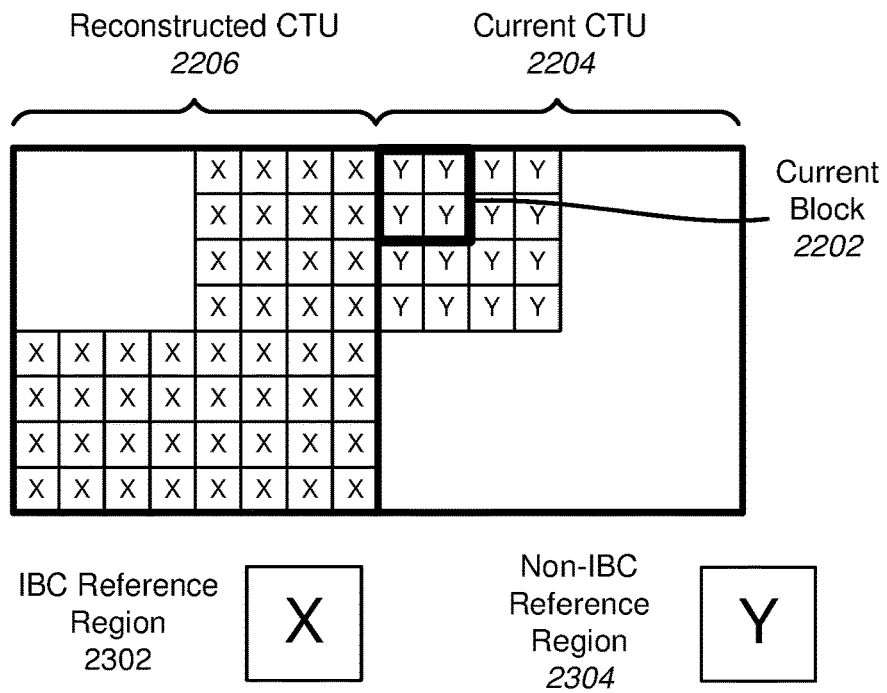
FIG. 23A illustrates example contents of the IBC reference sample memory for the example discussed above with respect to FIG. 22A in accordance with embodiments of the present disclosure.

FIG. 23A illustrates example contents of the IBC reference sample memory for the example discussed above with respect to FIG. 22A in accordance with embodiments of the present disclosure. For ease of illustration, the example of FIG. 23A is provided based on a simplification of current CTU 2204 and reconstructed CTU 2206 having a size of 8×8 samples instead of 128×128 samples discussed above with respect to FIG. 22A. As can been seen from FIG. 23A, the IBC reference sample memory is maintained to store two types of values for sample locations in current CTU 2204 and reconstructed CTU 2206. The first type of value is denoted by an "X" and may be stored for each sample location in current CTU 2204 and reconstructed CTU 2206 that is within IBC reference region 2302 for current block 2202. Each "X" may represent the reconstructed sample value that is stored in the IBC reference sample memory for the corresponding location in current CTU 2204 or reconstructed CTU 2206. The second type of value is denoted by a "Y" and may be stored for each sample location in current CTU 2204 and reconstructed CTU 2206 that is not within IBC reference region 2302 but for which the IBC reference sample memory stores a value. Each "Y" may represent a default value that indicates a sample in the non-IBC reference region 2304. For example, the IBC reference sample memory may store a default value of −1 for each sample location denoted by a "Y" in FIG. 23A. In other examples, the IBC reference sample memory may be maintained to store a different default value for each sample location denoted by a "Y" in FIG. 23A. For example, IBC reference sample memory may store any default value for each sample location denoted by a "Y" in FIG. 23A that may be distinguished from a reconstructed sample value.

Figure 23B:
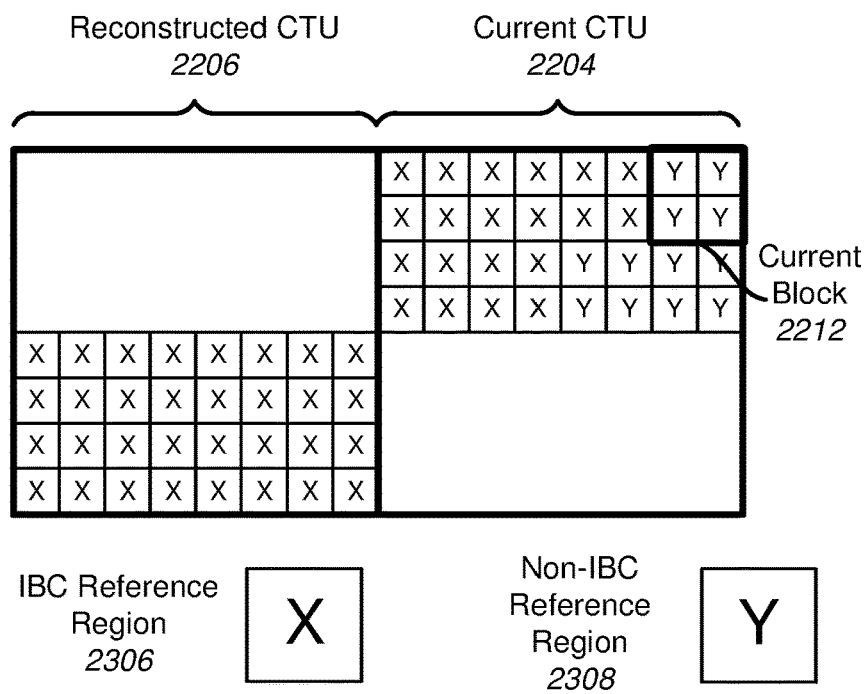
FIG. 23B illustrates example contents of the IBC reference sample memory for the example discussed above with respect to FIG. 22B in accordance with embodiments of the present disclosure.

FIG. 23B illustrates example contents of the IBC reference sample memory for the example discussed above with respect to FIG. 22B in accordance with embodiments of the present disclosure. For ease of illustration, the example of FIG. 23B is provided based on a simplification of current CTU 2204 and reconstructed CTU 2206 having a size of 8×8 samples instead of 128×128 samples discussed above with respect to FIG. 23B. As can been seen from FIG. 23B, the IBC reference sample memory is maintained to store two types of values for sample locations in current CTU 2204 and reconstructed CTU 2206. The first type of value is denoted by an "X" and may be stored for each sample location in current CTU 2204 and reconstructed CTU 2206 that is within IBC reference region 2306 for current block 2212. Each "X" may represent the reconstructed sample value that is stored in the IBC reference sample memory for the corresponding location in current CTU 2204 or reconstructed CTU 2206. The second type of value is denoted by a "Y" and may be stored for each sample location in current CTU 2204 and reconstructed CTU 2206 that is not within IBC reference region 2306 but for which the IBC reference sample memory stores a value. Each "Y" may represent a default value that indicates a sample in the non-IBC reference region 2308. For example, the IBC reference sample memory may store a default value of −1 for each sample location denoted by a "Y" in FIG. 23B. In other examples, the IBC reference sample memory may store a different default value for each sample location denoted by a "Y" in FIG. 23B. For example, IBC reference sample memory may store any default value for each sample location denoted by a "Y" in FIG. 23B that may be distinguished from a reconstructed sample value. I An encoder or decoder may determine the validity of a BV candidate, such as one of BV candidates 1708, 1902, 1904, and 1906, using the IBC reference sample memory maintained in the manner discussed above with respect to FIGS. 23A and 23B. For example, an encoder or decoder may determine whether a BV candidate is valid based on values of samples, stored in the IBC reference sample memory, for a reference block indicated by the BV candidate. For example, based on each sample, stored in the IBC reference sample memory, for the reference block indicated by the BV candidate not being equal to the default value, the encoder or decoder may determine that the BV candidate is valid. In another example, based on a top-right and bottom-left sample, stored in the IBC reference sample memory, for the reference block indicated by the BV candidate not being equal to the default value, the encoder or decoder may determine that the BV candidate is valid. In an embodiment, the encoder or decoder may still need to determine whether the reference block, indicated by a BV candidate, points to a block within the boundary of the sample locations stored in the IBC reference sample memory.

Figure 24:
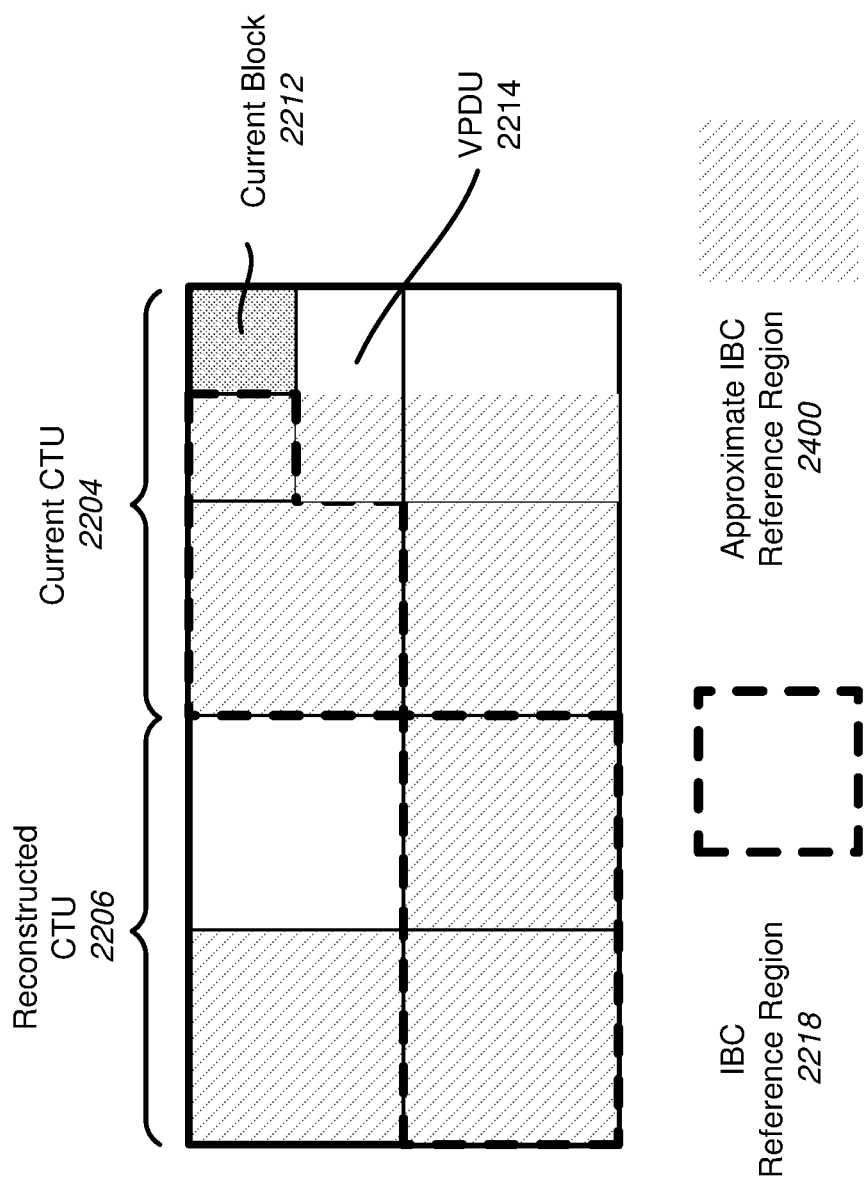
FIG. 24 illustrates an example of an approximate IBC reference region 2400 determined for IBC reference region 2218 of FIG. 22B in accordance with embodiments of the present disclosure.

In another embodiment, instead of using the IBC reference sample memory to reduce complexity associated with determining the validity of a BV candidate, the validity of a BV candidate may be determined based on an approximated IBC reference region. FIG. 24 illustrates an example of an approximate IBC reference region 2400 determined for IBC reference region 2218 of FIG. 22B in accordance with embodiments of the present disclosure. Approximate IBC reference region 2400 approximates IBC reference region 2218 by not only being larger than IBC reference region 2218 but also fully comprising IBC reference region 2218. The validity of a BV candidate may be determined based on approximate IBC reference region 2400 instead of IBC reference region 2218. For example, a BV candidate may be determined as a valid BV candidate based on the BV candidate indicating a displacement from current block 2212 to a reference block within approximate IBC reference region 2400. In another example, a BV candidate may be determined as a valid BV candidate based on the BV candidate indicating a displacement from current block 2212 to a reference block that is not outside approximate IBC reference region 2400. The displacement from current block 2212 to the reference block may be from the top left sample of current block 2212 to the top left sample of the reference block.

Because approximate IBC reference region 2400 fully comprises IBC reference region 2218 and is larger than IBC reference region 2218, there is a potential for a BV candidate to be determined as a valid BV candidate based on approximate IBC reference region 2400 even though the BV candidate would not be determined as a valid candidate based on IBC reference region 2218. However, there is no potential for the opposite scenario to be true. That is, there is no potential for a BV candidate to be determined as an invalid BV candidate based on approximate IBC reference region 2400 even though the BV candidate would be determined as a valid candidate based on IBC reference region 2218. The fact that a BV candidate may be determined as a valid BV candidate based on approximate IBC reference region 2400 even though the BV candidate would not be determined as a valid candidate based on IBC reference region 2218 is not catastrophic in that accurate decoding is still fully achievable. However, because more BV candidates may be determined as valid that otherwise would be the case using IBC reference region 2218, there may be an increase in overhead required to signal signs of the components of a BV. This potential increase in signaling overhead may be justified by a reduction in complexity required at an encoder or decoder to determine the validity of a BV candidate based on an approximate IBC reference region.

In an embodiment, an encoder or decoder may determine that a reference block, indicated by a BV candidate, is located in an approximation of a reference region (and is therefore valid) based on each of one or more conditions not being true. In another embodiment, an encoder or decoder may determine that a reference block, indicated by a BV candidate is located outside an approximation of a reference region (and is therefore invalid) based any of the one or more conditions being true.

In an embodiment, the one or more conditions may comprise a sequence order for coding (e.g., encoding and/or decoding) the reference block being greater than a sequence order for coding (e.g., encoding and/or decoding) the block. In an embodiment, the sequence order may be for a first level partition of the CTU of the current block.

In an embodiment, the one or more conditions may comprise any sample of the reference block being located to the right and below a top left sample of the current block being coded. In an embodiment, the condition of the reference block being located to the right and below a top left sample of the current block being coded may be given by $xBv+width>0$ and $yBv+height>0$, where $xBv$ and $yBv$ are respectively the horizontal and vertical components of the BV or BV candidate, width is the width of current block being coded, and height is the height of the current block being coded.

In an embodiment, the one or more conditions may comprise any sample of the reference block being located in a CTU above a CTU of the current block being coded. In an embodiment, the condition of any sample of the reference block being located in a CTU above the CTU of the current block being coded may be determined based on a vertical position of a top left sample of the reference block being located in a CTU above the CTU of the current block being coded. In an embodiment, the condition of any sample of the reference block being located in a CTU above the CTU of the current block being coded may be given by $(refTopY>>ctuSizeLog2)<(yPos>>ctuSizeLog2)$, where refTopY is the vertical position of the top left sample of the reference block, ctuSizeLog2 is the log base 2 of the size of a CTU, yPos is the vertical position of the top left sample of the current block being coded, and $>>$ is the right shift operator.

In an embodiment, the one or more conditions may comprise any sample of the reference block being located in a CTU below a CTU of the current block being coded. In an embodiment, the condition of any sample of the reference block being located in a CTU below the CTU of the current block being coded may be determined based on a vertical position of a bottom right sample of the reference block being located in a CTU below the CTU of the current block being coded. In an embodiment, the condition of any sample of the reference block being located in a CTU below the CTU of the current block being coded may be given by $(refBottomY>>ctuSizeLog2)<(yPos>>ctuSizeLog2)$, where refBottomY is the vertical position of the bottom right sample of the reference block, ctuSizeLog2 is the log base 2 of the size of a CTU, yPos is the vertical position of the top left sample of the current block being coded, and >> is the right shift operator.

In another embodiment, the one or more conditions may comprise any sample of the reference block being located outside of a picture of the current block being coded. In an embodiment, the condition of any sample of the reference block being located outside of the picture of the current block being coded may be determined based a horizontal position of a top left sample of the reference block being less than zero. In an embodiment, the condition of any sample of the reference block being located outside of the picture of the current block being coded may be alternatively or further determined based on a vertical position of a top left sample of the reference block being less than zero. In an embodiment, the condition of any sample of the reference block being located outside of the picture of the current block being coded may be alternatively or further determined based on a horizontal position of a bottom right sample of the reference block being greater than a width of a picture of the current block being coded. In an embodiment, the condition of any sample of the reference block being located outside of the picture of the current block being coded may be alternatively or further determined based on a vertical position of a bottom right sample of the reference block being greater than a height of a picture the current block being coded.

In another embodiment, the one or more conditions may comprise the reference block belonging to a different tile than the current block being coded.

In another embodiment, the one or more conditions may comprise the reference block belonging to a portion, of a CTU to the left of the current CTU, that is collocated with a virtual pipeline data unit (VPDU) in which the block is located. In an embodiment, the condition of the reference block belonging to a portion, of a CTU to the left of the current CTU, that is collocated with a virtual pipeline data unit (VPDU) in which the block is located may be given by the following condition for CTUs of size 128×128 samples: (xPos+xBv+ctu_size)>>6, yPos+yBv>>6)==(xPos>>6, yPos>>6), where xPos and yPos are respectively the horizontal and vertical positions of the top left sample of the current block being encoded, xBv and yBv are respectively the horizontal and vertical components of the BV or BV candidate, ctu_size is the size a CTU, and >> is the right shift operator.

Figure 25:
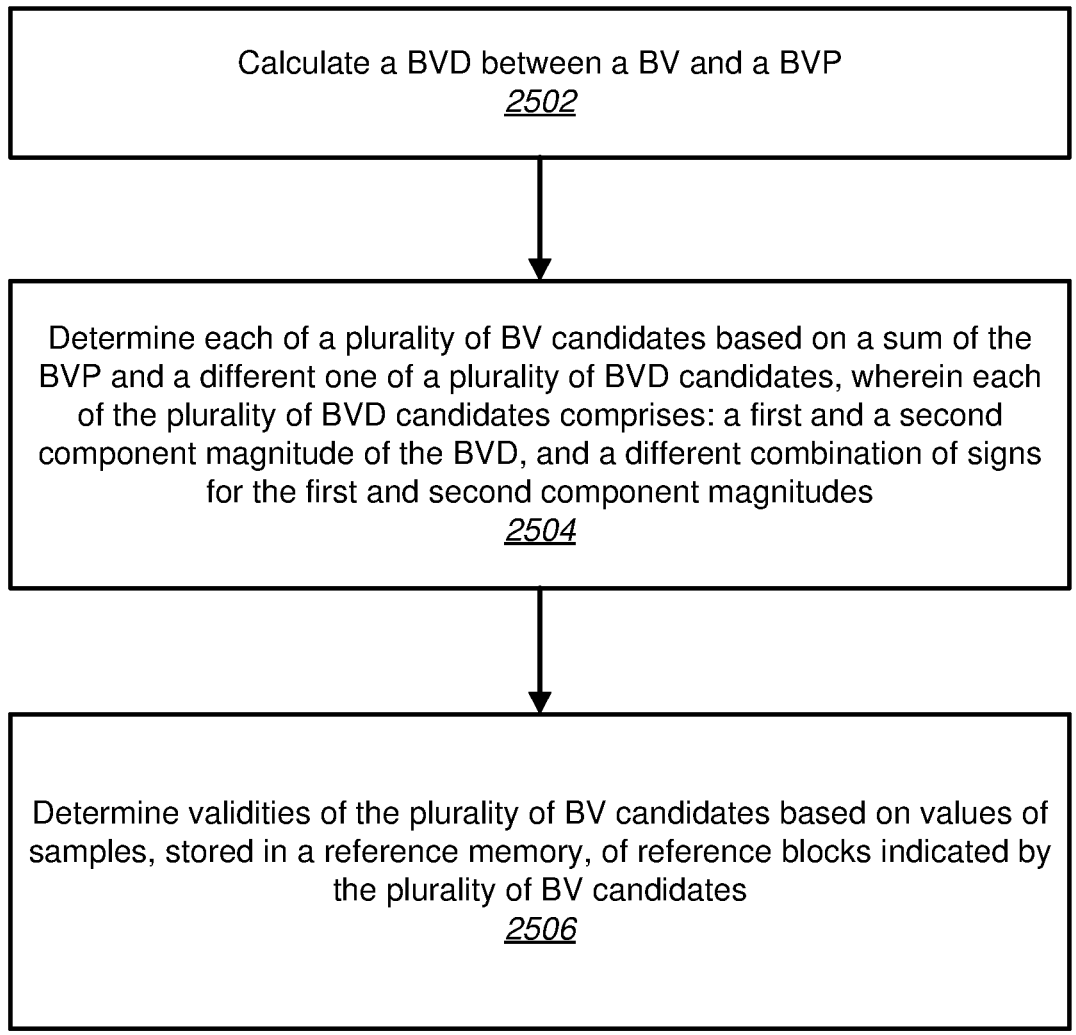
FIG. 25 illustrates a flowchart of a method for determining validities of a plurality of BV candidates in accordance with embodiments of the present disclosure.

FIG. 25 illustrates a flowchart 2500 of a method for determining validities of a plurality of BV candidates in accordance with embodiments of the present disclosure. The method of flowchart 2500 may be implemented by an encoder or decoder, such as encoder 200 in FIG. 2 or decoder 300 in FIG. 3.

The method of flowchart 2500 begins at 2502. At 2502, a BVD between a BV and a BVP is calculated.

At 2504, each of a plurality of BV candidates may be determined based on a sum of the BVP and a different one of a plurality of BVD candidates. Each of the plurality of BVD candidates comprises: a first and a second component magnitude of the BVD, and a different combination of signs for the first and second component magnitudes.

At 2506, validities of the plurality of BV candidates may be determined based on values of samples, stored in a reference memory, of reference block indicated by the plurality of BV candidates.

In an embodiment, determining the validities of the plurality of BV candidates comprises determining a validity of a BV candidate of the plurality of BV candidates based on at least: a first value, stored in the reference memory, for a top left sample of a reference block indicated by the BV candidate; and a second value, stored in the reference memory, for a bottom right sample of the reference block indicated by the BV candidate. In an embodiment, determining the validity of the BV candidate comprises determining that the BV candidate is valid based on the first and second values not being equal to a default value. In an embodiment, the default value is −1.

In an embodiment, determining the validities of the plurality of BV candidates comprises determining a validity of a BV candidate, of the plurality of BV candidates, based on a value, stored in the reference memory, for each sample of a reference block indicated by the BV candidate. In an embodiment, determining the validity of the BV candidate comprises determining that the BV candidate is valid based on the value, stored in the reference memory, for each sample of the reference block indicated by the BV candidate not being equal to a default value. In an embodiment, the default value is −1.

Figure 26:
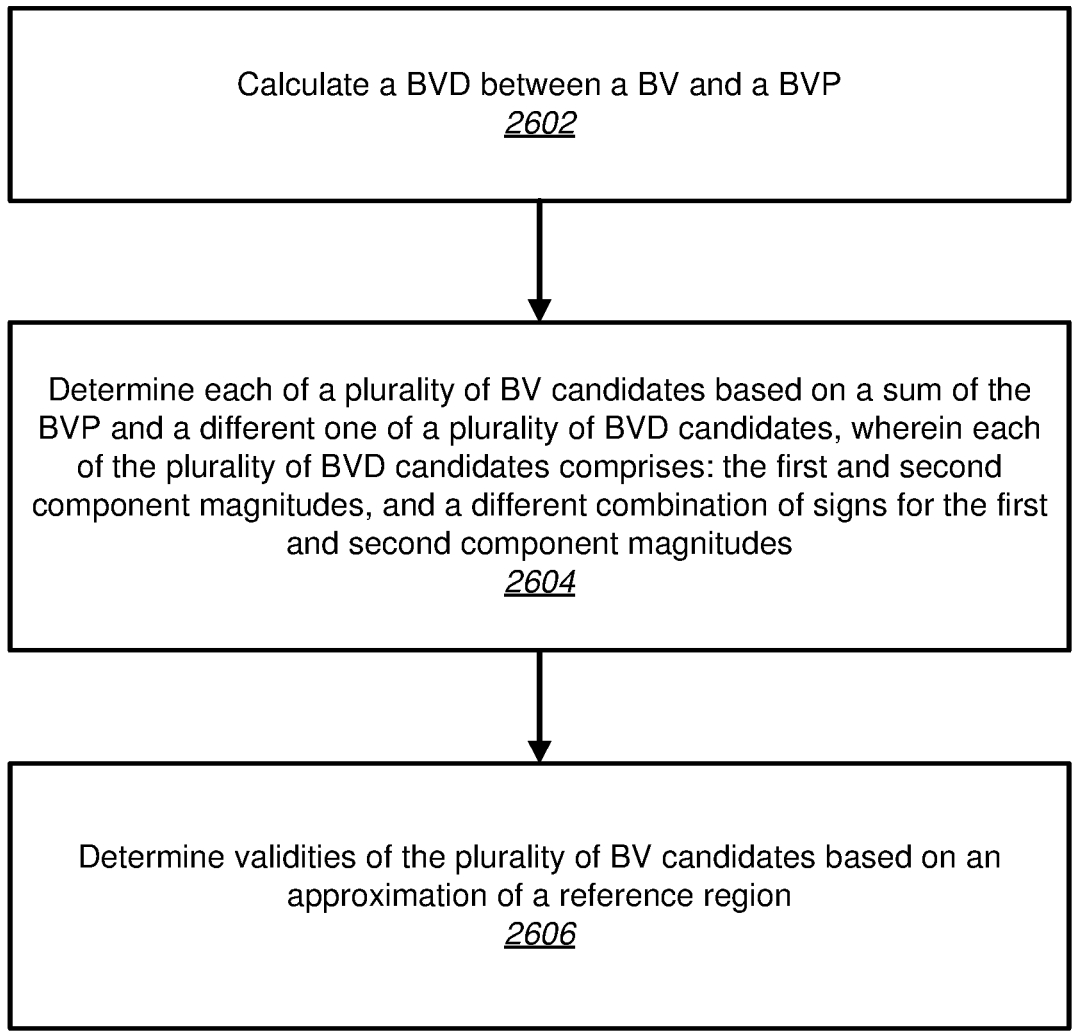
FIG. 26 illustrates a flowchart of a method for determining validities of a plurality of BV candidates in accordance with embodiments of the present disclosure.

FIG. 26 illustrates a flowchart 2600 of a method for determining validities of a plurality of BV candidates in accordance with embodiments of the present disclosure. The method of flowchart 2600 may be implemented by an encoder or decoder, such as encoder 200 in FIG. 2 or decoder 300 in FIG. 3.

The method of flowchart 2600 begins at 2602. At 2602, a BVD between a BV and a BVP may be calculated.

At 2604, each of a plurality of BV candidates may be determined based on a sum of the BVP and a different one of a plurality of BVD candidates. Each of the plurality of BVD candidates comprises: a first and a second component magnitude of the BVD, and a different combination of signs for the first and second component magnitudes.

At 2606, validities of the plurality of BV candidates may be determined based on an approximation of a reference region.

In an embodiment, determining the validities further comprises determining a BV candidate, of the plurality of BV candidates, is valid based on the BV candidate indicating a position of a reference block located inside the approximation of the reference region. In an embodiment, the approximation of the reference region comprises the reference region and is larger than the reference region. In an embodiment, determining the reference block is located inside the approximation of the reference region based on each of one or more conditions, indicating the reference block to be located outside the approximation of the reference region, not being true.

In an embodiment, determining the validities further comprises determining a BV candidate, of the plurality of BV candidates, is invalid based on the BV candidate indicating a position of a reference block located outside the approximation of the reference region. In an embodiment, the approximation of the reference region comprises the reference region and is larger than the reference region. In an embodiment, the reference block is located outside the approximation of the reference region based on a sequence order for coding the reference block being greater than a sequence order for coding the block. In an embodiment, the reference block is located outside the approximation of the reference region based on any sample of the reference block being located to the right and below a top left sample of the block. In an embodiment, the reference block is located outside the approximation of the reference region based on any sample of the reference block being located in a coding transform unit above a coding transform unit of the block. In an embodiment, the reference block is located outside the approximation of the reference region based on a vertical position of a top left sample of the reference block being located in a coding transform unit above a coding transform unit of the block. In an embodiment, the reference block is located outside the approximation of the reference region based on any sample of the reference block being located in a coding transform unit below a coding transform unit of the block. In an embodiment, the reference block is located outside the approximation of the reference region based on a vertical position of a bottom right sample of the reference block being located in a coding transform unit below a coding transform unit of the block. In an embodiment, the reference block is located outside the approximation of the reference region based on any sample of the reference block being located outside of a picture of the block. In an embodiment, the reference block is located outside the approximation of the reference region based on a horizontal position of a top left sample of the reference block being less than zero. In an embodiment, the reference block is located outside the approximation of the reference region based on a vertical position of a top left sample of the reference block being less than zero. In an embodiment, the reference block is located outside the approximation of the reference region based on a horizontal position of a bottom right sample of the reference block being greater than a width of a picture of the block. In an embodiment, the reference block is located outside the approximation of the reference region based on a vertical position of a bottom right sample of the reference block being greater than a height of a picture of the block. In an embodiment, the reference block is located outside the approximation of the reference region based on the reference block belonging to a different tile than the block. In an embodiment, the reference block is located outside the approximation of the reference region based on the reference block belonging to a portion, of a coding tree unit (CTU) to the left of the current CTU, that is collocated with a virtual pipeline data unit (VPDU) in which the block is located.

Figure 27:
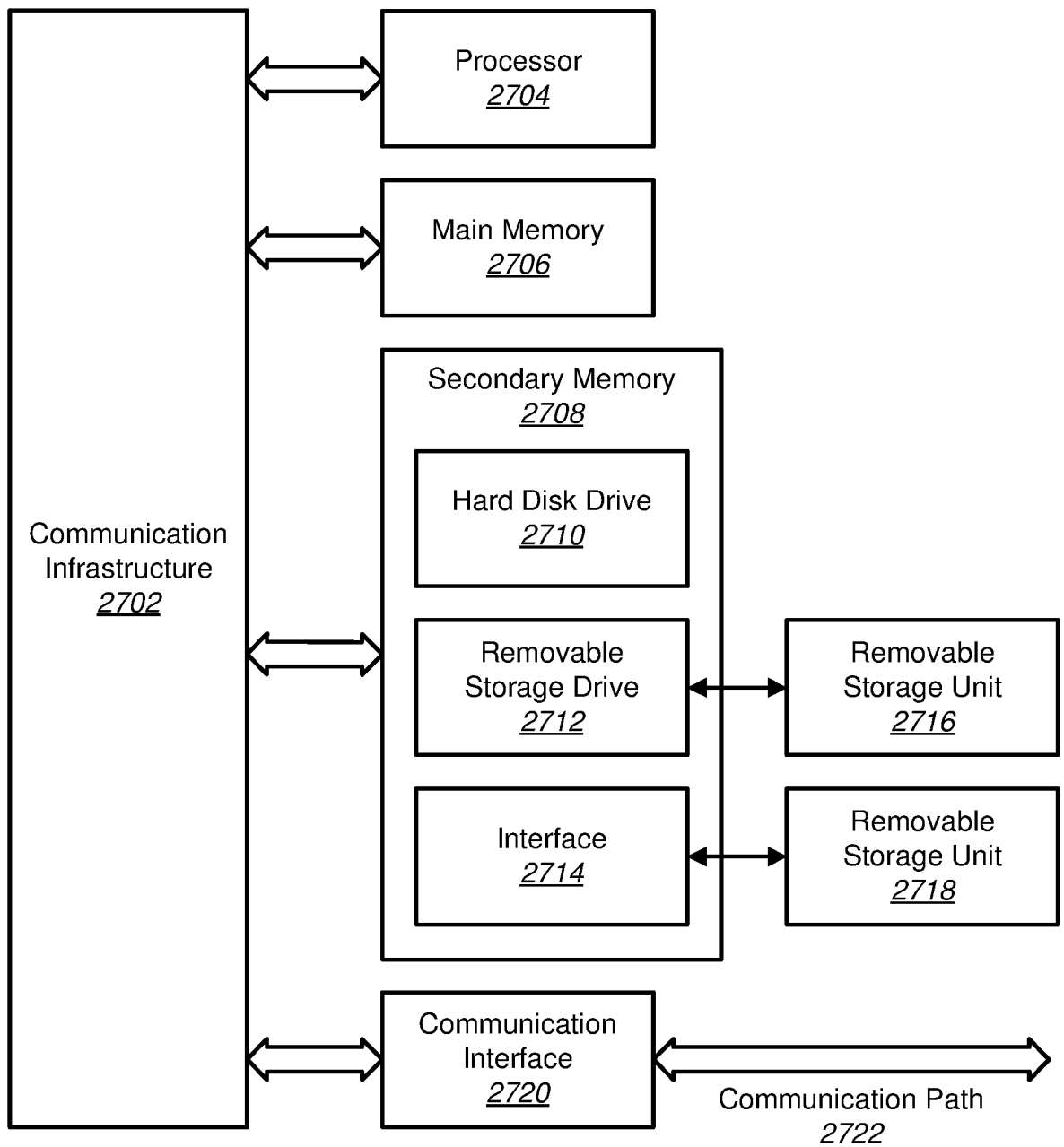
FIG. 27 illustrates a block diagram of an example computer system in which embodiments of the present disclosure may be implemented.

Embodiments of the present disclosure may be implemented in hardware using analog and/or digital circuits, in software, through the execution of instructions by one or more general purpose or special-purpose processors, or as a combination of hardware and software. Consequently, embodiments of the disclosure may be implemented in the environment of a computer system or other processing system. An example of such a computer system 2700 is shown in FIG. 27. Blocks depicted in the figures above, such as the blocks in FIGS. 1, 2, and 3, may execute on one or more computer systems 2700. Furthermore, each of the steps of the flowcharts depicted in this disclosure may be implemented on one or more computer systems 2700.

Computer system 2700 includes one or more processors, such as processor 2704. Processor 2704 may be, for example, a special purpose processor, general purpose processor, microprocessor, or digital signal processor. Processor 2704 may be connected to a communication infrastructure 902 (for example, a bus or network). Computer system 2700 may also include a main memory 2706, such as random access memory (RAM), and may also include a secondary memory 2708.

Secondary memory 2708 may include, for example, a hard disk drive 2710 and/or a removable storage drive 2712, representing a magnetic tape drive, an optical disk drive, or the like. Removable storage drive 2712 may read from and/or write to a removable storage unit 2716 in a well-known manner. Removable storage unit 2716 represents a magnetic tape, optical disk, or the like, which is read by and written to by removable storage drive 2712. As will be appreciated by persons skilled in the relevant art(s), removable storage unit 2716 includes a computer usable storage medium having stored therein computer software and/or data.

In alternative implementations, secondary memory 2708 may include other similar means for allowing computer programs or other instructions to be loaded into computer system 2700. Such means may include, for example, a removable storage unit 2718 and an interface 2714. Examples of such means may include a program cartridge and cartridge interface (such as that found in video game devices), a removable memory chip (such as an EPROM or PROM) and associated socket, a thumb drive and USB port, and other removable storage units 2718 and interfaces 2714 which allow software and data to be transferred from removable storage unit 2718 to computer system 2700.

Computer system 2700 may also include a communications interface 2720. Communications interface 2720 allows software and data to be transferred between computer system 2700 and external devices. Examples of communications interface 2720 may include a modem, a network interface (such as an Ethernet card), a communications port, etc. Software and data transferred via communications interface 2720 are in the form of signals which may be electronic, electromagnetic, optical, or other signals capable of being received by communications interface 2720. These signals are provided to communications interface 2720 via a communications path 2722. Communications path 2722 carries signals and may be implemented using wire or cable, fiber optics, a phone line, a cellular phone link, an RF link, and other communications channels.

As used herein, the terms "computer program medium" and "computer readable medium" are used to refer to tangible storage media, such as removable storage units 2716 and 2718 or a hard disk installed in hard disk drive 2710. These computer program products are means for providing software to computer system 2700. Computer programs (also called computer control logic) may be stored in main memory 2706 and/or secondary memory 2708. Computer programs may also be received via communications interface 2720. Such computer programs, when executed, enable the computer system 2700 to implement the present disclosure as discussed herein. In particular, the computer programs, when executed, enable processor 2704 to implement the processes of the present disclosure, such as any of the methods described herein. Accordingly, such computer programs represent controllers of the computer system 2700.

In another embodiment, features of the disclosure may be implemented in hardware using, for example, hardware components such as application-specific integrated circuits (ASICs) and gate arrays. Implementation of a hardware state machine to perform the functions described herein will also be apparent to persons skilled in the relevant art(s).

What is claimed is:
1. A method comprising:
 calculating a block vector difference (BVD) between a block vector (BV) and a block vector predictor (BVP);
 determining each of a plurality of BV candidates based on a sum of the BVP and a different one of a plurality of BVD candidates, wherein each of the plurality of BVD candidates comprises:
  a first and a second component magnitude of the BVD; and a different combination of signs for the first and second component magnitudes; and determining validities of the plurality of BV candidates based on values of samples, stored in a reference memory, of reference blocks indicated by the plurality of BV candidates; and signaling, in a bitstream, a sign for at least one of the first and second component magnitudes of the BVD based on the validities of the plurality of BV candidates.

2. The method of claim 1, wherein determining the validities of the plurality of BV candidates comprises determining a validity of a BV candidate of the plurality of BV candidates based on at least:

a first value, stored in the reference memory, for a top left sample of a reference block indicated by the BV candidate; and a second value, stored in the reference memory, for a bottom right sample of the reference block indicated by the BV candidate.

3. The method of claim 2, wherein determining the validity of the BV candidate comprises determining that the BV candidate is valid based on the first and second values not being equal to a default value.

4. The method of claim 3, wherein the default value is −1.

5. The method of claim 1, wherein determining the validities of the plurality of BV candidates comprises determining a validity of a BV candidate, of the plurality of BV candidates, based on a value, stored in the reference memory, for each sample of a reference block indicated by the BV candidate.

6. The method of claim 5, wherein determining the validity of the BV candidate comprises determining that the BV candidate is valid based on the value, stored in the reference memory, for each sample of the reference block indicated by the BV candidate not being equal to a default value.

7. The method of claim 6, wherein the default value is −1.

8. An apparatus comprising:
one or more processors; and
memory storing instructions that, when executed by the one or more processors, cause the apparatus to:
calculate a block vector difference (BVD) between a block vector (BV) and a block vector predictor (BVP);
determine each of a plurality of BV candidates based on a sum of the BVP and a different one of a plurality of BVD candidates, wherein each of the plurality of BVD candidates comprises:
a first and a second component magnitude of the BVD; and
a different combination of signs for the first and second component magnitudes; and
determine validities of the plurality of BV candidates based on values of samples, stored in a reference memory, of reference blocks indicated by the plurality of BV candidates; and
signal, in a bitstream, a sign for at least one of the first and second component magnitudes of the BVD based on the validities of the plurality of BV candidates.

9. The apparatus of claim 8, wherein the instructions that, when executed by the one or more processors, cause the apparatus to determine the validities of the plurality of BV candidates further cause the apparatus to determine a validity of a BV candidate of the plurality of BV candidates based on at least:

a first value, stored in the reference memory, for a top left sample of a reference block indicated by the BV candidate; and a second value, stored in the reference memory, for a bottom right sample of the reference block indicated by the BV candidate.

10. The apparatus of claim 9, wherein the instructions that, when executed by the one or more processors, cause the apparatus to determine the validity of the BV candidate further cause the apparatus to determine that the BV candidate is valid based on the first and second values not being equal to a default value.

11. The apparatus of claim 10, wherein the default value is −1.

12. The apparatus of claim 8, wherein the instructions that, when executed by the one or more processors, cause the apparatus to determine the validities of the plurality of BV candidates further cause the apparatus to determine a validity of a BV candidate, of the plurality of BV candidates, based on a value, stored in the reference memory, for each sample of a reference block indicated by the BV candidate.

13. The apparatus of claim 12, wherein the instructions that, when executed by the one or more processors, cause the apparatus to determine the validity of the BV candidate further cause the apparatus to determine that the BV candidate is valid based on the value, stored in the reference memory, for each sample of the reference block indicated by the BV candidate not being equal to a default value.

14. The apparatus of claim 13, wherein the default value is −1.

15. A non-transitory computer-readable medium storing instructions that, when executed by one or more processors of an apparatus, cause the apparatus to:
calculate a block vector difference (BVD) between a block vector (BV) and a block vector predictor (BVP);
determine each of a plurality of BV candidates based on a sum of the BVP and a different one of a plurality of BVD candidates, wherein each of the plurality of BVD candidates comprises:
a first and a second component magnitude of the BVD; and
a different combination of signs for the first and second component magnitudes; and
determine validities of the plurality of BV candidates based on values of samples, stored in a reference memory, of reference blocks indicated by the plurality of BV candidates; and
signal, in a bitstream, a sign for at least one of the first and second component magnitudes of the BVD based on the validities of the plurality of BV candidates.

16. The non-transitory computer-readable medium of claim 15, wherein the instructions that, when executed by the one or more processors, cause the apparatus to determine the validities of the plurality of BV candidates further cause the apparatus to determine a validity of a BV candidate of the plurality of BV candidates based on at least:

a first value, stored in the reference memory, for a top left sample of a reference block indicated by the BV candidate; and a second value, stored in the reference memory, for a bottom right sample of the reference block indicated by the BV candidate.

17. The non-transitory computer-readable medium of claim 16, wherein the instructions that, when executed by the one or more processors, cause the apparatus to determine the validity of the BV candidate further cause the apparatus to determine that the BV candidate is valid based on the first and second values not being equal to a default value.

18. The non-transitory computer-readable medium of claim 17, wherein the default value is −1.

19. The non-transitory computer-readable medium of claim 15, wherein the instructions that, when executed by the one or more processors, cause the apparatus to determine the validities of the plurality of BV candidates further cause the apparatus to determine a validity of a BV candidate, of the plurality of BV candidates, based on a value, stored in the reference memory, for each sample of a reference block indicated by the BV candidate.

20. The non-transitory computer-readable medium of claim 19, wherein the instructions that, when executed by the one or more processors, cause the apparatus to determine the validity of the BV candidate further cause the apparatus to determine that the BV candidate is valid based on the value, stored in the reference memory, for each sample of the reference block indicated by the BV candidate not being equal to a default value.

\* \* \* \* \*